(12) United States Patent
Wang et al.

(10) Patent No.: US 11,845,848 B2
(45) Date of Patent: Dec. 19, 2023

(54) FUNCTIONALIZED HIGH-OLEIC SOYBEAN OIL WAX AND EMULSION FOR POST-HARVEST TREATMENT OF FRESH FRUIT

(71) Applicants: Iowa State University Research Foundation, Inc., Ames, IA (US); University of Tennessee Research Foundation, Knoxville, TN (US)

(72) Inventors: Tong Wang, Knoxville, TN (US); Tao Fei, Maryville, TN (US); Francisco Miquel Ang Leyva Gutierrez, Santa Ana, CA (US)

(73) Assignees: IOWA STATE UNIVERSITY RESEARCH FOUNDATION, INC., Ames, IA (US); UNIVERSITY OF TENNESSEE RESEARCH FOUNDATION, Knoxville, TN (US)

( * ) Notice: Subject to any disclaimer, the term of this patent is extended or adjusted under 35 U.S.C. 154(b) by 44 days.

(21) Appl. No.: 17/244,699

(22) Filed: Apr. 29, 2021

(65) Prior Publication Data

US 2021/0340354 A1 Nov. 4, 2021

Related U.S. Application Data

(60) Provisional application No. 63/017,895, filed on Apr. 30, 2020.

(51) Int. Cl.
  *C08K 5/11* (2006.01)
  *C08L 91/06* (2006.01)
  (Continued)

(52) U.S. Cl.
  CPC ............... *C08K 5/11* (2013.01); *A23P 20/11* (2016.08); *B01F 23/40* (2022.01); *C08L 91/06* (2013.01); *B01F 23/4146* (2022.01)

(58) Field of Classification Search
  CPC . C08K 5/11; C10M 105/38; C10M 2207/289; C10M 2207/2895;
  (Continued)

(56) References Cited

U.S. PATENT DOCUMENTS

2006/0289138 A1* 12/2006 Borsinger ............ C09D 191/06
  162/172
2007/0068642 A1*  3/2007 Borsinger ............ D21H 21/18
  516/77

(Continued)

OTHER PUBLICATIONS

Zhao et al., "Syntheses and Properties of Cross-Linked Polymers from Functionalized Triglycerides," Journal of Applied Polymer Science 110(2):647-656 (2008).

(Continued)

*Primary Examiner* — Ellen M McAvoy
(74) *Attorney, Agent, or Firm* — Troutman Pepper Hamilton Sanders LLP (Rochester)

(57) ABSTRACT

The present application is directed to a compound having the Formula (I):

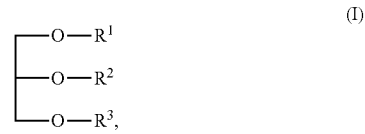

wherein $R^1$, $R^2$, and $R^3$ are as described herein. The present application is also directed to a wax composition comprising a wax and a compound of Formula (I). Processes of making a wax composition and for coating a plant or plant part with the compound of Formula (I) are also described.

18 Claims, 21 Drawing Sheets

(51) Int. Cl.
*A23P 20/10* (2016.01)
*B01F 23/40* (2022.01)
*B01F 23/41* (2022.01)

(58) Field of Classification Search
CPC ..... C10M 2207/283; C10M 2207/2835; C08L 91/06; A23P 10/11
See application file for complete search history.

(56) References Cited

U.S. PATENT DOCUMENTS

| | | | | |
|---|---|---|---|---|
| 2008/0227993 | A1* | 9/2008 | Zuckerman | C10L 1/19 554/219 |
| 2010/0024281 | A1* | 2/2010 | Lemke | C08L 91/06 44/275 |
| 2013/0289182 | A1* | 10/2013 | Bastioli | C08L 9/06 524/308 |
| 2014/0142234 | A1* | 5/2014 | Layman | C08L 23/12 524/317 |
| 2017/0058226 | A1* | 3/2017 | Heise | C10L 1/14 |
| 2019/0110495 | A1* | 4/2019 | Kornbrust | A23G 3/0063 |
| 2021/0030661 | A1* | 2/2021 | Franklin | C11C 1/002 |
| 2021/0062003 | A1* | 3/2021 | Kurth | A61K 8/92 |
| 2021/0171851 | A1* | 6/2021 | Hunt | C07C 69/30 |
| 2022/0056242 | A1* | 2/2022 | Chouvel | C08L 7/00 |

OTHER PUBLICATIONS

Fei et al., "Development of a Novel Soy-Wax Containing Emulsion with Enhanced Antifungal Properties for the Postharvest Treatment of Fresh Citrus Fruit," LWT—Food Science and Technology 141:110878 (2021).

Marashdah M., "New Natural Compound for the Enlargement of the Ureter," Arabian Journal of Chemistry 7(3):381-383 (2014).

Ren et al., "Coating Performance and Rheological Characteristics of Novel Soybean Oil-Based Wax Emulsions," Industrial Crops & Products 140:111654 (2019).

Leyva-Gutierrez et al., "Synthesis of Functionalized High-Oleic Soybean Oil Wax Coatings and Emulsions for Postharvest Treatment of Fresh Citrus Fruit," Eur. J. Lipid Sci. Technol. 122:2000005 (2020).

PubChem Compound Summary for CID 117882996 (created Feb. 23, 2016).

CAS Registry No. 152540-72-2.

* cited by examiner

FUNCTIONALIZED HIGH-OLEIC SOYBEAN OIL WAX AND EMULSION FOR POST-HARVEST TREATMENT OF FRESH FRUIT

This application claims the priority benefit of U.S. Provisional Patent Application Ser. No. 63/017,895 filed Apr. 30, 2020, which is hereby incorporated by reference in its entirety.

FIELD

The present application relates to functionalized high-oleic soybean oil wax and emulsion for post-harvest treatment of fresh fruit.

BACKGROUND

Fresh citrus fruits undergo numerous physical and chemical changes immediately after harvest. Most notably, the moisture loss associated with transpiration inevitably leads to shrinkage, loss of firmness, and a concomitant loss of sensory attributes (Baldwin et al., "Edible Coatings and Films to Improve Food Quality," $2^{nd}$ ed.; Taylor & Francis Group, LLC: Boca Raton, FL, 2012; Hagenmaier et al., "Reduction in Gas Exchange of Citrus Fruit by Wax Coatings," *J. Agric. Food Chem.* 41:283-287 (1993); Hagenmaier et al., "Gas Permeability of Fruit Coating Waxes," *J. Am. Soc. Hort. Sci.* 117(1):105-109 (1992)). The post-harvest coating of citrus fruits with wax emulsions from petroleum-based waxes such as paraffin and polyethylene, as well as carnauba, beeswax, candelilla wax, and shellac resin, is an effective treatment used to prevent moisture loss (Hagenmaier et al., "Gas Permeability of Fruit Coating Waxes," *J. Am. Soc. Hort. Sci.* 117(1):105-109 (1992)), although the shine imparted by these materials plays a central role in establishing perceived quality and consumer acceptance (Baldwin et al., "Edible Coatings and Films to Improve Food Quality," $2^{nd}$ ed.; Taylor & Francis Group, LLC: Boca Raton, FL, 2012; Ruiz, T., "Fruit Growers Supply, LLC," Exeter, CA Personal Communication Ed. 2019; Motamedi et al., "Performance of Carnauba Wax-Nanoclay Emulsion Coatings on Postharvest Quality of 'Valencia' Orange Fruit," *Scientia Horticulturae* 240:170-178 (2018)). With respect to fruit coatings, materials are often collectively referred to as "waxes," whether or not they fit the chemical definition of esters of long chain alcohols or glycerides; herein the term "wax" will be used consistent with industry usage and not the technical definition. Paraffin (P) and polyethylene-based (PE) waxes are relatively inexpensive ($0.97 $kg^{-1}$ and $1.2 $kg^{-1}$, respectively) (Alibaba Petroleum and Petrochemical Products. https://dir.indiamart.com/indianexporters/o_petrol.html (accessed 06/24/2019)) and provide an excellent barrier to moisture (Hagenmaier et al., "Gas Permeability of Fruit Coating Waxes," *J. Am. Soc. Hort. Sci.* 117(1):105-109 (1992); Donhowe et al., "Water Vapor and Oxygen Permeability of Wax Films," *J. Am. Oil Chem. Soc.* 70(9):867-873 (1993)). However, negative consumer attitudes toward non-renewable petroleum-based products and their potential migration into foods have warranted the use of suitable alternatives. Carnauba (CAR), beeswax, candelilla, and shellac resin wax coatings have likewise been shown to provide effective barriers to moisture and selective gas permeabilities (Hagenmaier et al., "Reduction in Gas Exchange of Citrus Fruit by Wax Coatings," *J. Agric. Food Chem.* 41:283-287 (1993); Hagenmaier et al., "Gas Permeability of Fruit Coating Waxes," *J. Am. Soc. Hort. Sci.* 117(1):105-109 (1992); Hagenmaier et al., "Permeability of Shellac Coatings to Gases and Water Vapor," *J. Agric. Food. Chem.* 39(5) 825-829 (1991)). Nevertheless, their high cost highlights the need for a low-cost alternative. Fully hydrogenated soybean oil (FHSO) or soy wax, although inexpensive, is not suitable for fruit coating as it is brittle, fails to adhere to the fruit surface, and does not impart any shine (Fei et al., "Synthesis and Characterization of Soybean Oil-Based Waxes and Their Application as Paraffin Substitute for Corrugated Coating," *J. Ind. Eng. Chem.* 58:113-122 (2018)). Hydrogenated castor oil (HCO) is a particularly attractive wax material due to its high hardness, high melting point, and lustrous appearance, and finds widespread use in the coating, pharmaceutical and cosmetic industries (BASF, "Kolliwax® HCO Hydrogenated Castor Oil Powder for Pharmaceutical Use," BASF, Ed. 2015). In addition, fatty acid polyglyceryl esters and polyethylene glycol esters of HCO by the tradename Cremophor® RH 40 ($19-24 $kg^{-1}$) for example, are widely used as non-ionic surfactants, cosurfactants, and emulsifiers for aqueous microemulsion formulations for drug-delivery, vitamin-solubilizing, fragrance and other cosmetic applications (Djekic et al., "The Influence of Cosurfactants and Oils on the Formation of Pharmaceutical Microemulsions Based on PEG-8 Caprylic/Capric Glycerides," *Int. J. Pharm.* 352 (1-2):231-923 (2008)). HCO, however, is a high-cost ($4-6 $kg^{-1}$) import commodity from Brazil, India, and East Asia and therefore not economical for use in coating of domestic agricultural commodities such as citrus fruits.

The present application is directed to overcoming these and other deficiencies in the art.

SUMMARY

One aspect of the present application relates to a compound having the Formula (I):

$$\begin{array}{l} \text{—O—R}^1 \\ \text{—O—R}^2, \\ \text{—O—R}^3 \end{array}$$ (I)

wherein
$R^1$ is H or

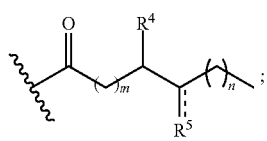

$R^2$ is H or

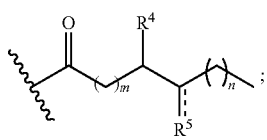

$R^3$ is H or

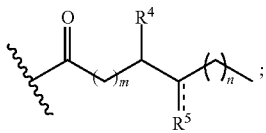

$R^4$ is H or —OH;
$R^5$ is H, —OH, or =O;

is a point of attachment of the $R^1$, $R^2$, or $R^3$ to its respective oxygen atom in the compound of Formula (I);
═══ is a single or a double bond;
n is an integer from 1 to 13;
m is an integer from 2 to 19;
wherein at least one of $R^1$, $R^2$, or $R^3$ is;

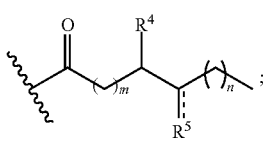

and
wherein when $R^4$ is H then $R^5$ is —OH or =O;
wherein when $R^5$ is H then $R^4$ is —OH;
with the proviso that 1) when m is 5 and n is 5, then $R^4$ is not OH; 2) when m is 7 and n is 7, then $R^4$ is not OH; 3) when m is 8 and n is 6, then $R^4$ is not OH; 4) when $R^2$ is H, $R^3$ is H, m is 15, and n is 5, then $R^4$ is not OH;
or a stereoisomer thereof.

Another aspect of the present application relates to a wax composition comprising:
(a) a wax; and
(b) a compound of Formula (I):

$$\begin{array}{c} \text{—O—R}^1 \\ \text{—O—R}^2, \\ \text{—O—R}^3 \end{array} \quad (I)$$

wherein
$R^1$ is H or

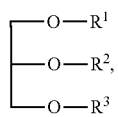

$R^2$ is H or

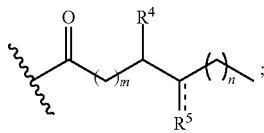

$R^3$ is H or

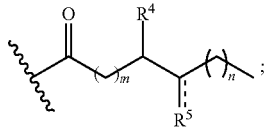

$R^4$ is H or —OH;
$R^5$ is H, —OH, or =O;

is a point of attachment of the $R^1$, $R^2$, or $R^3$ to its respective oxygen atom in the compound of Formula (I);
═══ is a single or a double bond;
n is an integer from 1 to 13;
m is an integer from 2 to 19;
wherein at least one of $R^1$, $R^2$, or $R^3$ is

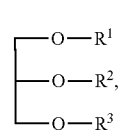

and
wherein when $R^4$ is H then $R^5$ is —OH or =O;
wherein when $R^5$ is H then $R^4$ is —OH;
or a stereoisomer thereof,
wherein the wax and the compound of Formula (I) are mixed together.

Another aspect of the present application relates to a process for preparing a wax emulsion composition comprising:
providing a compound of Formula (I):

$$\begin{array}{c} \text{—O—R}^1 \\ \text{—O—R}^2, \\ \text{—O—R}^3 \end{array} \quad (I)$$

wherein
R¹ is H or

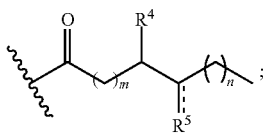

R² is H or

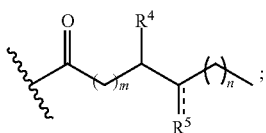

R³ is H or

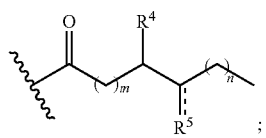

R⁴ is H or
R⁵ is H or —OH;
R⁵ is H, —OH, or =O;

is a point of attachment of the R¹, R², or R³ to its respective oxygen atom in the compound of Formula (I);
=== is a single or a double bond;
n is an integer from 1 to 13;
m is an integer from 2 to 19;
wherein at least one of R¹, R², or R³ is

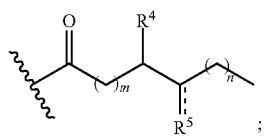

and
wherein when R⁴ is H then R⁵ is —OH or =O;
wherein when R⁵ is H then R⁴ is —OH;
or a stereoisomer thereof;
providing a wax;
blending the compound of compound of Formula (I) and the wax together to form a mixture;
heating the mixture until molten;
adding a base to the molten mixture;
homogenizing the molten mixture to which the base has been added under conditions effective to produce a hot emulsion; and
cooling the emulsion.

Another aspect of the present application relates to a process for coating a plant or plant part comprising:
providing a compound of Formula (I):

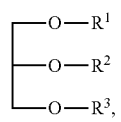

wherein
R¹ is H or

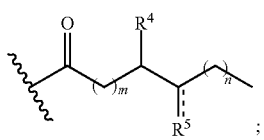

R² is H or

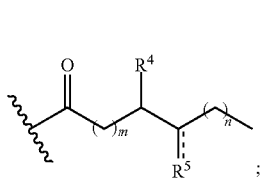

R³ is H or

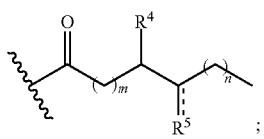

R⁴ is H or —OH;
R⁵ is H, —OH, or =O;

is a point of attachment of the R¹, R², or R³ to its respective oxygen atom in the compound of Formula (I);
=== is a single or a double bond;
n is an integer from 1 to 13;
m is an integer from 2 to 19;
wherein at least one of R¹, R², or R³ is

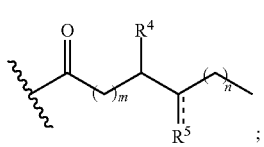

and wherein when $R^4$ is H then $R^5$ is —OH or =O;
wherein when $R^5$ is H then $R^4$ is —OH;
or a stereoisomer thereof; and
coating a plant or plant part with the compound of Formula (I) under conditions effective to produce a coated plant or plant part.

Recent years have witnessed the trend of rising global production of specialty high-oleic oils, specifically soybean oil (HOSO). HOSO is composed of up to 75% oleic acid (OA) with the balance consisting of linoleic (8%), linolenic (2.5%) and saturated fatty acids (10.5%) (Pioneer, D., "Plenish High-Oleic Soybean Oil Technical Data," Pioneer, D., Ed. 2015, which is hereby incorporated by reference in its entirety); this high OA content presents an opportunity for the large-scale utilization of HOSO as a low-cost, renewable olefin with a single site per fatty acyl chain for controlled chemical transformation. In continuing efforts to produce comparatively lower-cost soybean oil-based alternatives to commercial waxes, an alternative to HCO from HOSO was pursued, due to the desirable bulk physical properties of the former, and sheer abundance of the latter. Initially, the effect of introducing hydroxyl functionalities into linear fatty acid diesters was examined, following leads from previous work which showed an increase in material cohesion at the cost of a decrease in hardness when introducing a diol functionality (Fei et al., "Synthesis and Characterization of Soybean Oil-Based Waxes and Their Application as Paraffin Substitute for Corrugated Coating," *J. Ind. Eng. Chem.* 58:113-122 (2018), which is hereby incorporated by reference in its entirety). HCO and its free fatty acid, (R)-12-hydroxystearic acid (HCOFFA) are single hydroxy-functionalized, on the other hand, and exhibit excellent hardness, high melting point and shine (HCO only). Accordingly, using HCO and its free fatty acid as model materials, a structure-function study of hydroxy-functionalized fatty acid derivatives was designed. It was believed that functionalizing HOSO with hydroxyl substituents could 1) result in materials with high hardness and melting point similar to HCO, 2) improve the cohesiveness of materials due to intermolecular hydrogen-bonding, and 3) create stable wax emulsions as required for commercial citrus fruit post-harvest processing, given the established use of HCO-derived commercial emulsifiers. As previously alluded to, the shine imparted by wax coatings was of principal interest as well, as it is a key quality determinant as perceived by the consumer. The diverse nature and chemical structure of different wax materials does not provide an obvious set of guidelines for predicting the shine on coated fruit, nevertheless, as a final hypothesis it was predicted that 4) the crystal morphology could be used as a determinant for shine or gloss. Thus, the overall goal was to synthesize a functional, HOSO-based coating material capable of mimicking at least some of the desirable properties of HCO in order to provide a competitive edge over existing wax materials for citrus fruit coatings.

High-oleic soybean oil was chemically functionalized in order to mimic the structure and physical properties of hydrogenated castor oil. The resulting wax-like material was evaluated for use as an alternative to other commercial wax coatings for the post-harvest treatment of fresh citrus fruit. The racemic nature of the material inhibited ordered crystalline arrangement and negatively affected its relative crystallinity (17.7%), hardness (0.59±0.04 mm$^{-1}$), and melting profile (44-46° C.), with respect to hydrogenated castor oil (37.7%, 5.33±0.01 mm$^{-1}$, 83-87° C.). Nevertheless, compounding the new material with carnauba wax imparted a very attractive gloss and prevented moisture loss significantly better than polyethylene, shellac, and carnauba wax based coatings. Compounding the hydroxy-functionalized high-oleic soybean wax may potentially reduce dependence on imported carnauba wax and other ingredients used in citrus coating emulsion formulations.

The soybean oil-derived material described in this application provides two key performance characteristics desired by citrus growers and packing houses: an efficient barrier to moisture loss and an attractive shine. The synthesis of the hydroxy-wax materials is facile and mild, and these can be readily formulated into emulsions, as necessitated for fruit coating applications. Use of the formulated coating emulsion can be extended to other agricultural commodities such as avocados, melons, and stone fruit.

δ 3.58 (m, 1H), 2.33 (t, J=7.5 Hz, 2H), 1.62 (m, 2H), 1.41 (br, 4H), 1.24 (br, 22H), 0.87 (t, J=6.1 Hz, 3H).

Figure 13:

FIG. 13 is an image showing the commercial fruit coating emulsions and new formulated emulsions after 60 days storage at room temperature (23±2° C.) in a closed system. Left to right: LS—oxidized polyethylene-based; O-Wax—carnauba wax based; STAR—shellac resin-based; ORO—organic carnauba wax-based; HBO-HOSO 100; HBO-HOSO 50-50; HBO-HOSO 30-70; HBO-HOSO 20-80; HCO 20-80. HBO-HOSO—soywax from hydroboration-oxidation of high oleic soybean oil; HCO—hydrogenated castor oil; Numbers such as 100, 50-50, 30-70, 20-80 indicate the mixing ratio of HBO-HOSO or HCO to carnauba wax.

Figure 14:
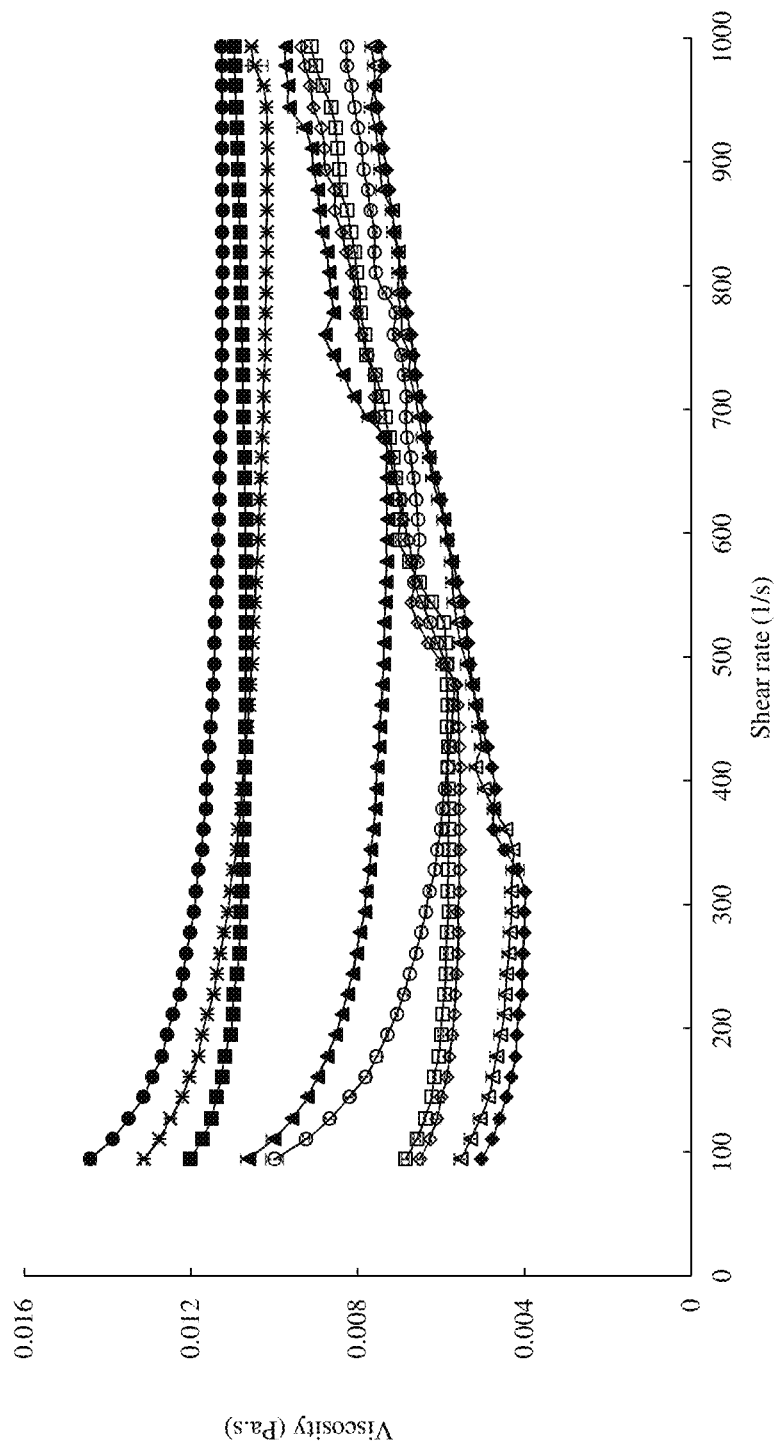

FIG. 14 is a graph showing apparent viscosity of formulated emulsions in comparison with the commercial benchmarks. HBO-HOSO—soywax from hydroboration-oxidation of high oleic soybean oil; HCO—hydrogenated castor oil. The numbers 30-70, 50-50, and 20-80 indicate the mixing ratio of HBO-HOSO or HCO to carnauba wax. □LS-Wax—oxidized polyethylene-based; ΔO-Wax—carnauba wax-based; ◆ORO—organic carnauba wax-based; ◇STAR—shellac resin-based; ✳HCO-20-80; ○HBO-HOSO-100; ●HBO-HOSO-30-70; ▲HBO-HOSO-50-50; ■HBO-HOSO-20-80.

Figure 15:
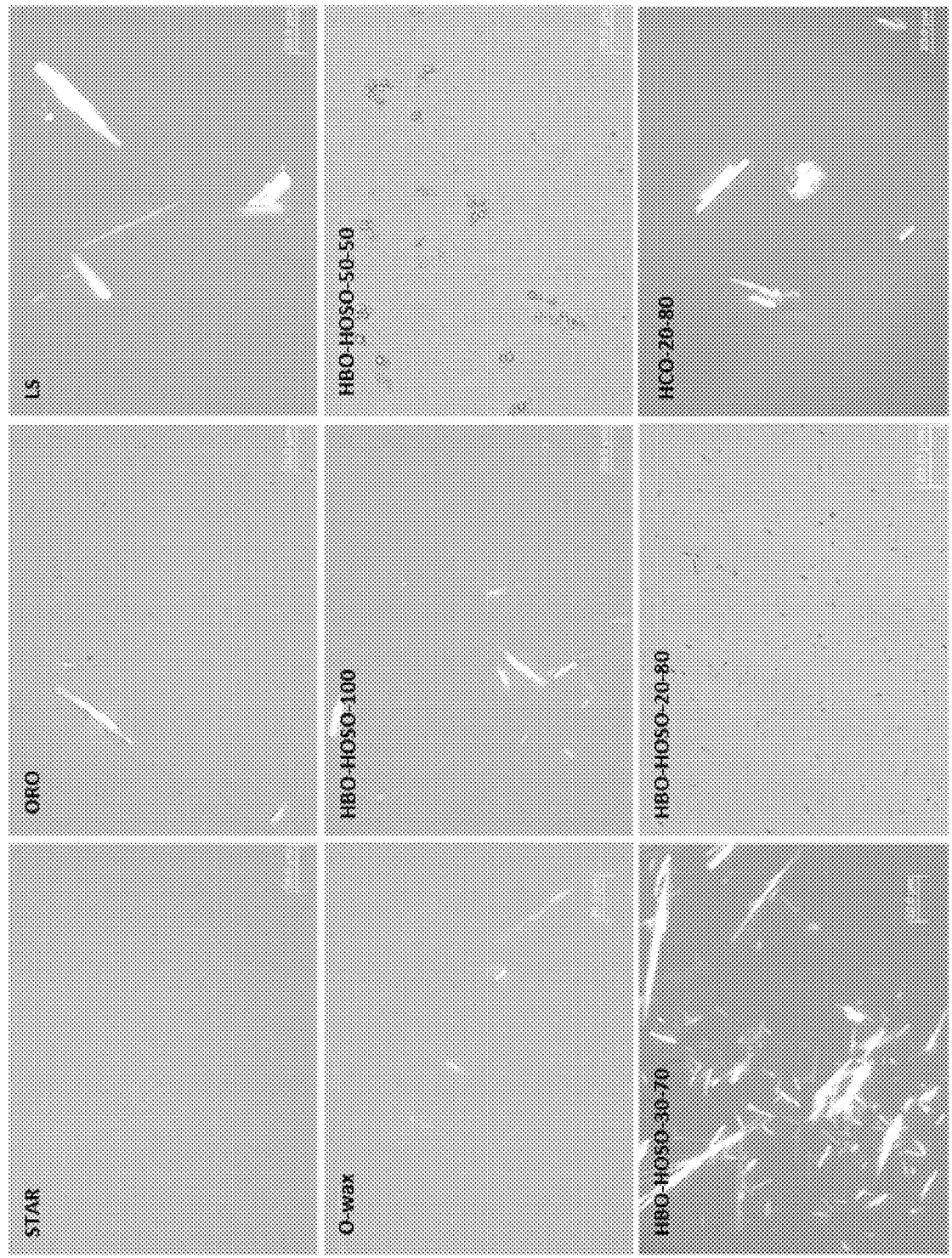

FIG. 15 shows polarized light microscopy (PLM) of emulsions. LS-Wax—oxidized polyethylene-based; O-Wax—carnauba wax-based; ORO—organic carnauba wax-based; STAR—shellac resin-based; HCO—hydrogenated castor oil; HBO-HOSO—soywax from hydroboration-oxidation of high oleic soybean oil. The numbers 30-70, 50-50, and 20-80 indicate the mixing ratio of HBO-HOSO or HCO to carnauba wax.

Figure 16A:
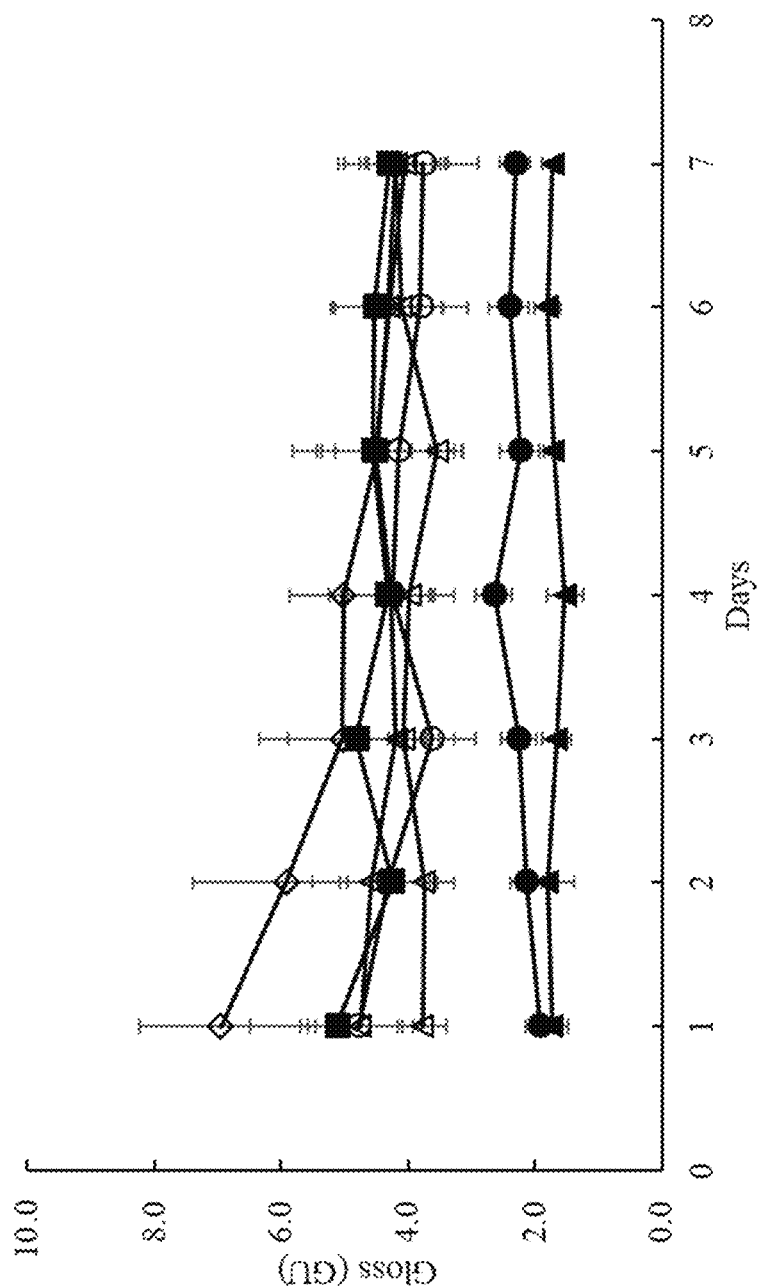
Figure 16B:
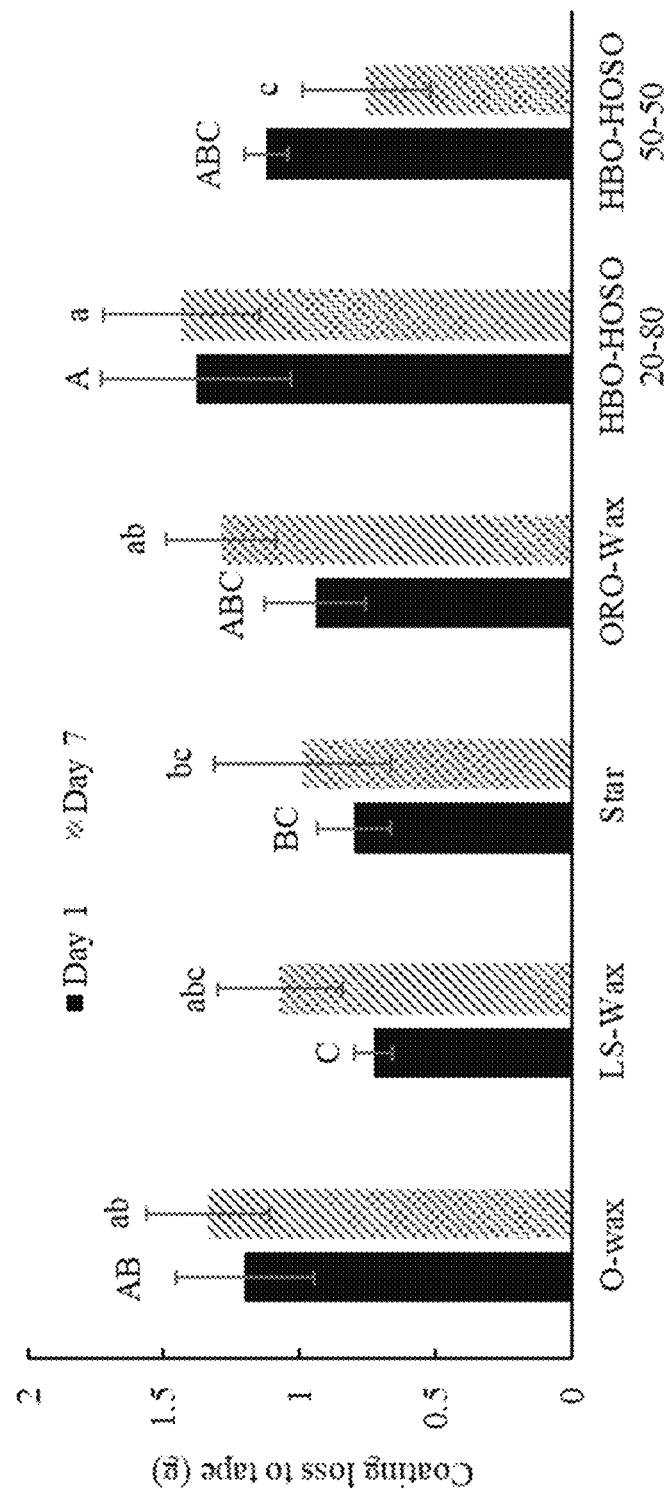

FIGS. 16A-B are graphs showing gloss of the coated fruit surface (FIG. 16A) and adherence of the coating to fruit surface (FIG. 16B)-hydroborated-oxidized high-oleic soybean oil (HBO-HOSO)-containing emulsions compared to commercial benchmarks during a 7 days storage. Means were plotted and compared, and the error bars represent standard deviations. Means followed by same letters are not significantly different at p=0.05. HBO-HOSO—soywax from hydroboration-oxidation of high oleic soybean oil. The numbers 50-50, and 20-80 indicate the mixing ratio of HBO-HOSO or HCO to carnauba wax. □Control; □LS-Wax—oxidized polyethylene-based; ΔO-Wax—carnauba wax-based; ◆ORO—organic carnauba wax-based; ◇STAR—shellac resin-based; ▲HBO-HOSO-50-50; □HBO-HOSO-20-80.

Figure 17A:
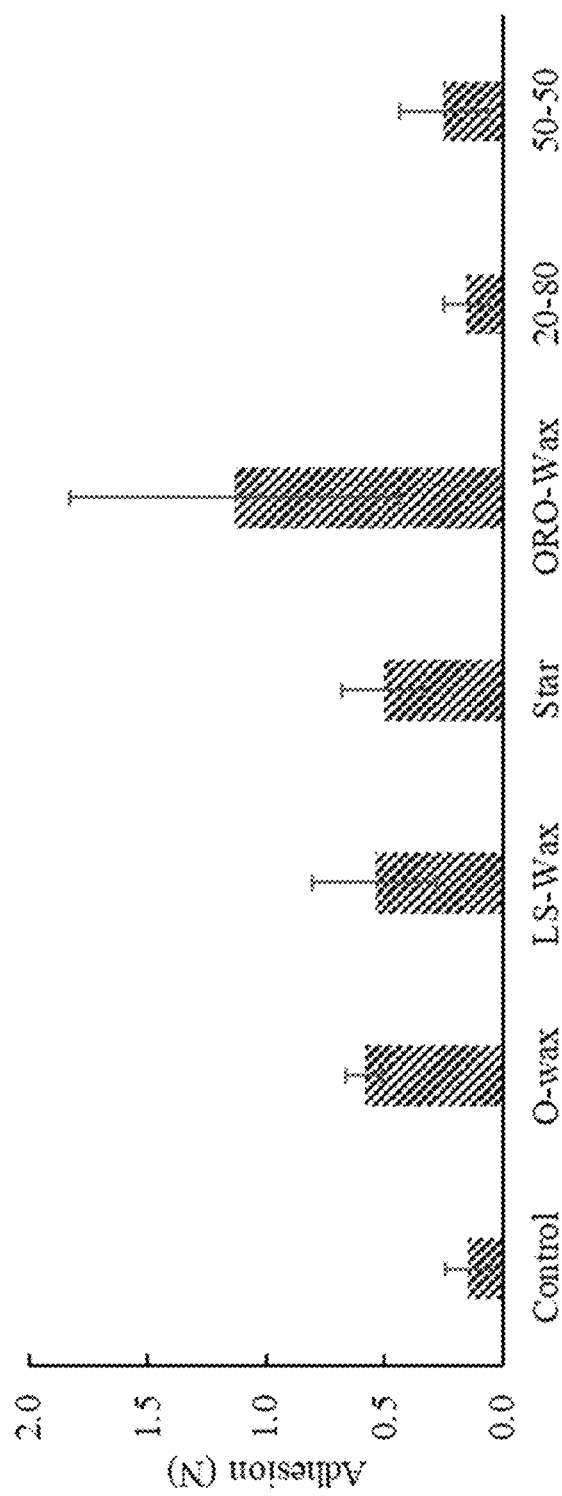
Figure 17B:
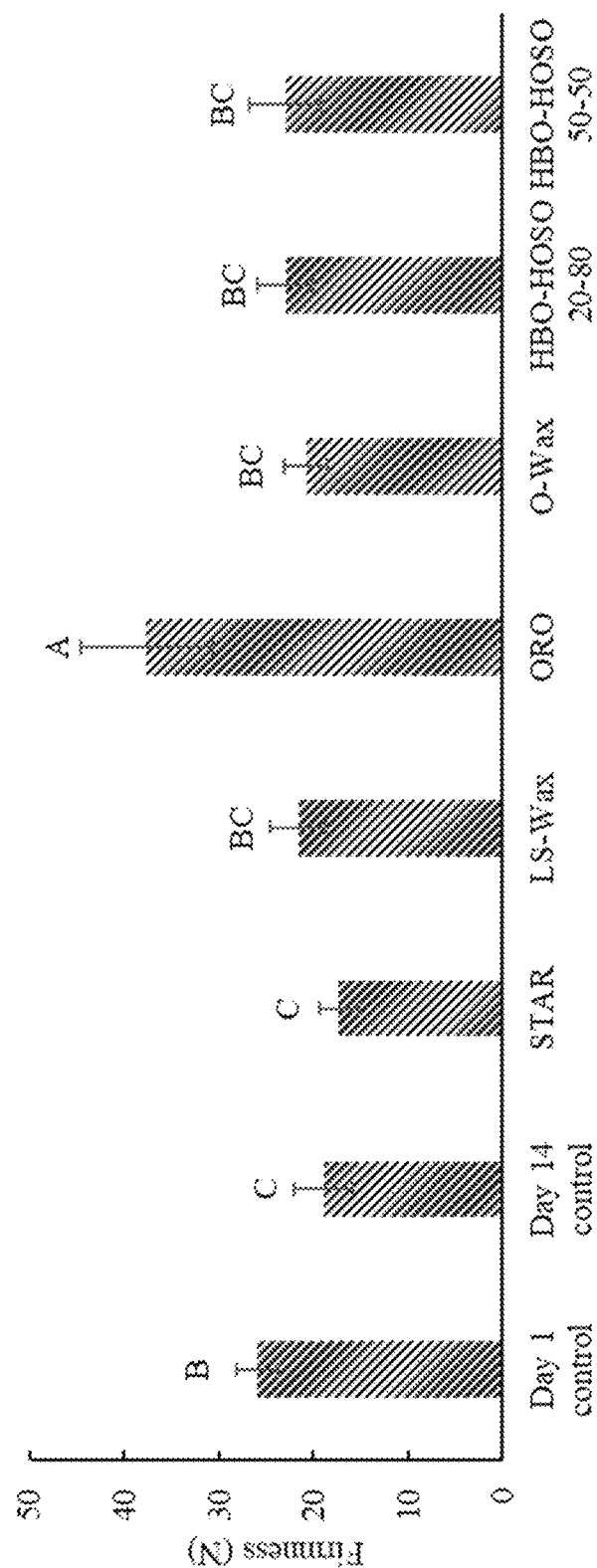
Figure 17C:
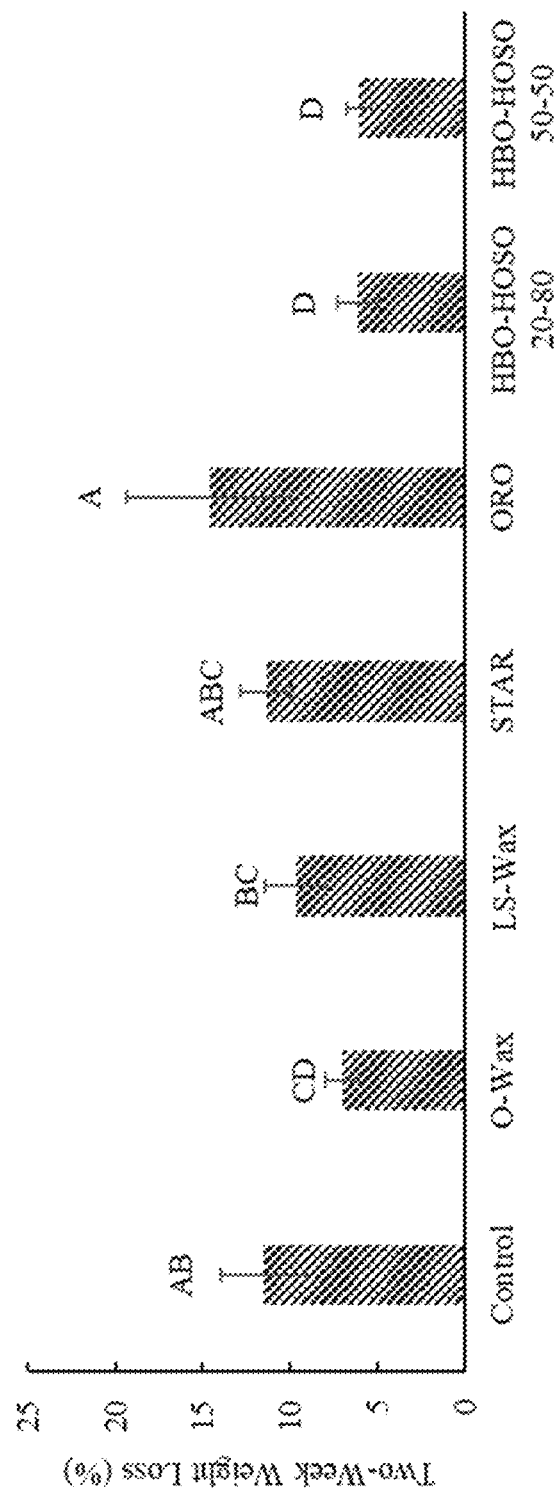

FIGS. 17A-C are graphs showing adhesion (FIG. 17A), firmness (FIG. 17B), and moisture loss of fruit during 2-weeks storage (FIG. 17C). Means were plotted and compared, and the error bars represent standard deviations. Means followed by same letters are not significantly different at p=0.05. LS-Wax—oxidized polyethylene-based; O-Wax—carnauba wax-based; ORO—organic carnauba wax-based; STAR—shellac resin-based; HBO-HOSO—soywax from hydroboration-oxidation of high oleic soybean oil. The numbers 30-70, 50-50, and 20-80 indicate the mixing ratio of HBO-HOSO or HCO to carnauba wax.

DETAILED DESCRIPTION

One aspect of the present application relates to a compound having the Formula (I):

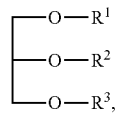

wherein
$R^1$ is H or

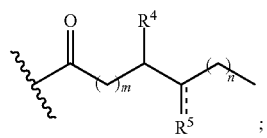

$R^2$ is H or

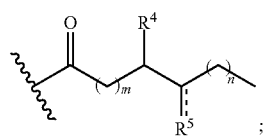

$R^3$ is H or

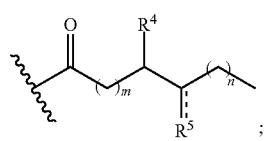

$R^4$ is H or —OH;
$R^5$ is H, —OH, or =O;

is a point of attachment of the $R^1$, $R^2$, or $R^3$ to its respective oxygen atom in the compound of Formula (I);
=== is a single or a double bond;
n is an integer from 1 to 13;
m is an integer from 2 to 19;
wherein at least one of $R^1$, $R^2$, or $R^3$ is

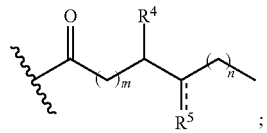

and
wherein when $R^4$ is H then $R^5$ is —OH or =O;
wherein when $R^5$ is H then $R^4$ is —OH;
with the proviso that 1) when m is 5 and n is 5, then $R^4$ is not OH; 2) when m is 7 and n is 7, then $R^4$ is not OH; 3) when m is 8 and n is 6, then $R^4$ is not OH; 4) when $R^2$ is H, $R^3$ is H, m is 15, and n is 5, then $R^4$ is not OH; or a stereoisomer thereof.

As used above, and throughout the description herein, the following terms, unless otherwise indicated, shall be understood to have the following meanings. If not defined otherwise herein, all technical and scientific terms used herein have the same meaning as is commonly understood by one of ordinary skill in the art to which this technology belongs. In the event that there is a plurality of definitions for a term herein, those in this section prevail unless stated otherwise.

According to the present application, n in the compounds of Formula (I) can be any integer from 1 to 13. Preferably, n is 1, 2, 3, 4, 5, 6, 7, 8, 9, 10, 11, 12, or 13. More preferably, n is 5, 6, or 7.

According to the present application, m in the compounds of Formula (I) can be any integer from 2 to 19. Preferably, m is 2, 3, 4, 5, 6, 7, 8, 9, 10, 11, 12, 13, 14, 15, 16, 17, 18, or 19. More preferably, m is 7, 8, or 9.

In one embodiment, the compound of Formula (I) is the compound of Formula (Ia):

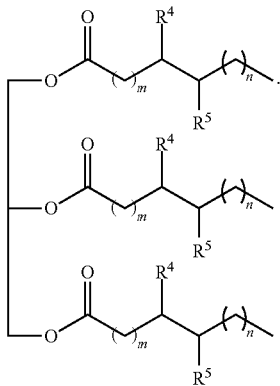

(Ia)

In another embodiment, the compound of Formula (I) is the compound of Formula (Ib):

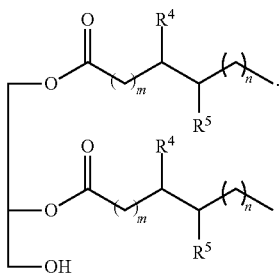

(Ib)

In another embodiment, the compound of Formula (I) is the compound of Formula (Ic):

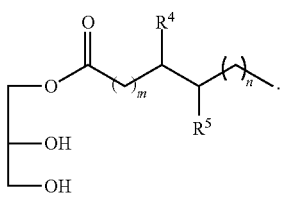

(Ic)

In yet another embodiment, the compound of Formula (I) is the compound of Formula (Id):

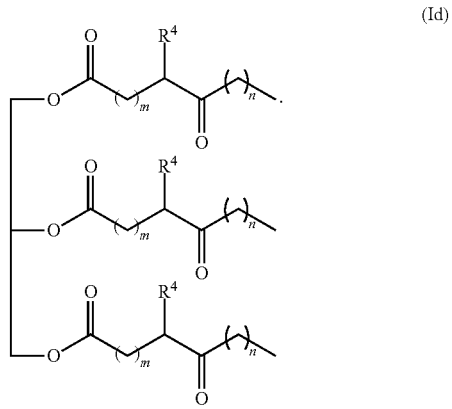

(Id)

In a further embodiment, the compound of Formula (I) is selected from the group consisting of

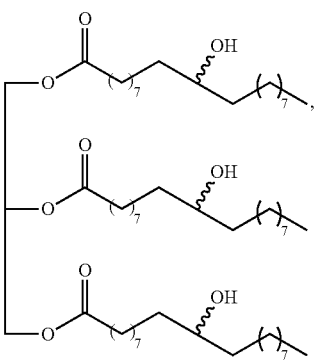

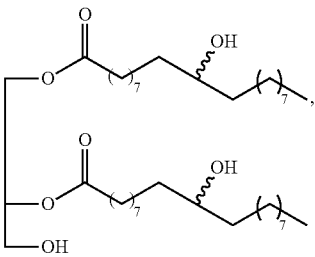

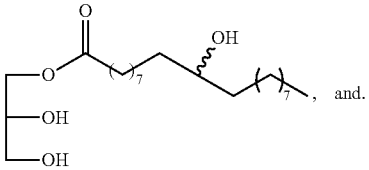

-continued

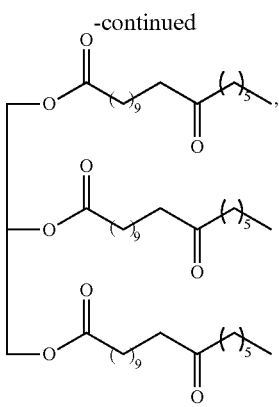

and

indicates a bond between adjacent carbons where the —OH is bonded to one of the adjacent carbons:

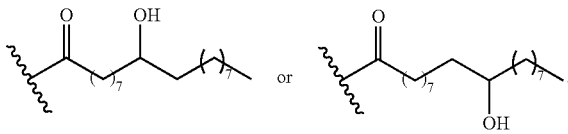

Another aspect of the present application relates to a wax composition comprising:
(a) a wax; and
(b) a compound of Formula (I):

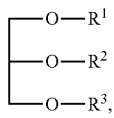
(I)

wherein
$R^1$ is H or

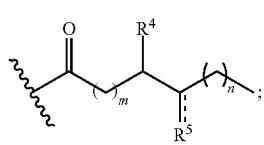

$R^2$ is H or

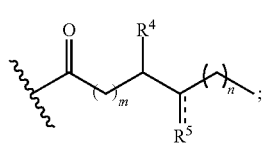

$R^3$ is H or

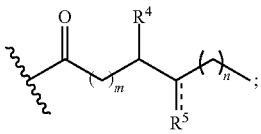

$R^4$ is H or —OH;
$R^5$ is H, —OH, or =O;

is a point of attachment of the $R^1$, $R^2$, or $R^3$ to its respective oxygen atom in the compound of Formula (I);
=== is a single or a double bond;
n is an integer from 1 to 13;
m is an integer from 2 to 19;
wherein at least one of $R^1$, $R^2$, or $R^3$ is

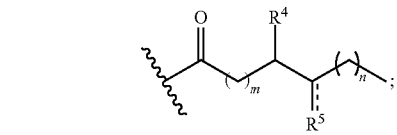

and
wherein when $R^4$ is H then $R^5$ is —OH or =O;
wherein when $R^5$ is H then $R^4$ is —OH;
or a stereoisomer thereof,
wherein the wax and the compound of Formula (I) are mixed together.

According to the present application, the compound of Formula (I) can be mixed with the wax at any temperature. For example, the mixing can be done at the room temperature or at the melting point of the wax. For example, the mixing can be performed at the temperature below 400° C., below 350° C., below 300° C., below 250° C., below 200° C., below 190° C., below 180° C., below 170° C., below 160° C., below 155° C., below 150° C., below 145° C., below 140° C., below 135° C., below 130° C., below 125° C., below 120° C., below 115° C., below 110° C., below 105° C., below 100° C., below 95° C., below 90° C., below 85° C., below 80° C., below 70° C., below 60° C., below 50° C., below 40° C., or below 30° C.

According to the present application, the compound of Formula (I) can be mixed with the wax neat or in the presence of a solvent. Suitable solvent that can be used include water, ethanol, ether, and chloroform.

Equipment for carrying out such mixing of wax includes magnetic stirrer, hand-hold mixer, grinder, homogenizer, and sonicator.

A wax composition according to the present application, can contain any suitable wax, functionalized or synthetic waxes or naturally occurring waxes. Non-exclusive examples of synthetic waxes include ethylene bis-stearamide wax (EBS), Fischer-Tropsch wax (FT), oxidized Fischer-Tropsch wax (FTO), polyolefin waxes such as polyethylene wax (PE), oxidized polyethylene wax (OxPE), polypropylene wax, polypropylene/polyethylene wax, alcohol wax, silicone wax, petroleum waxes such as microcrystalline wax or paraffin, and other synthetic waxes. Non-exclusive examples of functionalized waxes include amine waxes, amide waxes, ester waxes, carboxylic acid waxes, and microcrystalline waxes. Naturally occurring wax may be derived from a plant, from an animal, or from a mineral, or from other sources known now or in the future. Non-exclusive examples of natural waxes include plant waxes such as candelilla wax, carnauba wax, rice wax, Japan wax and jojoba oil; animal waxes such as beeswax, lanolin and whale wax; and mineral waxes such as montan wax, ozokerite and ceresin.

In one embodiment, the wax is selected from the group consisting of carnauba wax, bees wax, candwlilla wax, shellac resin wax, rice bran wax, sugarcane wax, and sorghum wax. In another embodiment, wax is carnauba wax.

In yet another embodiment, the wax is selected from the group consisting of oxidized polyethylene (LS-Wax), carnauba wax, bees wax, candwlilla wax, shellac resin wax, rice bran wax, sugarcane wax, and sorghum wax.

In one embodiment, the wax composition contains the compound of Formula (I) that is selected from the group consisting of

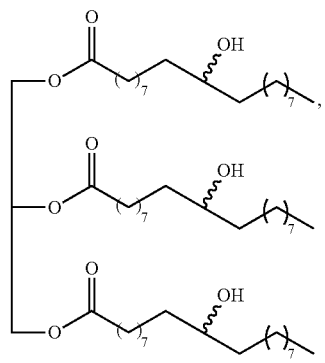

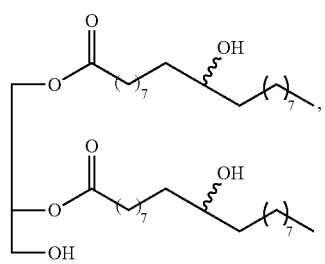

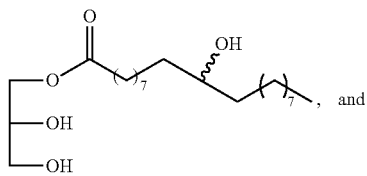

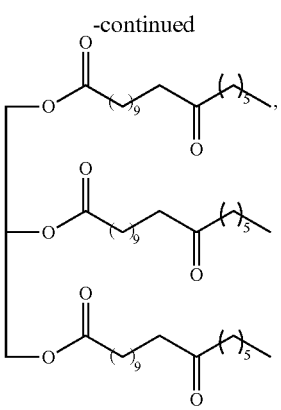

a mixture thereof;
wherein

indicates a bond between adjacent carbons where the —OH is bonded to one of the adjacent carbons:

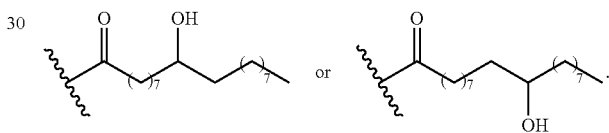

In another embodiment, compound of Formula (I) is prepared from high oleic plant oil. Preferably, compound of Formula (I) is prepared from high-oleic soybean oil, sunflower oil, canola oil, safflower oil, or hydrogenated castor oil.

The wax composition of the present application can contain one or more compounds of formula (I).

The wax composition of the present application can contain various amounts of the wax and compound of Formula (I). Preferably, the wax composition contains from 30 wt % to 99 wt % of the wax, from 35 wt % to 99 wt % of the wax, from 40 wt % to 95 wt % of the wax, from 50 wt % to 90 wt % of the wax, from 55 wt % to 85 wt % of the wax, from 60 wt % to 80 wt % of the wax, from 65 wt % to 75 wt % of the wax, from 50 wt % to 85 wt % of the wax, from 50 wt % to 80 wt % of the wax, from 50 wt % to 75 wt % of the wax, from 50 wt % to 70 wt % of the wax, from 50 wt % to 65 wt % of the wax, from 50 wt % to 60 wt % of the wax, from 55 wt % to 80 wt % of the wax, from 55 wt % to 75 wt % of the wax, from 55 wt % to 70 wt % of the wax.

Preferably, the wax composition contains from 1 wt % to 70 wt % of the compound of Formula (I), from 5 wt % to 70 wt % of the compound of Formula (I), from 10 wt % to 70 wt % of the compound of Formula (I), from 10 wt % to 65 wt % of the compound of Formula (I), from 10 wt % to 60 wt % of the compound of Formula (I), from 10 wt % to 55 wt % of the compound of Formula (I), from 10 wt % to 50 wt % of the compound of Formula (I), from 15 wt % to 50 wt % of the compound of Formula (I), from 20 wt % to 50 wt % of the compound of Formula (I), from 25 wt % to 50 wt % of the compound of Formula (I), from 30 wt % to 50
wt % of the compound of Formula (I), from 35 wt % to 50
wt % of the compound of Formula (I), from 40 wt % to 50
wt % of the compound of Formula (I), from 10 wt % to 45
wt % of the compound of Formula (I), from 10 wt % to 40
wt % of the compound of Formula (I), from 10 wt % to 35
wt % of the compound of Formula (I), from 10 wt % to 30
wt % of the compound of Formula (I), from 10 wt % to 25
wt % of the compound of Formula (I), from 10 wt % to 20
wt % of the compound of Formula (I).

In one embodiment, the wax ranges from 30 wt % to 99 wt % of the wax composition, and the compound of Formula (I) ranges from 70 wt % to 1 wt % of the wax composition.

In another embodiment, the wax ranges from 50 wt % to 90 wt % of the wax composition, and the compound of Formula (I) ranges from 50 wt % to 10 wt % of the wax composition.

A wide variety of emulsifiers, well known in the art of food or plant coatings, can be used in preparing the wax composition according to the present application. In certain embodiments, the emulsifier is an edible emulsifier selected from non-ionic emulsifier, anionic emulsifier, and mixtures thereof. In some embodiments, the emulsifier enables the wax composition to be in a liquid form at room temperature. The emulsifier may facilitate the solubility of the wax composition in the coating. The emulsifier may serve as a pH modifier of the coating. Nonlimiting examples of suitable emulsifiers include morpholine, ammonia, lecithin, ethylene glycol monostearate, ammonium lauryl sulfate, sodium steroyl-2-lactylate, potassium oleate, propylene glycol monostearate, sodium alkyl sulfate, and polyglycol.

A wide variety of surfactants can be used in preparing the wax composition according to the present application. Nonlimiting examples of suitable surfactants include diglycerin, glycerin, glycerol, glycerol polymers, glycol, glycol stearate, glycol stearate SE, carboxylic acid, propylene glycol, avocado oil, honey, glyceryl distearate, glyceryl hydroxystearate, glyceryl laurate, glyceryl linoleate, glyceryl myristate, glyceryl oleate, glyceryl stearate, palmitic acid, paraffin, propylene glycol, propylene glycol dipelargonate, propylene glycol laurate, and propylene glycol stearate.

According to the present application, the wax composition may further contain at least one viscosity agent. Suitable viscosity agents include sodium polyacrylate, ethylhexyl stearate, and trideceth-6.

According to the present application, the wax composition may further contain one or more additives, such as antifoaming agents, preservative agents, adhesive agents, cross-linking agents, plasticizers, and surface-tension reducing agents. Exemplary additives include, but are not limited to polydimethylsiloxane (PDMS), potassium carbonate, sodium bisulfite, sodium benzoate, sodium propionate, calcium propionate, benzoic acid, potassium sorbate, polyethylene glycol, glycerol, propylene glycol, sorbitol, mannitol, and high laurate canola oil. Exemplary preservative that can be used according to the present application include propylparaben, methylparaben, phenoxyethanol, methylisothiazolinone, methylchloroisothiazolinone, and other parabens.

According to the present application, the wax composition may further contain one or more antioxidants. Suitable antioxidants include, but are not limited to, tocopherol, butylated hydroxytoluene (BHT), butylated hydroxyanisole (BHA), tertiary butylhydroquinone (TBHQ), ethylenediaminetetracetic acid (EDTA), gallate esters (i.e. propyl gallate, butyl gallate, octyl gallate, dodecyl gallate, etc.), tocopherols, citric acid, citric acid esters (i.e. isopropyl titrate, etc.), gum guaiac, nordihydroguaiaretic acid (NDGA), thiodipropionic acid, ascorbic acid, ascorbic acid esters (i.e. ascorbyl palmitate, ascorbyl oleate, ascorbyl stearate, etc.) tartaric acid, lecithin, methyl silicone, polymeric antioxidant (Anoxomer) plant (or spice and herb) extracts (i.e. rosemary, sage, oregano, thyme, marjoram, etc.), and mixtures thereof.

According to certain embodiments, the wax composition further comprises at least one complex sugar. Suitable complex sugars include, but are not limited to, fructose, glucose, sucrose, sucrose fatty acid ester, sucrose acetate isobutyrate (SAIB), and sorbitol.

According to certain embodiments, the wax composition further comprises one or more free fatty acids. Suitable free fatty acids that can be used include myristoleic acid, palmitoleic acid, oleic acid, caprylic acid, capric acid, lauric acid, myristic acid, and stearic acid.

According to certain embodiments, the wax composition further comprises a base. Suitable free fatty acids that can be used include ammonium hydroxide, sodium hydroxide, potassium hydroxide, piperidine, morphiline, dodemorph, tridemorph, aldimorph, fenpropimorph, amorolfine, and silicon functionalized morpholine.

According to certain embodiments, the wax composition further comprises one or more fungicides. Suitable fungicides that can be used include imazalil (IMZ), thiabendazole (TBZ), ortho-phenylphenol (OPP), sodium orthophenylphenol (SOPP), pyrimethanil (PYR), fludioxonil (FLU), and azoxystrobin (AZX).

According to certain embodiments, the wax composition further comprises commercial emulsions made from CAR (O-Wax and ORO).

Another aspect of the present application relates to a process for preparing a wax emulsion composition comprising:

providing a compound of Formula (I):

wherein
$R^1$ is H or

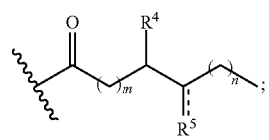

$R^2$ is H or

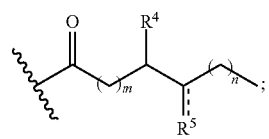

$R^3$ is H or

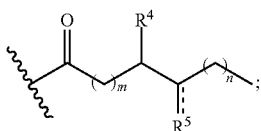

$R^4$ is H or —OH;
$R^5$ is H, —OH, or =O;

is a point of attachment of the $R^1$, $R^2$, or $R^3$ to its respective oxygen atom in the compound of Formula (I);
=== is a single or a double bond;
n is an integer from 1 to 13;
m is an integer from 2 to 19;
wherein at least one of $R^1$, $R^2$, or $R^3$ is

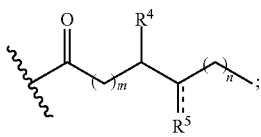

and
wherein when $R^4$ is H then $R^5$ is —OH or =O;
wherein when $R^5$ is H then $R^4$ is —OH;
or a stereoisomer thereof;
providing a wax;
blending the compound of compound of Formula (I) and the wax together to form a mixture;
heating the mixture until molten;
adding a base to the molten mixture;
homogenizing the molten mixture to which the base has been added under conditions effective to produce a hot emulsion; and
cooling the emulsion.

Suitable bases that can be used according to the present application are selected from the group consisting of ammonium hydroxide, sodium hydroxide, potassium hydroxide, piperidine, and morphiline.

In one embodiment, said providing compound of Formula (I) comprises providing a mixture comprising one or more compounds of Formula (I).

In another embodiment, the mixture comprising one or more compounds of Formula (I) is prepared from soybean oil.

In yet another embodiment, the mixture comprising one or more compounds of Formula (I) is prepared from high-oleic soybean oil.

In a further embodiment, the mixture comprising one or more compounds of Formula (I) is prepared from hydrogenated castor oil.

In one embodiment, said blending the mixture of the compound of compound of Formula (I) and the wax comprises:
providing a one or more free fatty acids;
blending the compound of compound of Formula (I), the wax, and the one or more free fatty acids together to form a mixture.

Suitable free fatty acids that can be used include myristoleic acid, palmitoleic acid, oleic acid, caprylic acid, capric acid, lauric acid, myristic acid, and stearic acid.

In a further embodiment, the mixture comprising one or more compounds of Formula (I) contains at least 99 wt % of one or more compounds of Formula (I), at least 95 wt % of one or more compounds of Formula (I), at least 90 wt % of one or more compounds of Formula (I), at least 85 wt % of one or more compounds of Formula (I), at least 80 wt % of one or more compounds of Formula (I), at least 75 wt % of one or more compounds of Formula (I), at least 70 wt % of one or more compounds of Formula (I), at least 65 wt % of one or more compounds of Formula (I), at least 60 wt % of one or more compounds of Formula (I), at least 55 wt % of one or more compounds of Formula (I), at least 50 wt % of one or more compounds of Formula (I).

Another aspect of the present application relates to a process for coating a plant or plant part comprising:
providing a compound of Formula (I):

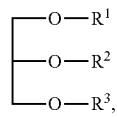

(I)

wherein
$R^1$ is H or

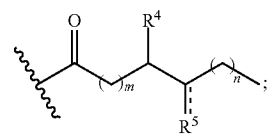

$R^2$ is H or

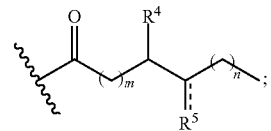

$R^3$ is H or

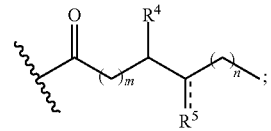

$R^4$ is H or —OH;
$R^5$ is H, —OH, or =O;

is a point of attachment of the $R^1$, $R^2$, or $R^3$ to its respective oxygen atom in the compound of Formula (I);

=== is a single or a double bond;
n is an integer from 1 to 13;
m is an integer from 2 to 19;
wherein at least one of R¹, R², or R³ is

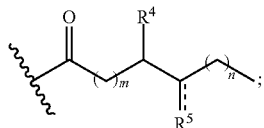

and
wherein when R⁴ is H then R⁵ is —OH or =O;
wherein when R⁵ is H then R⁴ is —OH;
or a stereoisomer thereof; and
coating a plant or plant part with the compound of Formula (I) under conditions effective to produce a coated plant or plant part.

In one embodiment, the compound of Formula (I) is provided in an emulsion with a wax.

According to the present application, when coating is applied on a plant or plant part, the coating can have different thickness. One of the parameters that can be used to describe the coating is the mass applied per unit area (e.g., milligrams of wax coating per cm² of coated surface ("mg/cm²")).

According to the present application, the coating on the plant or plant part has a mass of wax coating per unit area of coated surface of from 0.05 to 10 mg/cm², from 0.05 to 9 mg/cm², from 0.05 to 8 mg/cm², from 0.05 to 7 mg/cm², from 0.05 to 6 mg/cm², from 0.05 to 5 mg/cm², from 0.05 to 4 mg/cm², from 0.05 to 3 mg/cm², from 0.05 to 2 mg/cm², from 0.05 to 1 mg/cm², from 0.05 to 0.5 mg/cm², from 0.06 to 0.5 mg/cm², from 0.07 to 0.5 mg/cm², from 0.08 to 0.5 mg/cm², from 0.09 to 0.5 mg/cm², from 0.1 to 0.5 mg/cm², from 0.1 to 0.4 mg/cm², from 0.1 to 0.3 mg/cm², from 0.1 to 0.2 mg/cm². Preferably, the coating on the plant or plant part has a mass of wax coating per unit area of coated surface of 0.05 mg/cm², 0.06 mg/cm², 0.07 mg/cm², 0.08 mg/cm², 0.09 mg/cm², 0.1 mg/cm², 0.11 mg/cm², 0.12 mg/cm², 0.13 mg/cm², 0.14 mg/cm², 0.15 mg/cm², 0.16 mg/cm², 0.17 mg/cm², 0.18 mg/cm², 0.19 mg/cm², 0.2 mg/cm², 0.21 mg/cm², 0.22 mg/cm², 0.23 mg/cm², 0.24 mg/cm², 0.25 mg/cm², 0.26 mg/cm², 0.27 mg/cm², 0.28 mg/cm², 0.29 mg/cm², 0.3 mg/cm². More preferably, the coating on the plant or plant part has a mass of wax coating per unit area of coated surface of 0.14 mg/cm².

As used herein, plant or plant part is broadly defined to include intact plants and any part of a plant, including but not limited to fruit, vegetables, leaves, stalks, roots, root tips, and the like. In particular embodiments, the plant or plant part is a fruit or a vegetable. Suitable plant or plant parts include, but are not limited to, apple, tomato, cucumber, celery, pear, peppers, beans, squash, melons, cantaloupe, papaya, guava, atemoya, passion fruit, persimmon, apricot, nectarine, lychees, carambolas, mango, pineapple, avocado, plum, cherry, peach, apricot, nectarine, grape, strawberry, raspberry, blueberry, cranberry, gooseberry, banana, fig, clementine, kumquat, orange, grapefruit, tangerine, mandarin, lemon, lime, pommelo, Litchi, sugar cane, sugarbeet, potato, carrot, arundo, and switchgrass. Preferably, the plant or plant part is a fruit. More preferably, the plant or plant part is a citrus (e.g., clementine, kumquat, orange, grapefruit, tangerine, mandarin, lemon, lime, and the like).

The composition containing a compound of Formula (I) may be applied undiluted or may be diluted prior to application. For example, the composition may be diluted from about 4 to about 100 volumes of water prior to application.

The process of applying a composition containing a compound of Formula (I) to the plant or plant part to produce a coated plant or plant part can be conducted at any time before or after harvest. For example, the composition containing a compound of Formula (I) may be applied to fruit trees during any stage of fruit growth or when fruits are susceptible to cracking or before anticipated rain. For suppression of cracking, the wax emulsions are typically applied during the development or the ripening of the fruits close to maturity, for example, within two weeks of maturity. There may be a single application of the composition containing a compound of Formula (I) or the composition can be administered to the fruit trees in two, three, four, or more applications.

Any method for applying a composition containing a compound of Formula (I) to the plant or plant part to produce a coated plant or plant part can be used according to the present application. For instance, a composition containing the compound of Formula (I) can be applied to the surface of a plant or plant part by rubbing the composition onto the surface of the plant or plant part (e.g., by using rubber gloves), by dipping or immersing the plant or plant part in the composition containing the compound of Formula (I), by spraying the composition containing the compound of Formula (I) onto the plant or plant part, pouring the composition containing the compound of Formula (I) onto the plant or plant part (e.g., when the plant or plant part is moving on a conveyor belt).

One embodiment of the present application relates to a coated fruit prepared by any of the processes described above.

Another embodiment of the present application relates to a fruit coated with the wax composition as described above.

According to the present application, the wax compositions, wax emulsions, and the coatings made from the wax compositions and wax emulsions have an antimicrobial activity. In some embodiments, the wax compositions, wax emulsions, and the coatings made from the wax compositions and wax emulsions have an antifungal activity.

In one embodiment, the coating is carried out under conditions effective to impart antifungal properties to the coated plant or plant parts.

Such antifungal activity is helpful to protect a plant or plant part from the following fungi: *Aspergillus niger* and *Penicillium* spp.

In another embodiment, the coating is carried out under conditions effective to impart antimicrobial properties to the coated plant or plant parts.

Such antimicrobial activity is helpful to protect a plant or plant part from *Salmonella* and *Listeria*.

According to the present application, when the compound of Formula (I) is provided in an emulsion with a wax, other ingredients such as biocides or other stabilizers can be added to the emulsions, and these agents are known to those skilled in the art. Biocides, and/or antimicrobial agents may be added to the emulsion, the choice of a particular biocide or antimicrobial often being dependent upon the end use of the emulsion. Parabens such as methyl or ethyl hydroxy parabenzoic acid, or quaternary ammonium compounds, are among the biocides which may be used, other compounds are known to those skilled in the art. Buffering agents and thickeners, also known to those skilled in the art, may be added to the emulsions of the present application. Common preservatives such as formaldehyde are sometimes used and the subject of regulatory agencies such as the Food and Drug Administration and Environmental Protection Agency.

According to the present application, the wax emulsion compositions may further comprise an osmoregulator. The term "osmoregulator" refers to a substance that increases the osmotic potential of the wax emulsion and thereby slows the uptake of water by fruit, such as cherries, or vegetables. Suitable osmoregulators include any osmoregulator known in the art that does not cause phytotoxicity. Suitable osmoregulators include a calcium salt, for example calcium chloride, calcium nitrate, calcium hydroxide, calcium acetate, Opti-Cal (Pace International, Seattle, Wash.), and Mira-Cal (Nutrient Technologies, La Habra, Calif.). The concentration of calcium salt in the wax emulsion is typically between about 0.01% to about 5% (weight/volume), such as between about 0.1% and 1%. Other suitable osmoregulators include, but are not limited to, salts that dissociate into monovalent cations and anions (e.g., potassium chloride or potassium nitrate) sugars (e.g., sucrose), amino acids (e.g., lysine) and boric acid. For example, potassium chloride may be used as an osmoregulator, for example, at a concentration of about 0.001 to 5% (w/v). In some embodiments, the wax emulsion comprises about 0.001 to 5% lysine as an osmoregulator.

According to some embodiments, the method of the present application extends the shelf life of plant or plant parts treated according to the present application by reducing the extent of weight loss during storage. According to some embodiments, the weight loss of a plant or plant parts coated with the composition of the present application is reduced by at least 20%, preferably by at least 30%; preferably by at least 40%; and most preferably by about 50% as compared to an uncoated plant or plant parts under same storage conditions. According to some embodiments, the method of the present application achieves extended shelf life of the plant or plant parts for between several days to several weeks beyond the shelf life of uncoated plant or plant parts under the same storage conditions. According to some embodiments, the shelf life of plant or plant parts coated with the formulation of the present application is doubled compared to the shelf life of an uncoated plant or plant parts under the same storage conditions.

The above disclosure is general. A more specific description is provided below in the following examples. The examples are described solely for the purpose of illustration and are not intended to limit the scope of the present application. Changes in form and substitution of equivalents are contemplated as circumstances suggest or render expedient. Although specific terms have been employed herein, such terms are intended in a descriptive sense and not for purposes of limitation.

EXAMPLES

The following Examples are presented to illustrate various aspects of the present application, but are not intended to limit the scope of the claimed application.

Example 1—Materials and Methods

Figure 8:
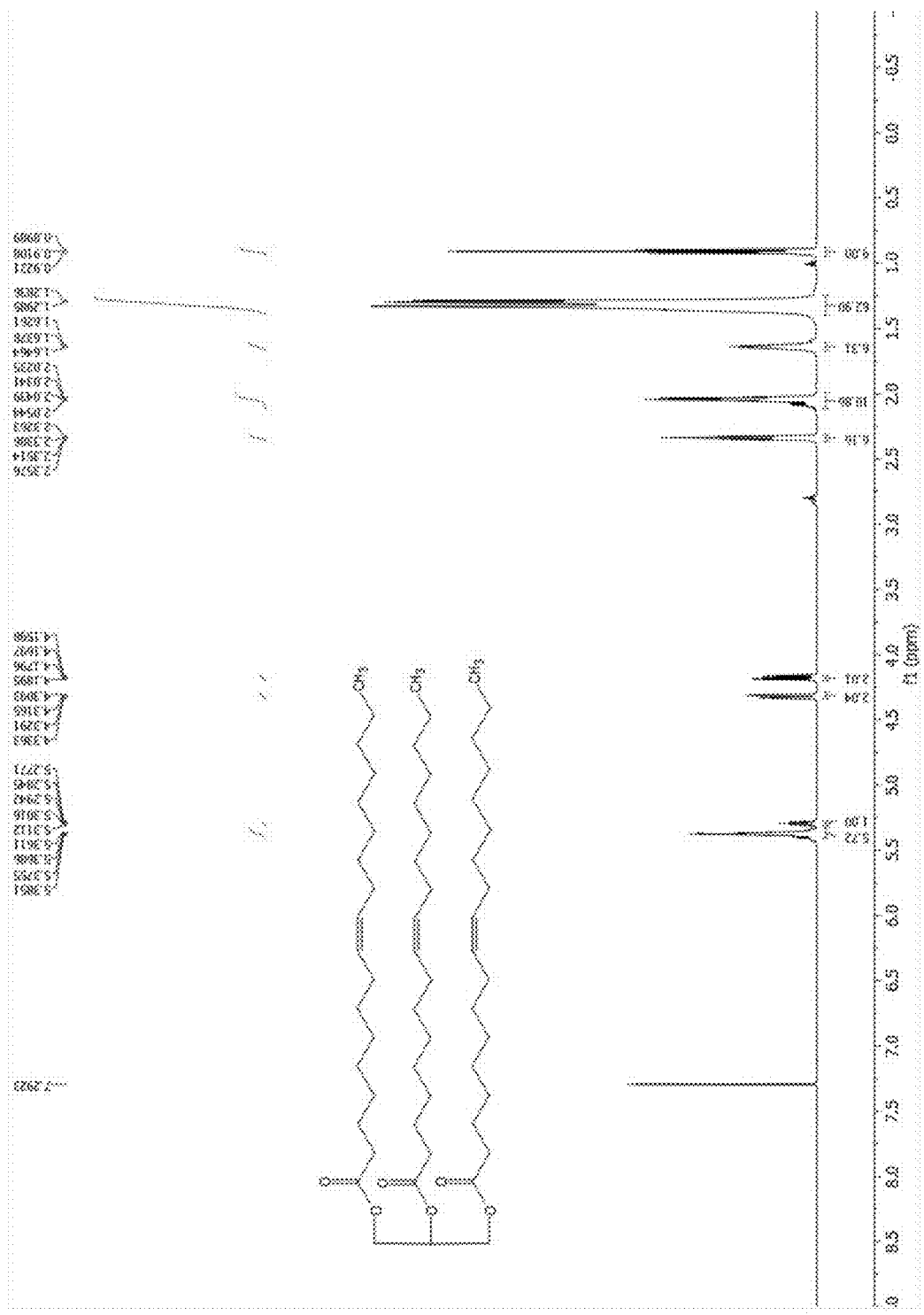
FIG. 8 is an $^1$H NMR spectrum of High-oleic Soybean Oil (HOSO, 1). $^1$H NMR (600 MHz, CDCl$_3$): δ 5.37 (q, J=5.1, 4.5 Hz, 6H), 5.29 (m, J=5.1, 4.5 Hz, 1H), 4.32 (dd, J=11.9, 4.3 Hz, 2H), 4.17 (dd, J=11.9, 6.0 Hz, 2H), 2.37-2.31 (m, 6H), 2.04 (m, 11H), 1.67-1.61 (m, 6H), 1.29 (br, J=8.9 Hz, 63H), 0.91 (t, J=7.0 Hz, 9H).
Figure 11:
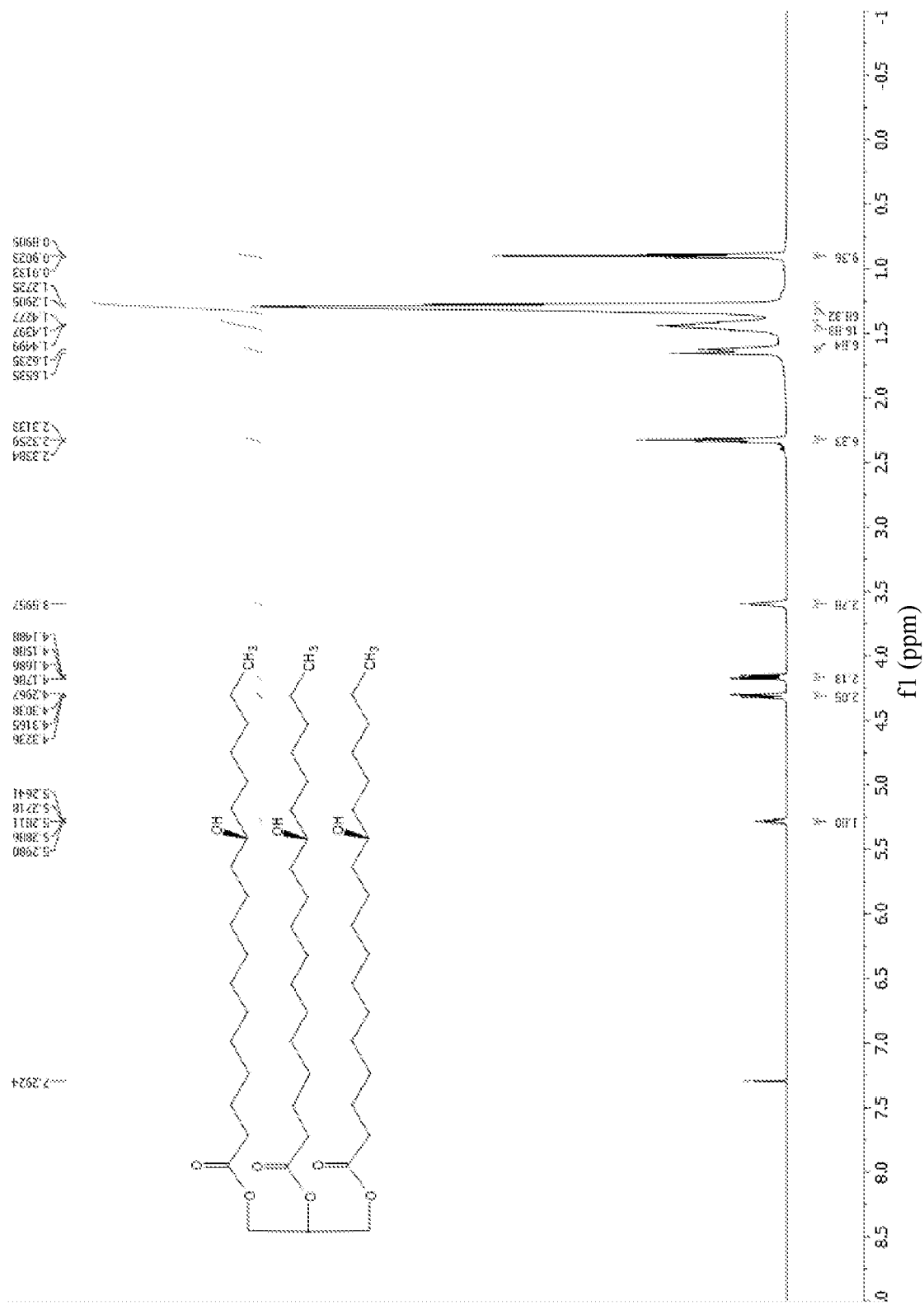
FIG. 11 is an $^1$H NMR spectrum of Hydrogenated Castor oil (HCO; 5). $^1$H NMR (600 MHz, CDCl$_3$): δ 5.28 (m, 1H), 4.31 (dd, J=11.9, 4.3 Hz, 2H), 4.16 (dd, J=11.9, 6.0 Hz, 2H), 3.60 (s, 3H), 2.33 (t, J=7.5 Hz, 6H), 1.64 (m, 6H), 1.44 (m, 18H), 1.29 (br, 68H), 0.90 (t, J=6.8 Hz, 9H).

Plenish high-oleic soybean oil (HOSO, NMR spectra as shown in FIG. 8) was provided by DuPont. Hydrogenated castor oil (HCO, NMR spectra as shown in FIG. 11) was provided by Acme-Hardesty Oleochemicals Co (Blue Bell, PA), paraffin wax was provided by Michelman (Cincinnati, OH). Commercial citrus coating microemulsions, 0-Wax (carnauba based), LS-Wax (polyethylene based), ORO (carnauba based) and Star-O (shellac based), as well as freshly harvested, washed and uncoated Valencia oranges were provided by Fruit Growers Supply, LLC (Exeter, CA). Methyl oleate (90%, Alfa Aesar), oleic acid (90% Alfa Aesar), stearic acid, lauric acid (90% Alfa Aesar), lactic acid (80%, Fisher) hydrogen peroxide (30%, Fisher), glacial acetic acid, ammonium hydroxide (Fisher), dry Amberlyst-15 acid catalyst resin (MilliporeSigma), polyethylene glycol 200 (PEG, Tokyo Chemical Industry (TCI)), borane-tetrahydrofuran complex (BTHF, 1.0 M, Oakwood Chemicals), Oxone™, sodium percarbonate, (Acros Organics), sodium perborate (TCI) and Dess-Martin periodinane (DMP, Oakwood Chemicals) were used as received. Solvents and all other reagents were used as received.

Example 2—General Procedure for Hydroboration of HOSO (1)

An oven-dried, 500 mL three-necked round-bottomed flask was equipped with a wide magnetic stir bar, a gas inlet, sealed with two rubber septa and cooled under a blanket of nitrogen. The empty flask was then cooled in an ice/water bath and charged with 57.0 mL (57 mmol) of cold 1.0 M BTHF using an 18-gauge stainless-steel cannula. Subsequently, 19.4 g of Plenish HOSO (55 mmol), were added dropwise to the stirring BTHF using a pressure-equalizing addition funnel, replacing one of the rubber septa. After complete addition, a gel may or may not immediately develop which causes mixture to cease stirring.

Example 3—Mixture of Mono- and Diglycerides of Regioisomeric Hydroxyoctadecanoic Acid (2)

To the hydroborated HOSO, 5 mL of distilled water were added slowly to destroy gel and excess BTHF, and the mixture was left to stir for 10 min. The contents were cooled to 0° C. in an ice/water bath, and 14.0 mL of 3 M sodium hydroxide (42 mmol) were added first, followed by dropwise addition of 7.2 mL of cold 30% hydrogen peroxide (70 mmol). The cold bath was then removed, and the mixture allowed to warm to r.t. with stirring for 1.5 hours. Subsequently, the cloudy mixture was extracted with 2×30 mL ethyl acetate, and the pooled organic layers washed twice with saturated brine, dried over sodium sulfate, and concentrated under vacuum to afford 18-19 g (90% yield) of a translucent light-white oil which solidified upon cooling. $^1$H NMR (500 MHz, CDCl$_3$): δ 5.25 (m, J=5.5, 4.5 Hz, 1H), 4.30 (dd, J=11.9, 4.3 Hz, 2H), 4.17 (dd, J=11.9, 6.0 Hz, 2H), 3.74 (m, 1H), 3.68 (q, J=13.0, 6.5 Hz, 2H), 3.57 (br, 3H), 2.30 (m, 5H), 1.67-1.60 (m, 12H), 1.42-1.24 (br, 85H), 0.87 (t, J=6.9 Hz, 9H).

Example 4—Triacylglyceride of Regioisomeric Hydroxyoctadecanoic Acid (TAG 3) (3)

To the hydroborated HOSO 5 mL of distilled water were added to destroy gel and excess BTHF and the mixture was left to stir for 10 min. To the stirring mixture at r.t., 22.3 g of sodium percarbonate (142 mmol) were added batchwise throughout the course of 1 hour and left to stir for 6 hours. Subsequently the cloudy mixture was extracted with 2×30 mL ethyl acetate, and the pooled organic layers were washed twice with saturated brine, dried over sodium sulfate, and concentrated under vacuum to afford 18-19 g (90% yield) of a translucent light-white oil which solidified upon cooling. $^1$H NMR of the collected solid (400 MHz, CDCl$_3$): δ 5.23

Figure 9:
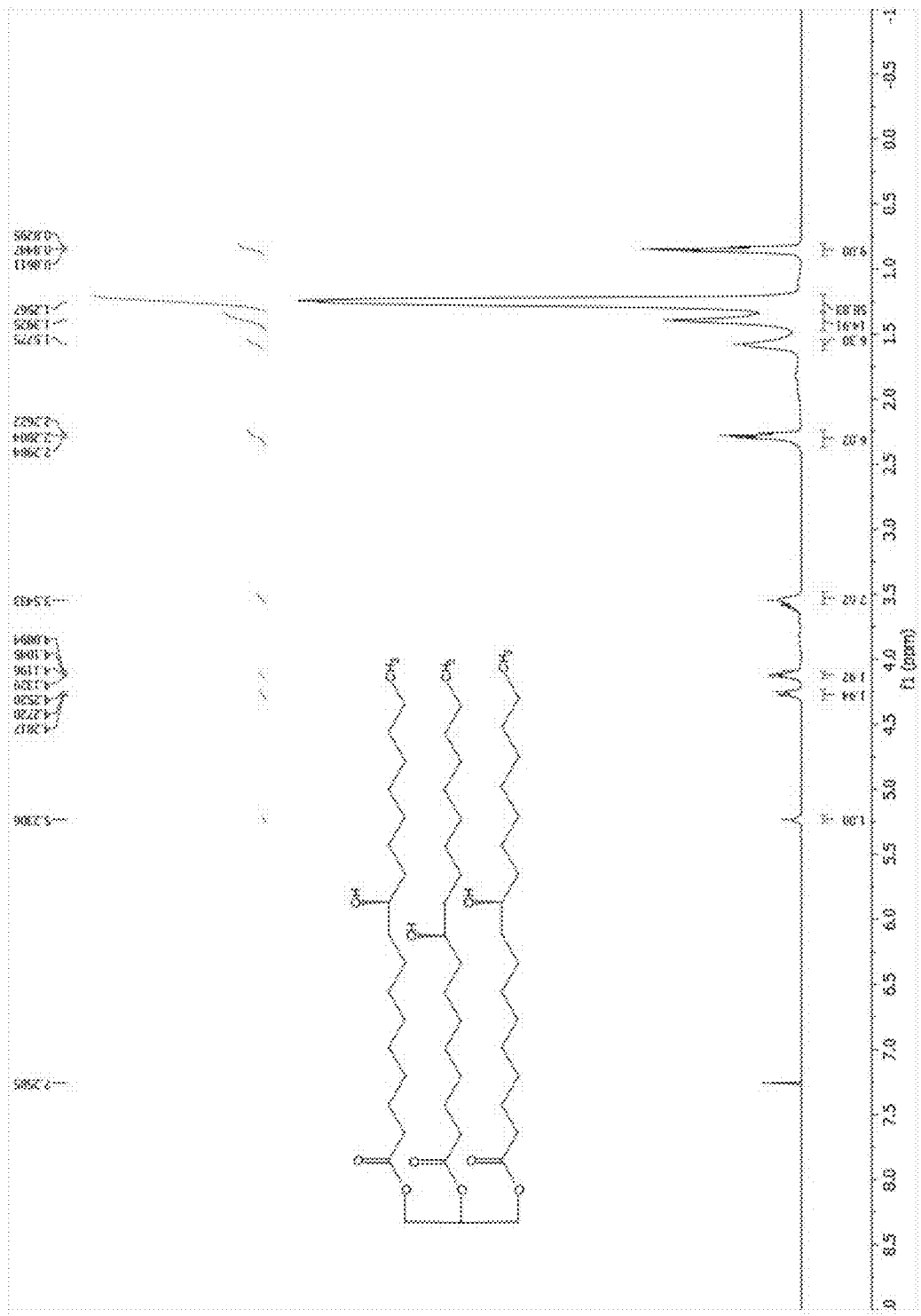
FIG. 9 is an $^1$H NMR spectrum of triglyceride of regio- and stereoisomeric hydroxyoctadecanoic acid (3). $^1$H NMR (400 MHz, CDCl$_3$): δ 5.23 (m, 1H), 4.26 (dd, J=11.7, 5.7 Hz, 2H), 4.11 (dd, J=11.7, 5.7 Hz, 2H), 3.54 (m, 3H), 2.28 (t, J=7.2 Hz, 6H), 1.57 (br, 6H), 1.39-1.26 (br, 74H), 0.85 (t, J=6.3 Hz, 9H).

(m, 1H), 4.26 (dd, J=11.7, 5.7 Hz, 2H), 4.11 (dd, J=11.7, 5.7 Hz, 2H), 3.54 (m, 3H), 2.28 (t, J=7.2 Hz, 6H), 1.57 (br, 6H), 1.39-1.26 (br, 74H), 0.85 (t, J=6.3 Hz, 9H) (FIG. 9).

Example 5—Mixture of 9-Hydroxyoctadecanoic (4a) and 10-Hydroxyoctadecanoic Acid (4b)

Figure 10:
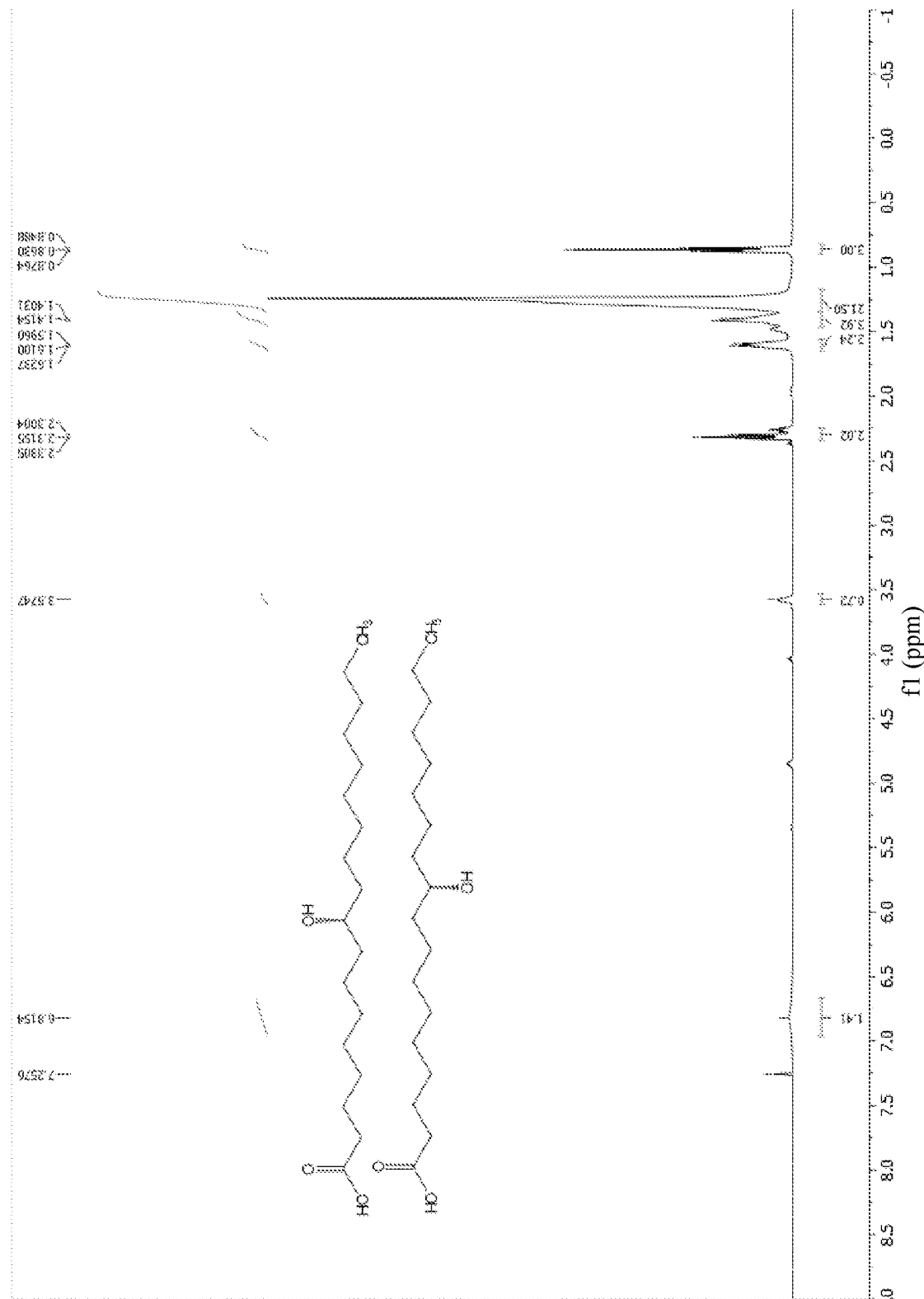
FIG. 10 is an $^1$H NMR spectrum of the mixture of 9-hydroxyoctadecanoic (4a) and 10-hydroxyoctadecanoic acid (4b). $^1$H NMR (500 MHz, CDCl$_3$): 3.58 (m, 1H), 2.31 (t, J=7.5 Hz, 2H), 1.60 (m, 2H), 1.41 (m, 4H), 1.24 (br, 22H), 0.86 (t, J=6.9 Hz, 3H).

Twenty grams of solid TAG 3 were melted and heated to 80° C. on a hot plate in a 600 mL beaker. A magnetic stir bar was carefully added to molten TAG, followed by 120 mL 3 M sodium hydroxide, and the cloudy mixture left to stir at 80° C. until translucent. To the mixture, 150 mL of 3 M hydrochloric acid were added along with 60 mL of DI water, and left to stir until a yellow oil floated to the top. Contents were then removed from heat, and the beaker quickly cooled in an ice/water bath, and then left under refrigeration overnight to obtain 17-18 g (85% yield) of solid hydroxy free fatty acid, which was further dried in a vacuum oven for 6 hours. $^1$H NMR (500 MHz, CDCl$_3$): 3.58 (m, 1H), 2.31 (t, J=7.5 Hz, 2H), 1.60 (m, 2H), 1.41 (m, 4H), 1.24 (br, 22H), 0.86 (t, J=6.9 Hz, 3H) (FIG. 10).

Example 6—Saponification of Hydrogenated Castor Oil (HCO) (5) to (R)-12-Hydroxyoctadecanoic Acid (6)

Figure 12:
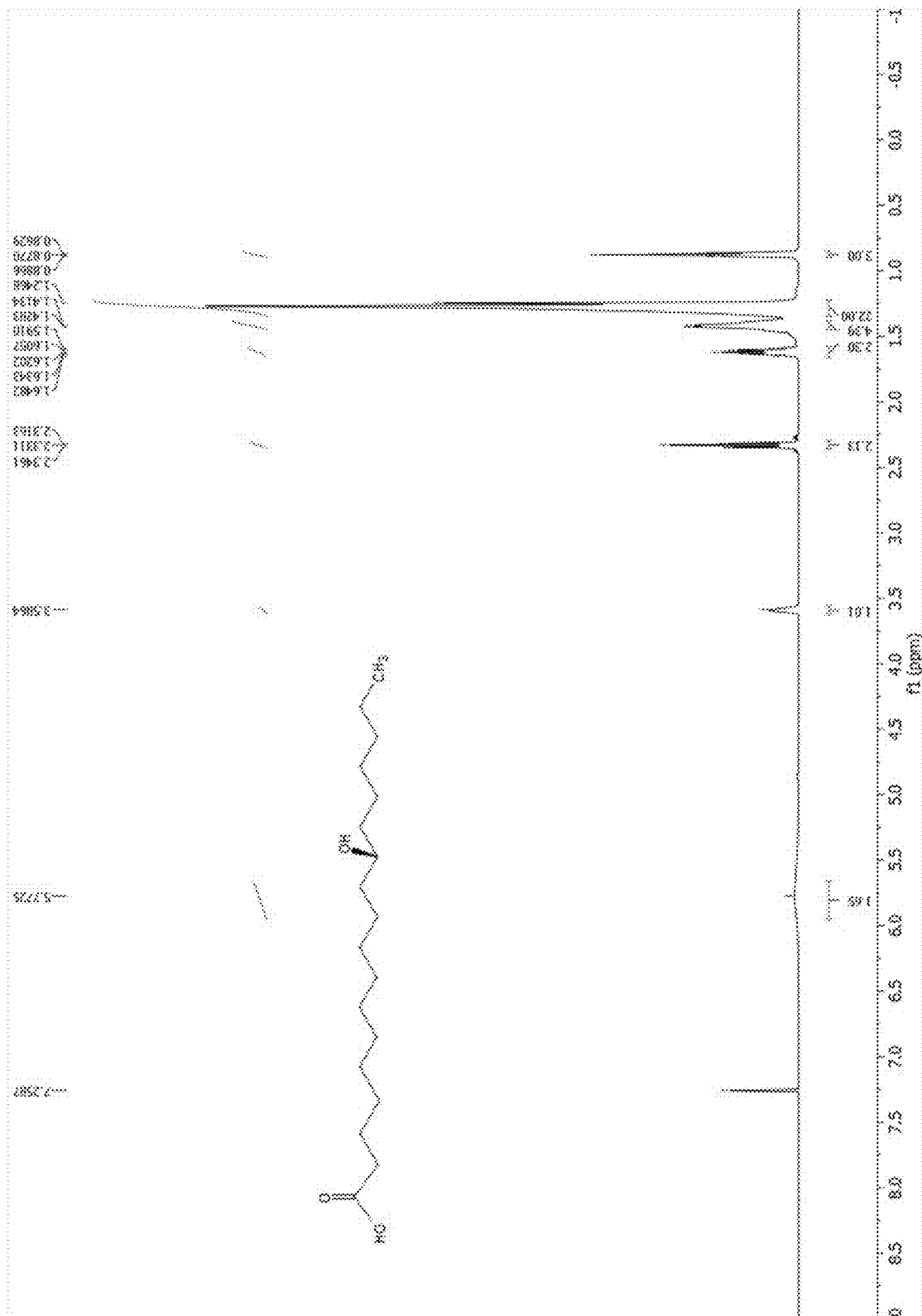
FIG. 12 is an $^1$H NMR spectrum of (R)-12-hydroxyoctadecanoic acid (HCOFFA; 6). $^1$H NMR (500 MHz, CDCl$_3$)

Saponification was conducted using the same procedure as the one used for the preparation of 9-hydroxyoctadecanoic (4a) and 10-hydroxyoctadecanoic acid (4b). $^1$H NMR (500 MHz, CDCl$_3$): δ 3.58 (m, 1H), 2.33 (t, J=7.5 Hz, 2H), 1.62 (m, 2H), 1.41 (br, 4H), 1.24 (br, 22H), 0.87 (t, J=6.1 Hz, 3H) (FIG. 12).

Example 7—Dess-Martin Periodinane (DMP) Oxidation of Hydroxylated TAGs and Fatty Acids A 500 mL two-necked round-bottomed flask was equipped with a thermometer, large magnetic stir bar and charged with 20.0 g of either HCO (5) or (R)-12-hydroxystearic acid (6), 70.0 mL of acetonitrile, and 4.0 equivalents of water (0.4-1.2 mL). Contents were heated to 80° C. with stirring in an oil bath until homogeneous and 1.2 equivalents of DMP were added incrementally, such that the temperature did not exceed 90° C. The mixture was left to stir for 3 hours and transferred to a vacuum rotary evaporator to remove all traces of acetonitrile. The resulting thick, light-yellow slurry was transferred to a 500 mL wide-mouth Erlenmeyer flask with 3×30 mL washings of hot ethyl acetate. Contents were then heated to 65° C. on a hot plate with vigorous stirring, followed by slow, batchwise addition of 14.0 g of sodium bicarbonate in 100 mL of hot distilled water, and 50 mL of 0.1 M sodium thiosulfate. The slurry was vacuum filtered using a sintered funnel (30-40 μm), and the filtrate heated on a hot plate to dissolve crude product into organic layer. As much of the upper organic phase was decanted into a clean flask, and the hot filtrate was then extracted with an additional 2×30 mL hot ethyl acetate. The pooled organic layers were washed with 2×50 mL 10% sodium bicarbonate and 2×30 mL saturated brine, dried over sodium sulfate, and gently heated on a hot plate to afford a translucent yellow organic phase which was subsequently filtered and concentrated under vacuum to yield 17-18 g (87% yield) of a dark-yellow oil.

Example 8—12-Oxooctadecanoic Acid (7)

Figure 3:
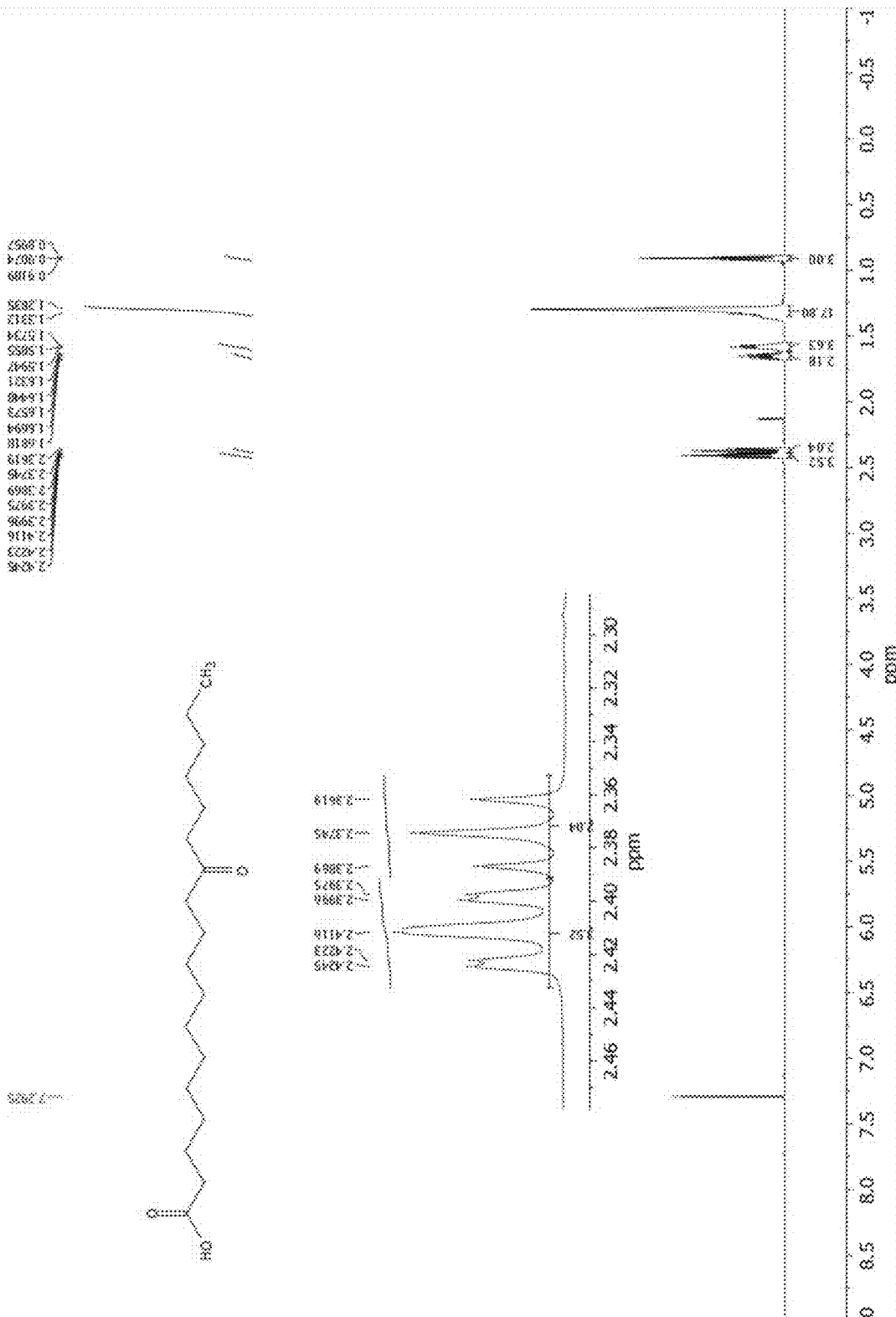
FIG. 3 is an $^1$H NMR spectrum of 12-oxooctadecanoic acid (7).

12-Oxooctadecanoic acid was prepared using the same procedure as described in Example 7 and using 12-hydroxystearic acid as the starting material. $^1$H NMR (600 MHz, CDCl$_3$): δ 2.41 (dt, J=7.1, 1.3 Hz, 4H), 2.37 (t, J=7.5 Hz, 2H), 1.69 (m, 2H), 1.62 (m, 4H), 1.29 (br, 18H), 0.91 (t, J=7.0, 3H) (FIG. 3).

Example 9—Oxidized Hydrogenated Castor Oil (Propane-1,2,3-triyl tris(12-oxooctadecanoate)) (8)

Figure 4:
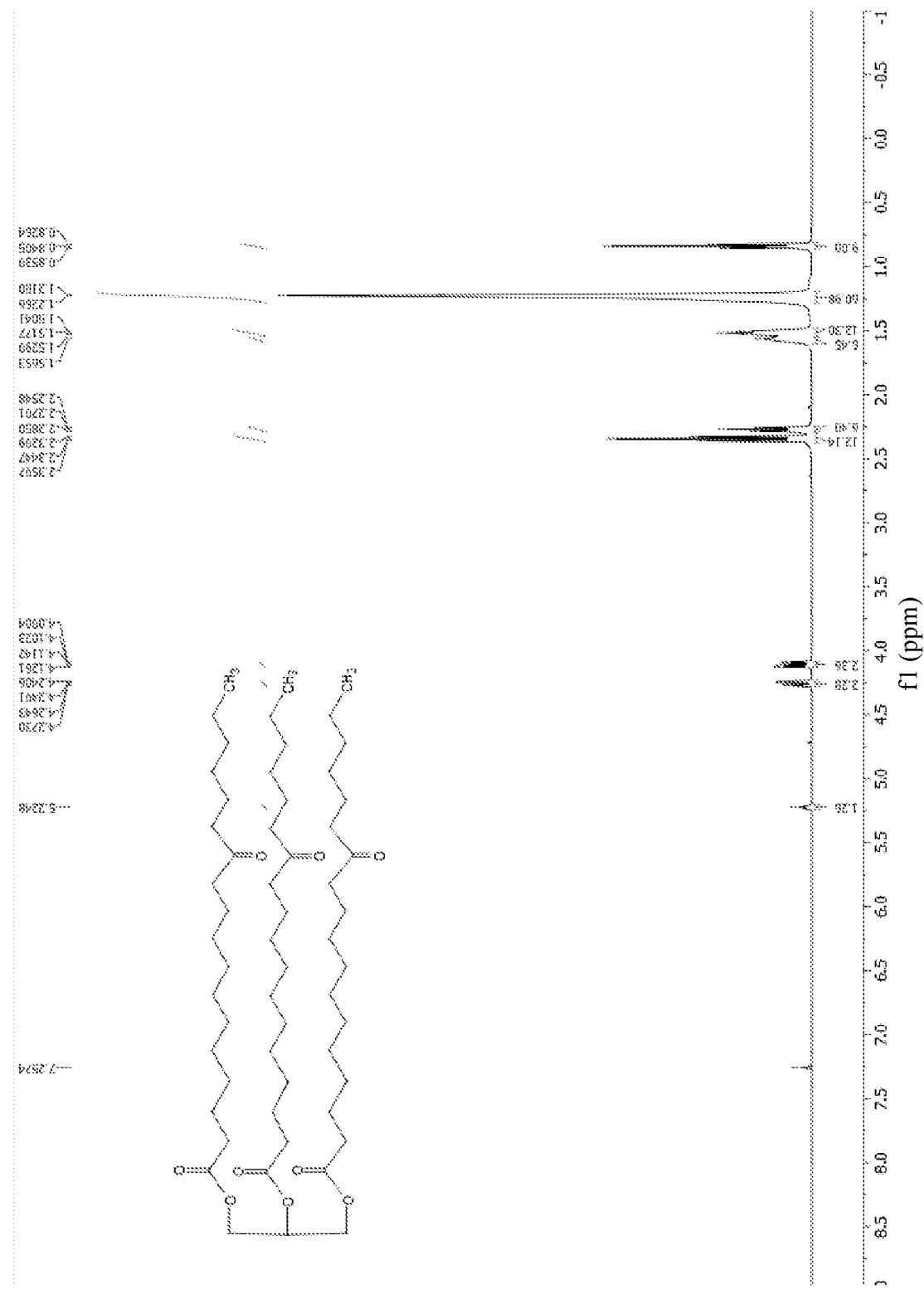
FIG. 4 is an $^1$H NMR spectrum of oxidized hydrogenated castor oil (propane-1,2,3-triyl tris(12-oxooctadecanoate)) (8).

Oxidized hydrogenated castor oil was prepared using the same procedure as described in Example 7 and using hydrogenated castor oil (HCO) as the starting material. $^1$H NMR (500 MHz, CDCl$_3$): δ 5.22 (m, 1H), 4.25 (dd, J=11.9, 4.3 Hz, 2H), 4.11 (dd, J=11.9, 6.0 Hz, 2H), 2.34 (t, J=7.5 Hz, 12H), 2.27 (t, J=7.5 Hz, 6H), 1.56-1.49 (m, 18H), 1.29 (br, 60H), 0.84 (t, J=7.0, 9H) (FIG. 4).

Example 10—9,10-Epoxyoctadecanoic Acid (10)

A 500 mL two-necked round-bottomed flask was equipped with a magnetic stir bar, an addition funnel, and charged with 20.0 g (70 mmol) of oleic acid (OA) (9), 8.5 g (140 mmol) of glacial acetic acid, cooled to 0-4° C. in an ice water bath with stirring. Subsequently, 6.2 mL (200 mmol) of 30% hydrogen peroxide were added dropwise and the mixture heated to 55° C. with stirring for 6 hours. The upper oil layer was decanted into a separatory funnel, washed with 5×200 mL chilled (1-3° C.) DI water, 2×30 mL 10% sodium bicarbonate and 2×30 mL brine, and dried in a vacuum oven at 70° C. to obtain 17-18 g (85% yield) of a viscous yellow oil. $^1$H NMR (500 MHz, CDCl$_3$): δ 2.94 (m, 2H), 2.38 (m, 2H), 1.66 (m, 2H), 1.53 (m, 4H), 1.29 (br, 20H), 0.91 (t, J=7.0 Hz, 3H).

Example 11—9,10-Dihydroxyoctadecanoic Acid (11)

A 500 mL two-necked round-bottomed flask was equipped with a magnetic stir bar, an addition funnel, and charged with 20.0 g (70 mmol) of OA (9), 8.5 g (140 mmol) of glacial acetic acid, 2 wt % of Amberlyst-15 acid catalyst, and heated to 55° C. in an oil bath with stirring. Subsequently, 6.2 mL (200 mmol) of 30% hydrogen peroxide were added dropwise and the mixture left to stir at 55° C. for 18 hours. The upper oil layer was decanted into a separatory funnel, washed with 5×200 mL hot (>80° C.) DI water, 2×30 mL 10% sodium bicarbonate and 2×30 mL brine. Oil was collected and dried in a vacuum oven at 70° C. to obtain 17-18 g (85% yield) of a viscous yellow oil. $^1$H NMR (500 MHz, CDCl$_3$): 3.58 (m, 2H), 2.31 (t, 2H), 1.60 (m, 2H), 1.41 (m, 4H), 1.24 (br, 22H), 0.90 (t, 3H).

Example 12—Mixture of 9-Hydroxy-10-((2-hydroxypropanoyl)oxy)octadecanoic Acid (12a) and 10-Hydroxy-9-((2-hydroxypropanoyl)oxy)octadecanoic Acid Regioisomers (12b)

A 250 mL two-necked round-bottomed flask was equipped with a large magnetic stir bar and charged with 10.0 g (33.5 mmol) of 9,10-epoxyoctadecanoic acid 10, 5.6 g (50 mmol) of 80% (w/v) lactic acid solution and heated in an oil bath at 80° C. with stirring for 4 hours. Mixture was allowed to cool to r.t., extracted with 2×30 mL ethyl acetate, and the pooled organic layers are washed twice with 2×30 mL saturated brine, dried over sodium sulfate, and concentrated under vacuum to afford 8-9 g (91% yield) of a translucent light-yellow oil. $^1$H NMR (500 MHz, CDCl$_3$):

4.51 (q, 1H), 4.28 (m, 1H), 3.58 (m, 1H), 2.28 (t, 2H), 1.60 (m, 2H), 1.59-1.41 (m, 7H), 1.24 (br, 22H), 0.89 (t, 3H).

Example 13—General Procedure for Synthesis of Diesters

A 500 mL round-bottomed flask was equipped with a large magnetic stir bar and charged with the appropriate molar ratio of fatty acid monomers (i.e. stearic acid, oleic diol, hydroxystearic acids), a half-molar equivalent of PEG200, and 1 wt % Amberlyst-15 acid catalyst. The flask was fitted with a drying tube and heated in an oil bath to 100° C. with stirring for 12 hours under vacuum. The resulting wax was filtered through a preheated fine stainless-steel mesh to remove solid catalyst resin and used without further treatment. $^1$H NMR (500 MHz, CDCl$_3$): δ 4.21 (m, 4H), 3.68-3.66 (m, 12H), 2.31 (m, 4H), 1.61 (m, H), 1.27-1.24 (br, 56H), 0.87 (t, 6H).

Example 14—Wax Emulsion Formulations

A 300 mL stainless steel cup was charged with 10 g of solid carnauba (CAR) wax and 2 (80:20), 0.75 g of OA, 0.75 g of lauric acid and heated on a hot plate until molten (100-120° C.), at which point a stir bar was added and set to stir at medium speed for 1 min. When contents became homogeneous, 1.5 g of ammonium hydroxide were added, and immediately, the hot wax mixture was added to 50 mL of hot tap water (95-99° C.) and homogenized with a homogenizer (Fisher Scientific, Model 850) at 5000 rpm. The hot emulsion was immediately cooled in an ice bath to r.t. with stirring using a metal spatula and stored in clean plastic containers.

Example 15—Moisture Weight Loss of Citrus Fruit

Freshly harvested Valencia oranges were washed with warm soapy water, dried with paper towels, and coated with 0.5 mL of wax emulsion per fruit, delivered by a syringe and gently rubbed with two fingers on the entire surface to achieve an even coat. Coated fruit were blown dry for 1.5 min with a hot-air gun blowing air at 50-55° C. and set on a wire rack to fully dry. Each treatment consisted of five replicates plus one uncoated control. Coated and uncoated fruit were stored for 2 weeks at 22-23° C. and 65-75% RH. Fruits were individually weighed daily until the end of the storage period. Percent weight-loss was calculated and reported as the average of the five replicates. Example 16—NMR Spectroscopy $^1$H and $^{11}$B NMR spectra were obtained using either a Bruker Avance III 600 MHz or Varian VNMRS 500 MHz spectrometers, using either the terminal methyl protons or methylene/methine protons on glycerol backbone as internal proton integration standards for the appropriate compounds.

Example 17—Differential Scanning Calorimetry (DSC)

Melting profile of wax materials was analyzed with a DSC 250 Discovery (TA Instruments, New Castle, DE) calorimeter using the methodology by Donhowe and Fennema (1993). Wax samples (approximately 10 mg) were first heated to 100° C. at a rate of 200° C./min, held for 3 min, cooled to 25° C. at a rate of 20° C./min and equilibrated for 3 min. Actual test ramp was then performed by heating to 100° C. at a rate of 10° C./min. Melting point ranges were calculated from the average of three samples from each material.

Example 18—Hardness and Cohesiveness of Wax Materials

Hardness, defined as a measure of resistance to local deformation, was measured using a H-1200 Universal Penetrometer (Humboldt Mfg. Co., Raleigh, NC) following ASTM D1321 standard. Ten grams of molten material were cast in a 5 cm diameter by 3 cm tall hollow polyvinyl chloride plastic mold. Material was allowed to fully cool and equilibrate to room temperature for at least 6 hours prior to testing. The distance traveled by penetrometer needle (mm) into the wax disc was recorded as the hardness (mm$^{-1}$) after taking the reciprocal value. Cohesiveness, defined as the strength of a material due to interatomic or intermolecular forces, was measured as per previous methodology (Fei et al., "Synthesis and Characterization of Soybean Oil-Based Waxes and Their Application as Paraffin Substitute for Corrugated Coating," *J. Ind. Eng. Chem.* 58:113-122 (2018), which is hereby incorporated by reference in its entirety) by a three-point bend test using a TA.XTPlus Texture Analyzer (Stable Micro Systems, So. Hamilton, MA) with a TA-92N probe on a 4 mm-thick cast wax sample, made by casting 2.2-2.8 g of molten material in a small hexagonal weighing boat, and allowing samples to cool to r.t. for at least 2 hours. Hexagonal samples were then sanded down flat to a uniform mass with a fine grit sanding sponge taking care to remove concave and convex regions. Test was performed by placing sample between two vertical support bars 12 mm apart and driving the blunt blade normal to the sample at 0.5 mm/s to a trigger distance of 3 mm. The area under curve was acquired from a distance at 0 mm to the peak positive force, and the average of three tests for each material was recorded as the cohesiveness (g mm) of the material.

Example 19—Polarized Light Microscopy (PLM)

Crystalline morphology of selected wax materials was analyzed using PLM with an Olympus BX51 microscope (Olympus Corporation, Tokyo, Japan) following methodology by Meng et al. "Characterization of Graininess Formed in all Beef Tallow-Based Shortening," *J. Agric. Food. Chem.* 58(21):11463-11470 (2010). Approximately one milligram of wax was loaded onto microscope slide and heated for 30 min at 90° C. to erase crystal memory. The molten wax was then covered with a preheated slide to produce a thin film and cooled to r.t. Using the latest version of ImageJ software (available from the National Institute of Health website), for four images per sample, each were converted to 8-bit type, adjusted to a threshold using the MaxEntropy setting, and processed with the default fractal box-counting algorithm to obtain an average fractal dimension value (db).

Example 20—Results and Discussion of Examples 1-19

Synthesis of Wax Coating Materials
Hydroboration-Oxidation

Figure 1:
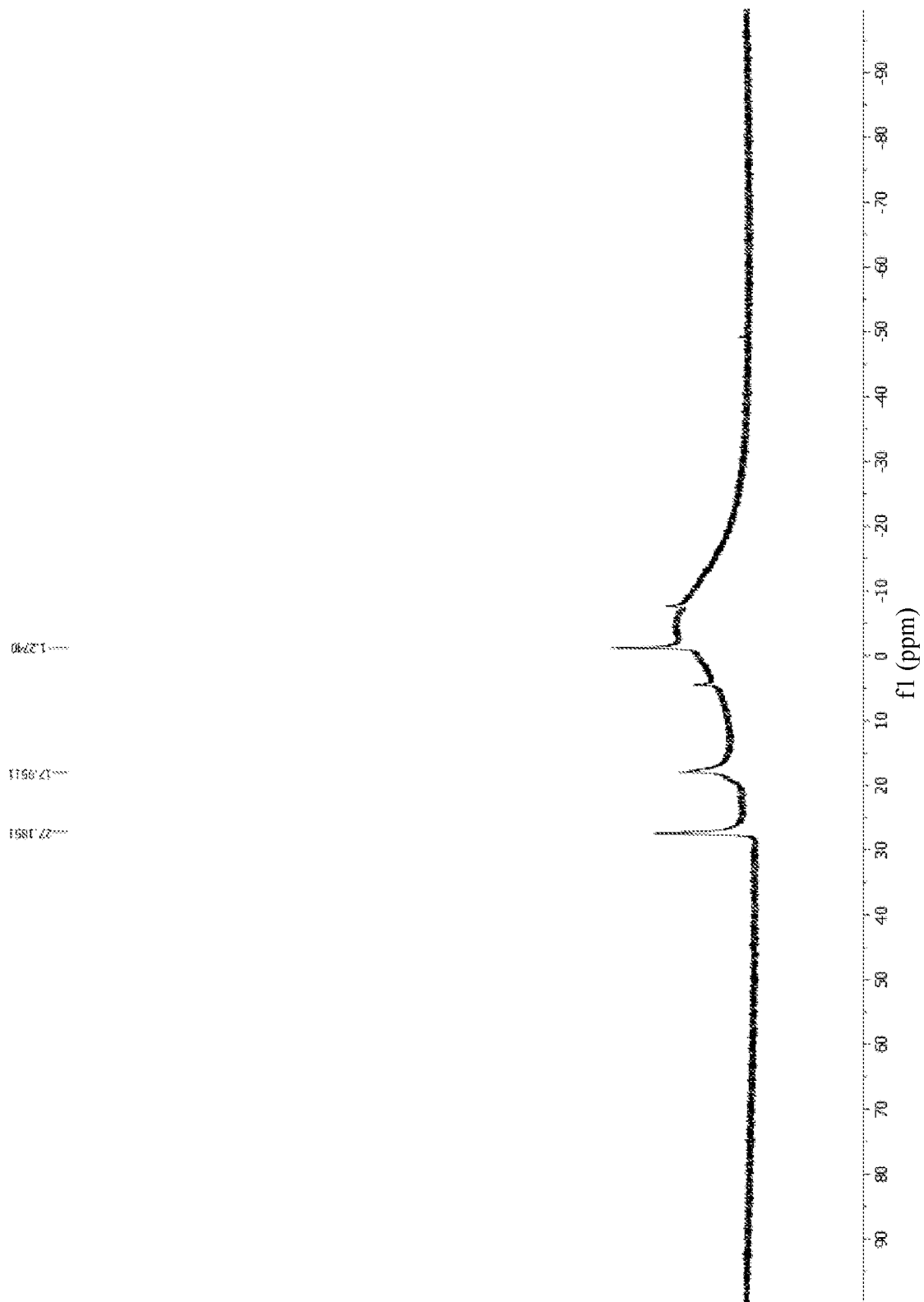
FIG. 1 is an $^{11}$B NMR spectrum of high-oleic soybean oil (HOSO) monoalkylborane. $^1$B NMR spectrum showing HOSO monoalkylborane signals at δ 27.18 and 17.95 (excess BH$_3$-THF at δ −1.27)

HOSO was functionalized with single hydroxyl moieties via hydroboration-oxidation following previous work on fatty acid methyl esters (FAMEs) (Lucas et al., "Hydroboration of Unsaturated Fatty Acid Methyl Esters and Conversion of the Boron Adducts," *Eur. J. Lipid Sci. Technol.* 116(1):52-62 (2014), which is hereby incorporated by reference in its entirety) although the hydroboration of TAGs undertaken in the present study presented difficulties not encountered in the former. Addition of BTHF to HOSO resulted in the rapid formation of an impressive clear, extremely viscous and rigid gel at either low temperatures, substoichiometric BTHF, or dilution of HOSO with dry THF. Gelling during hydroborations has been reported for diverse olefinic substrates (Brown et al., "Hydroboration. XIV. Rates and Stoichiometry of the Hydroboration of Some Representative Hindered Olefins," *J. Am. Chem. Soc.* 84(8): 1478-1484 (1962); Chujo et al., "Hydroboration Polymerization. 2. Synthesis of Organoboron Polymers by the Reaction Between Diyne and Thexylborane," *Macromolecules* 25(1):33-36 (1992); Logan, J. T., "Thermal Isomerization of Hydroborated Olefins," *J Org. Chem.* 26(10):3657-3660 (1961), which are hereby incorporated by reference in their entirety), although this is not typical of FAMES. To overcome gelling during the hydroboration of HOSO, the order of addition was simply reversed, and stoichiometry adjusted from the assumed 1:3 molar ratio ($BH_3$: olefin) to a 1:1 molar ratio. These conditions suggested the hydroboration of HOSO favors the monoalkylborane stage, presumably due to the steric influence from neighboring fatty acyl chains within the TAG. Similarly, the hydroboration of methyl oleate proceeded rapidly to the monoalkylborane stage, as suggested by full conversion using a maximum of 1:1.5 ($BH_3$: olefin) ratio, beyond which increasing the olefin concentration results in incomplete conversion. Examination of $^{11}B$ NMR of HOSO provides additional evidence as observed signals at δ 17.95 and 27.18 range are similar to other monoalkylborane species (FIG. 1). The rapid gel formation observed when adding BTHF to HOSO may be rationalized as the high olefin concentration-driven formation of a hyper-branched alkylborane which may be contributing to the observed gradual increase in viscosity leading up to the gel. The dropwise addition of HOSO to BTHF ensures the reaction proceeds rapidly to the monoalkylborane stage, first, by saturating the olefin with borane. As the calculated 1:1 molar ratio is approached, once again, a gradual increase in viscosity culminating in a gel can be observed. Despite the presence of linoleic and linolenic fatty acids in HOSO, it was found that a 1:1 molar ratio is sufficient for the complete conversion into the alcohol. Previous reports proposed the formation of cyclic five membered borolanes to explain the presence of two isomeric 1,4-diols from the hydroboration-oxidation methyl linoleate (Lucas et al., "Hydroboration of Unsaturated Fatty Acid Methyl Esters and Conversion of the Boron Adducts," *Eur. J. Lipid Sci. Technol.* 116(1):52-62 (2014), which is hereby incorporated by reference in its entirety). This behavior may be contributing to both the initial preference for the monoalkylborane and gradual increase in viscosity, since the geometry of the TAG-linoleate chains would be modified in such a way that undue strain would be added onto the system. Bulkier hydroborating agents (i.e. thexylborane, pinacolborane) were entirely avoided due to their steric implications as well as cost given that BTHF is comparatively less expensive and readily available.

Figure 2:
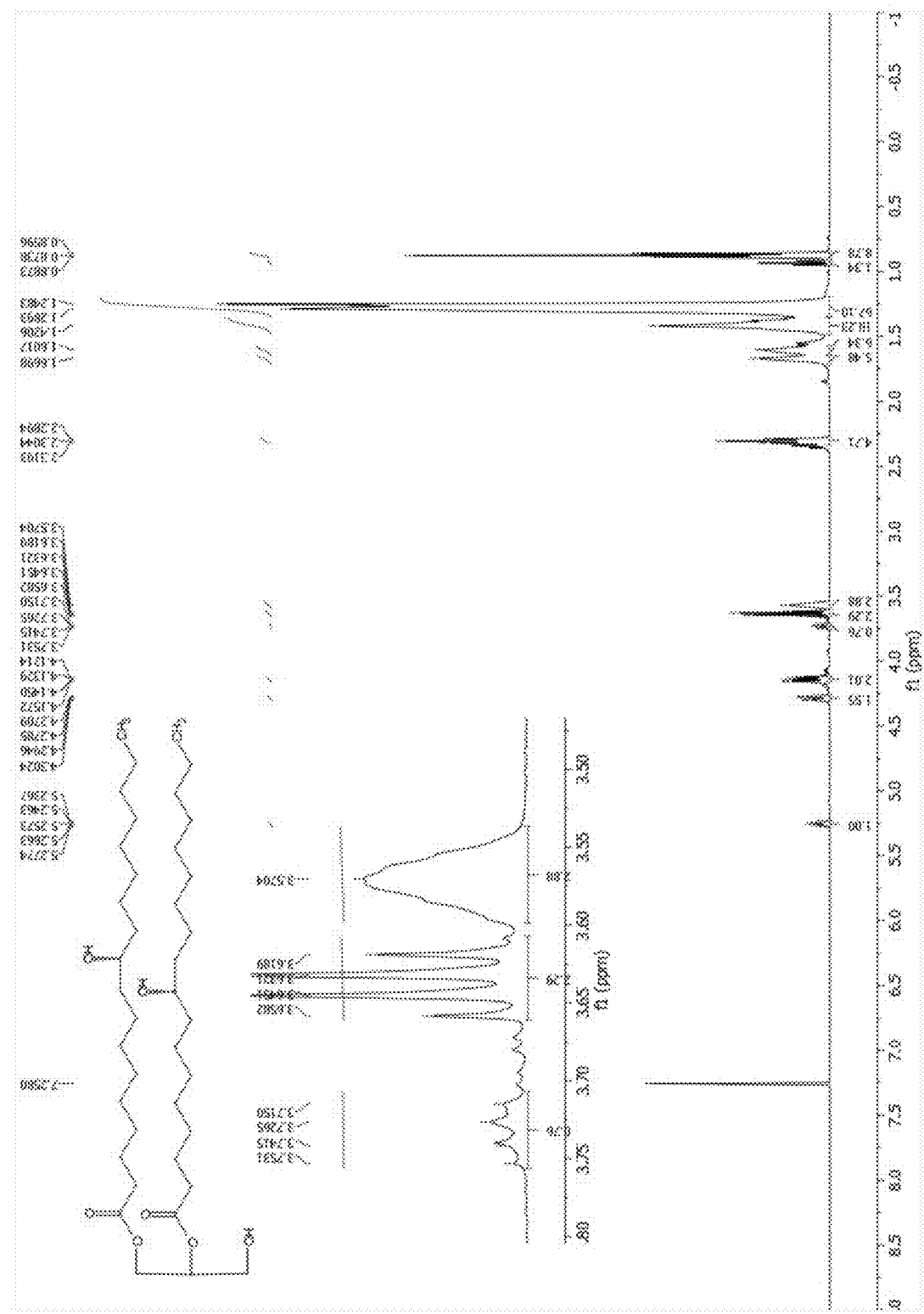
FIG. 2 is an $^1$H NMR spectrum of the mixture of mono- and diglycerides of regioisomeric hydroxyoctadecanoic acid (2).

The hydroboration-oxidation is typically performed by treating the generated alkylborane species with alkaline hydrogen peroxide to afford the respective alcohols; however, spectral evidence revealed these conditions resulted in hydrolysis of the fatty acyl chains in HOSO to yield a mixture of mono- and diglycerides of hydroxy fatty acids. In the 1H NMR spectrum of the mixture of mono- and diglycerides of regioisomeric hydroxyoctadecanoic acid (2) (FIG. 2), the characteristic methylene doublet of doublets (δ 4.17 (dd, 2H), 4.33 (dd, 2H)) and methine multiplet (S 5.30, (m, 1H)) from the glycerol backbone of HOSO disappear, and are replaced by a sharp quartet at δ 3.68 (J=13.0, 6.5 Hz), corresponding to diastereotopic methylene protons a to the glycerol-backbone hydroxyls, following hydrolysis of the ester linkage; the anticipated smaller multiplet from the proton a to the newly installed alcohol from the actual hydroboration-oxidation can be seen at δ 3.57. Furthermore, an additional multiplet peak present at δ 3.78-3.74 (m, J=6.6, 4.1, 2.5 Hz) suggested a degree of intra-esterification from hydrolyzed fatty acyl chains and hydroxyls at the C9- and C10-positions, although this is not always observed batch-to-batch, especially when scaling-up. Lowering the temperature conditions to between −10 and −5° C. using an ice-acetone bath during alkaline-hydrogen peroxide oxidation step resulted in a slight decrease of hydrolysis products, as suggested by a lower integration value for backbone methylene protons (i.e. δ 4.33=<2H) in addition to the aforementioned signals. These hydrolysis products resulted in a very lustrous, white, and homogeneous waxy material which was chosen for further analysis due to its attractive appearance.

Alternative oxidations pathways were explored in order to prevent hydrolysis of the triacylglycerol (TAG) and mimic the structure of hydrogenated castor oil (HCO). Ripin et al., "A Safe, Scaleable Method for the Oxidation of Carbon-Boron Bonds with Oxone," *Tetrahedron Lett.* 41:5817-5819 (2000), which is hereby incorporated by reference in its entirety, reported the successful oxidation of a number of organoboranes with Oxone™ under mild conditions, attributing it as a safe, shelf-stable, economical oxidizing salt. Indeed, $^1H$ NMR evidence revealed oxidation with Oxone™ rendered the TAG structure intact, although the resulting product was not fully converted into the alcohol, and was neither a solid wax nor oil, but rather an extremely viscous, tacky, and resilient gel-like material that fiercely adhered to the walls of glassware. This presumed polysulfone product was not further characterized, as it proved to be extremely heat resistant, non-flowable, resilient and very difficult to dissolve for characterization. Oxidations using sodium percarbonate and sodium perborate proved to be the most promising oxidation pathways for ensuring complete oxidation without hydrolysis of the TAG (Kabalka et al., "Sodium Perborate: A Mild and Convenient Reagent for Efficiently Oxidizing Organoboranes," *J. Org. Chem.* 54:5930-5933 (1989); Kabalka et al., "Oxidation of Organoboranes with Sodium Percarbonate," *Organometallics* 9(4):1316-1320 (1990), which are hereby incorporated by reference in their entirety). Sodium percarbonate efficiently afforded the single-hydroxyl functionalized TAG 3 in good yields and remarkably mild conditions (Scheme 1) with the generation of non-toxic waste products (i.e. aqueous bicarbonate and borates). Its lower cost compared to that of sodium perborate, as well as stability, ease of handling and storage makes it an ideal oxidant for commercialization, given the fact that the intended use of the resulting wax material is for food-contact applications. To obtain the free hydroxy fatty acid, TAG 3 was subjected to a saponification in the same way that HCO was saponified to obtain HCOFFA. The free hydroxy fatty acids (4a-b and 6) from both sources (3 and 5) resembled each other and were obtained as dull light-brown solids, unlike their TAG counterparts which were white and comparatively glossier.

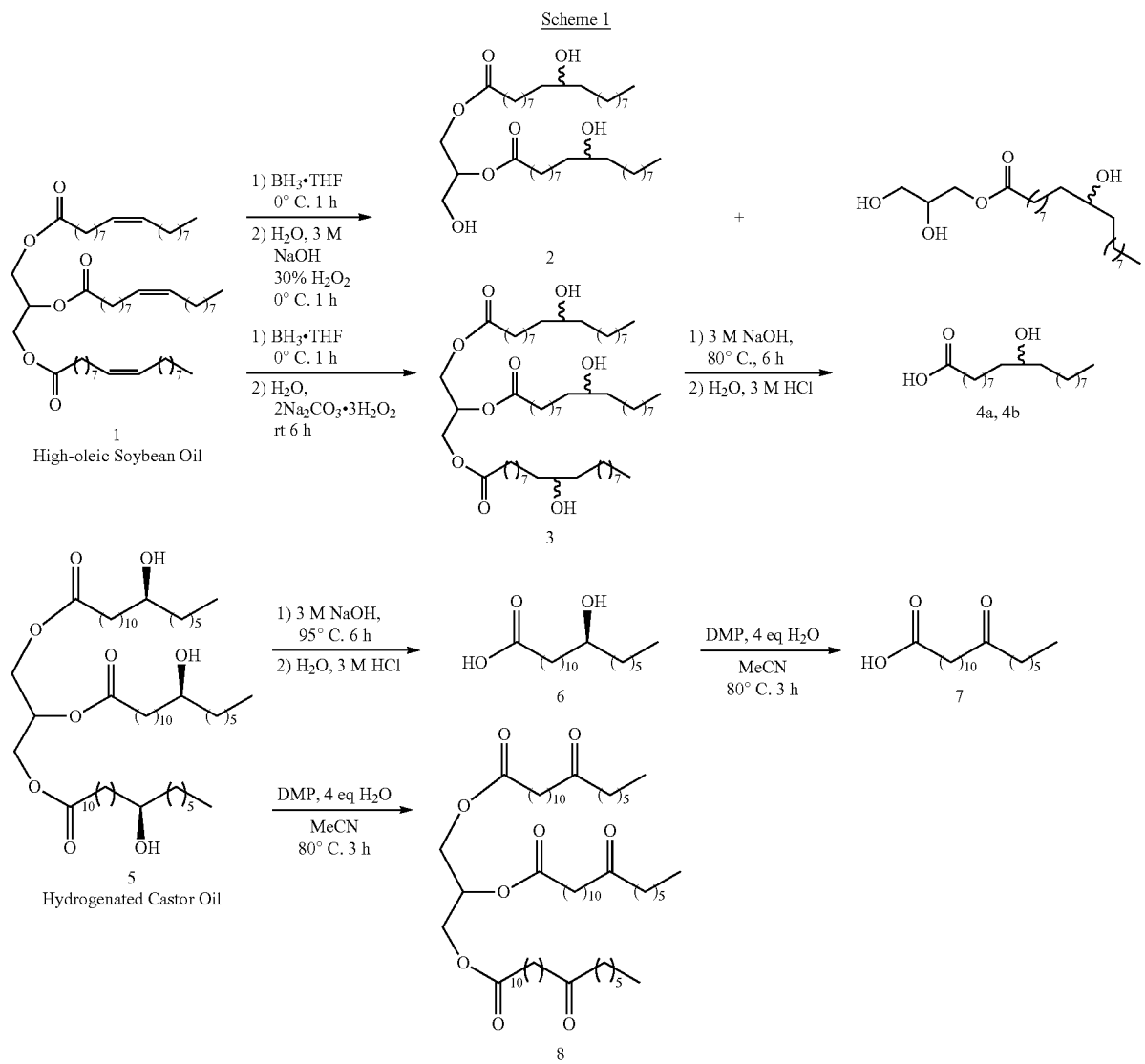

Scheme 1

DMP Oxidation

Hydroxyl-functionalized fatty adducts were further oxidized into the respective ketones using DMP for two reasons: 1) to compare the effect of ketones with respect to hydroxyl groups on the target's physical properties of hardness, cohesiveness, melting point and shine (many keto-waxes exist in nature), as well as 2) to investigate whether these structures could reduce the viscosity (Ba et al., "Chemical Modifications of Ricinolein in Castor Oil and Methyl Ricinoleate for Viscosity Reduction to Facilitate Their use as Biodiesels," *Eur. J. Lipid Sci. Technol.* 118(4): 651-657 (2016), which is hereby incorporated by reference in its entirety) of the wax emulsions for subsequent use in fruit coating. The oxidations reported herein, however, were performed on solid hydrogenated castor oil (5) and (R)-12-hydroxyoctadecanoic acid (6) (Scheme 1), optimized by the inclusion of acetonitrile and four equivalents of water. Ketones 7 and 8 were obtained with relative ease, although work-up conditions necessitate careful temperature control to prevent product crystallization during separation from the spent solid DMP reagent (i.e. Ac-IBX), which can lead to low isolated yields. Nevertheless, products can be obtained with sufficient purity for further analysis, as evidenced by $^1$H NMR (FIGS. 3 and 4).

Epoxide Ring-Opening Reactions and Synthesis of Diesters

Vicinal diol 11 was obtained from EOA, simply by prolonging the reaction conditions for a typical epoxidation with per-acid generated in-situ to promote ring-opening by water. Hot water-promoted (Wang et al., "Hot Water-Promoted Ring-Opening of Epoxides and Aziridines by Water and Other Nucleopliles," *J. Org. Chem.* 73:2270-2274 (2008), which is hereby incorporated by reference in its entirety) and sulfonic-acid catalyst resin (Usui et al., "Catalytic Dihydroxylation of Olefins with Hydrogen Peroxide: An Organic-Solvent- and Metal-Free System," *Angew. Chem. Int. Ed. Engl.* 42(45):5623-5625 (2003), which is hereby incorporated by reference in its entirety) epoxide ring-openings have been previously reported for a wide array of olefins. Incidentally, the acetic acid-promoted ring opening pathway faces a rather steep energy barrier (Caillol et al., "Synthesis of New Polyester Polyols From Epoxidized Vegetable Oils and Biobased Acids," *Eur. J. Lipid Sci. Technol.* 114(12):1447-1459 (2012), which is hereby incorporated by reference in its entirety) and diol 6 can be obtained in reasonable yields and purity. The lactic acid ring-opening of 9,10-epoxyoctadecanoic acid (10) to afford the mixture of regioisomeric products 12a and 12b (Scheme 2) was chosen as an extreme model to compare the physical properties of a hydroxyl and ester dual functionalized fatty acid. Previous work has shown that EG, and PEG200 bridged diesters of stearic acid show desirable properties for paperboard coating which may translate well for use in fruit coatings (Fei et al., "Synthesis and Characterization of Soybean Oil-Based Waxes and Their Application as Paraffin Substitute for Corrugated Coating," *J. Ind. Eng. Chem.* 58:113-122 (2018), which is hereby incorporated by reference in its entirety). The physical properties of neat functionalized fatty monomers 11 and 12a-b were not measured as these were viscous, oily semi solids in ambient conditions. Accordingly, these were formulated into diesters at variable ratios and characterized; generally, increasing the content of hydroxyl and dual functionalized monomers resulted in soft, tacky and dull solids which limited their utility (see Hardness, Cohesiveness and Melting Point sections).

tion and Factors Influencing Crystal Habits," *Planta* 195: 257-270 (1994), which is hereby incorporated by reference in its entirety, showed that the melting point of 82° C. for the enantiomerically pure natural plant epicuticular wax, (S)-10-nonacosanol, decreased with an increasing percentage of synthetic (R)-10-nonacosanol mixed in, reaching its lowest point of 76° C. for the racemate. The HCO and HCOFFA racemic analogues, 3 and 4a-b, likewise exhibited a drastic decrease in melting point with a concomitant decrease in hardness. For enantiomerically pure secondary fatty alcohols, it has been proven that the crystal arrangement preferentially orients the alkyl chains in an antiparallel fashion, placing hydroxyl substituents adjacent to one another, promoting favorable inter-chain hydrogen bonding. These conditions result in only minimal perturbations in the largely orthorhombic crystal lattice (Jetter et al., "Epicuticular Crystals of Nonacosan-10-ol: In-Vitro Reconstitution and Factors Influencing Crystal Habits," *Planta* 195:257-270 (1994); Lunden, B. M., "The Crystal Structure of 12-D-Hydroxyotadecanoi Acid Methyl Ester," *Acta Cryst.* B32: 3149-3153 (1976), which are hereby incorporated by reference in their entirety). In contrast, for racemic mixtures of 10-nonacosanol hydrogen-bonding between two opposite enantiomers is presumed to be confined to a pair, which

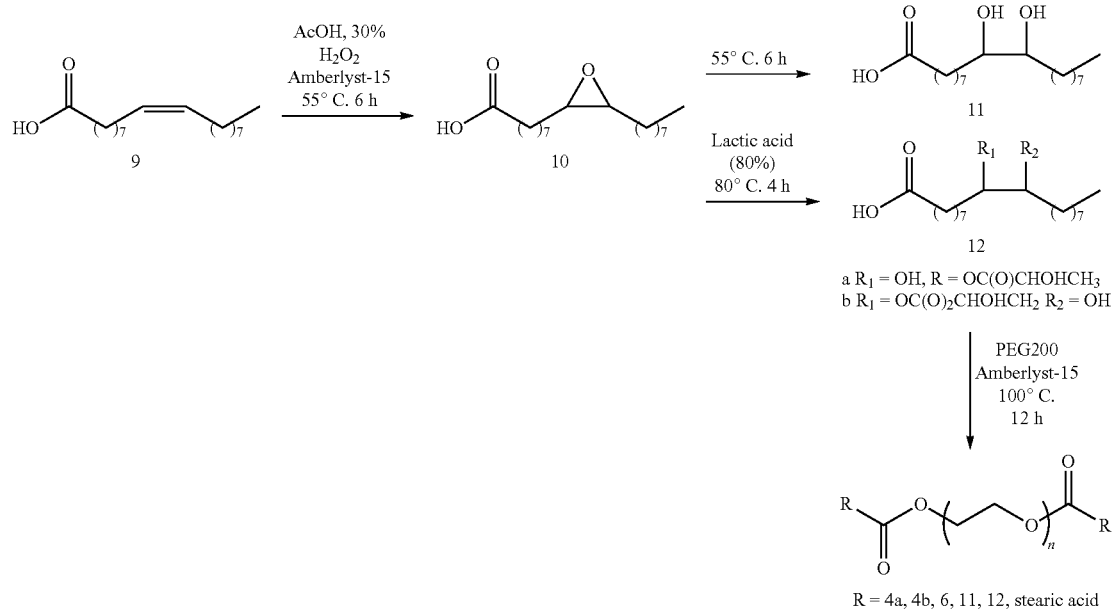

Scheme 2 a $R_1 = OH$, $R = OC(O)CHOHCH_3$
b $R_1 = OC(O)_2CHOHCH_2$ $R_2 = OH$

R = 4a, 4b, 6, 11, 12, stearic acid

Physical Characterization of Wax Coating Materials
Hardness, Cohesiveness, and Melting Point Hydroboration can be a powerful tool for asymmetric synthesis, provided the olefin offers a structural or electronic bias. The internal cis-double bond on an oleic fatty acyl chain does not provide such bias, however, and in the hydroboration-oxidation of HOSO the product consists of a mixture of regio- and enantiomeric alcohols. HCO (5) is composed of up to 94% (R)-12-hydroxystearic acid (6), with the balance consisting of fully saturated fatty acids after hydrogenation. This stereochemical homogeneity is most likely responsible for their high hardness, high melting point and high relative crystallinity (Table 1). Jetter et al., "Epicuticular Crystals of Nonacosan-10-ol: In-Vitro Reconstitudisrupts extended interactions thereby introducing a degree of disorder. These observations can be reasonably extended to explain the melting point depression, decrease in hardness and relative crystallinity for triacylglyceride of regioisomeric hydroxyoctadecanoic acid (3) with respect to hydrogenated castor oil (5); assuming a single HOSO molecule is composed of exactly three oleate chains, then there exist a total of 64 possible arrangements of isomeric alcohols after oxidation. Interestingly, hydroxy free-fatty acid 6 was significantly more crystalline than TAG 5; perhaps this can be attributed to the ability of (R)-12-hydroxyoctadecanoic acid (6) to orient in a head-to-head fashion to form double layers (Koch et al., "The Hydrophobic Coatings of Plant Surfaces: Epicuticular Wax Crystals and Their Morphologies, Crystallinity and Molecular Self-Assembly," *Micron* 39(7):759-772 (2008), which is hereby incorporated by reference in its entirety), which in turn are further stabilized by the enantiomerically pure hydroxyl at C-12 also accounting for the higher relative crystallinity compared to racemate analogue 4a-b. Mixture of glycerides 2 was relatively more crystalline than TAG 3, perhaps due to a chain-lengthening effect by the glycerol backbone hydroxyl. Ketones 7 and 8 were softer than the corresponding fatty alcohols 6 and 5, although harder than racemic alcohols 3 and 4a-b, and melting point ranges mirrored these results. From the crystal structure of 13-oxoisostearic acid (m.p. 76.9-77.2° C.; analogous to ketone 7) it has been shown the $sp^2$ keto moiety is incorporated into the voids of neighboring methylene zigzag chains resulting in minimal disturbance of ordered packing (Dahlen, B., "The Crystal Structure of 13-Oxoisostearic Acid," *Acta Cryst*. B28:2555-2562 (1972), which is hereby incorporated by reference in its entirety). Accordingly, this feature is likely responsible for the observed intermediate melting points and high relative crystallinity for 12-oxooctadecanoic acid (7) and oxidized hydrogenated castor oil (8). Cohesiveness for many of the materials was not significantly different, although a decrease in relative crystallinity was usually accompanied with a decrease in cohesiveness. Defined herein as the strength of interatomic and intermolecular forces, it is reasonable to expect the ability to pack into ordered crystalline structures contributes to overall structural cohesion. Hardness is more likely to be related to the crystalline structure rather than relative crystallinity. CAR was the hardest, most cohesive and high melting material likely due to its high crystallinity resulting from its diverse chemical composition of straight chain fatty esters, o-hydroxy esters and p-hydroxycinnamic esters and well documented orthorhombic crystal structure. Interestingly, glyceride mixture 2 was very cohesive despite its low relative crystallinity, probably due to hydrogen-bonding from the glycerol backbone hydroxyl(s). Nevertheless, the π-stacking interactions arising from the aromatic moieties of the various constituents in CAR may be contributing to the observed high hardness and cohesiveness.

to their racemic nature and large, hydrogen-bond capable protrusions which inhibited close-packing. Formulating vicinal diol 11 and lactic acid polyol 12 into PEG200 bridged diesters of stearic acid generally improved hardness and melting point only at ratios above 9000 stearic acid, owing to the ability of the latter for close packing. Ratios below 90% stearic acid, as expected, were much softer and greasy at ambient conditions. Given that the objective of the present study was to maximize HOSO utilization, these materials were discarded as potential candidates for fruit coating waxes and serve only as an illustrative point that increasing the degree of disorder from the mixture of isomeric diols destroys the ability for ordered crystal packing.

Crystal Morphology

Figure 5:
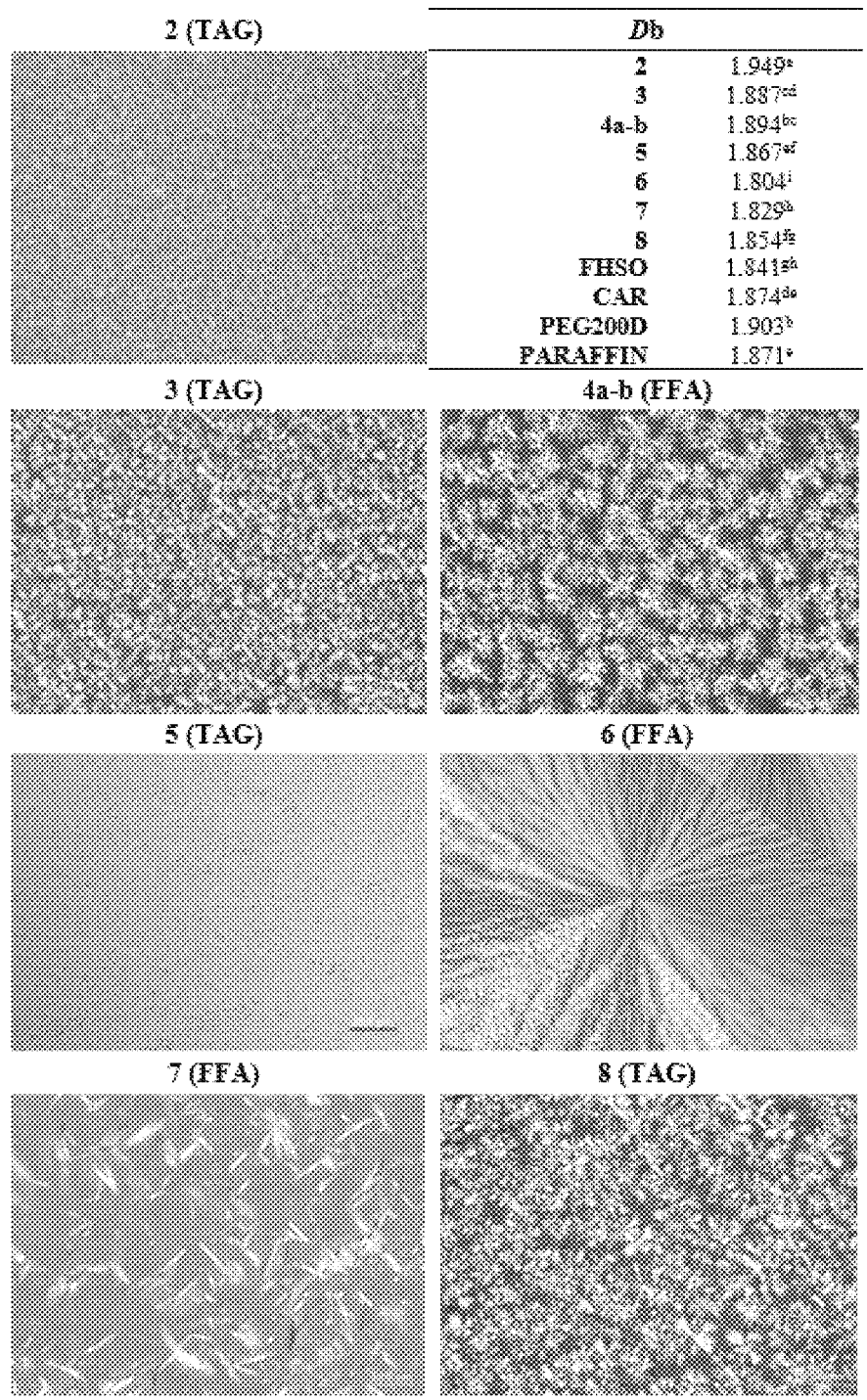
FIG. 5 shows crystal morphology of selected materials cooled at ambient conditions, classified by structural similarity. TAG=triacylglycerol, FFA=free fatty acid, S=straight chain. Scale bar inside image is equal to 20 μm. For fractal dimension values (db), means denoted with a letter are significantly different at p=0.05
Figure 5:
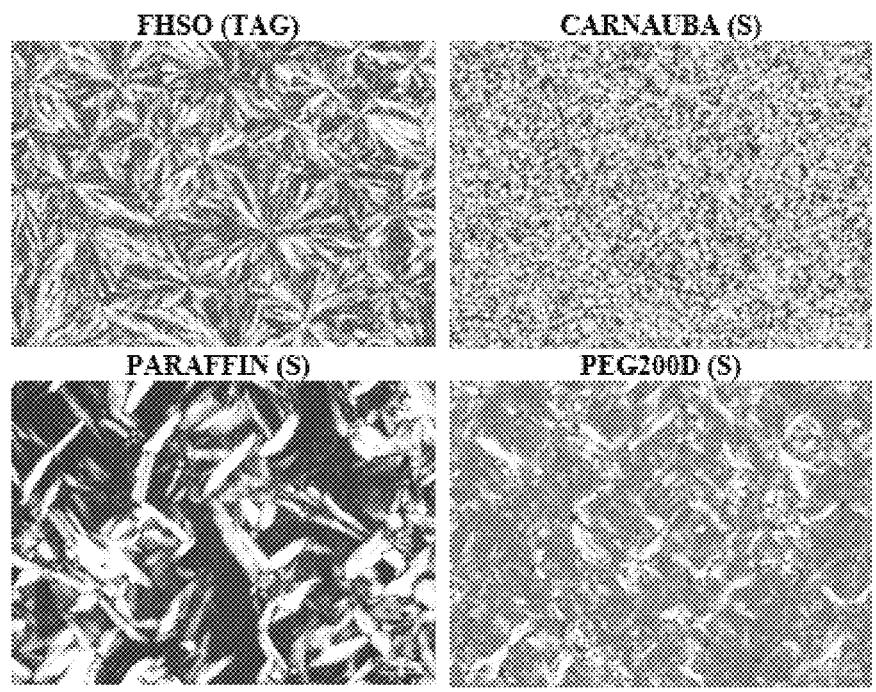

Microscopy images revealed that TAG compounds 2, 3, 5, 8 crystallized into fine clusters, except for FHSO which crystallized into large spherulites (FIG. 5). The free fatty acid counterparts, 4a-b, 6 and 7 had more diverse morphologies, however. Racemic and isomeric mixture 4a-b, formed large crystal cluster aggregates, leaving large gaps of open space. This behavior is likely due to the enantiomeric pairwise hydrogen-bonding annihilation mentioned previously (Jetter et al., "Epicuticular Crystals of Nonacosan-10-ol: In-Vitro Reconstitution and Factors Influencing Crystal Habits," *Planta* 195:257-270 (1994), which is hereby incorporated by reference in its entirety). Enantiomerically pure hydroxy-free fatty acid 6 crystallized into very large spherulites, which is in stark contrast to 4a-b and its TAG counterpart 5. Once again, this can be attributed to the chiral secondary alcohol, which elicits helical crystalline conformations as described by Koch et al., "The Hydrophobic Coatings of Plant Surfaces: Epicuticular Wax Crystals and Their Morphologies, Crystallinity and Molecular Self-Assembly," *Micron* 39(7):759-772 (2008), which is hereby incorporated by reference in its entirety, for (S)-10-nonacosanol as well as the twisting reorientation of lamellar crystals due to anisotropic stress (Toda, A., "Spherulitic Growth in Crystalline Polymers," In Encyclopedia of Polymers and Composites 1-12 (2013), which is hereby incorporated by

TABLE 1

Summary of Physical Properties of Wax Materials

| Entry[†] | Hardness ($mm^{-1}$) | Cohesiveness (g mm) | Melting Point Range (° C.) | Enthalpy of Melting (J/g) | Relative Crystallinity* (%) |
|---|---|---|---|---|---|
| 2 | 0.59 ± 0.04 | 1061 ± 128 | 44-46 | 51.3 ± 5.2 | 17.7 ± 1.8$^e$ |
| 3 | 0.68 ± 0.05 | 113 ± 13 | 50-52 | 37.3 ± 4.3 | 12.9 ± 1.5$^{ef}$ |
| 4a-b | 0.30 ± 0.02$^e$ | 95 ± 1 | 66-67 | 18.3 ± 0.1 | 6.3 ± 0.4$^f$ |
| 5 | 5.33 ± 0.01$^b$ | 316 ± 59 | 83-87 | 109.2 ± 0.2 | 37.7 ± 0.6$^{cd}$ |
| 6 | 2.22 ± 0.04$^c$ | 1443 ± 30$^c$ | 71-72 | 148.4 ± 3.1 | 51.2 ± 1.0$^{ab}$ |
| 7 | 0.63 ± 0.08 | 360 ± 34 | 72-75 | 124.3 ± 29.4 | 42.8 ± 10.1 |
| 8 | 0.50 ± 0.09 | 203 ± 49 | 77-78 | 126.8 ± 2.0 | 43.7 ± 0.7 |
| FHSO | 1.6 ± 0.09$^d$ | 521 ± 102 | 61-66 | 116.5 ± 0.6 | 40.2 ± 0.2$^{bcd}$ |
| CAR | 9.05 ± 0.01$^a$ | 7371 ± 1366$^a$ | 81-83 | 180.7 ± 1.3 | 62.3 ± 0.5$^a$ |
| Paraffin | 0.55 ± 0.01 | 2612 ± 424$^e$ | 66-67 | 130.3 ± 4.8 | 44.9 ± 1.6 |
| PEG200D** | 0.66 ± 0.05 | 5628 ± 1221$^b$ | 43-44 | 94.9 ± 0.5 | 32.7 ± 0.2$^d$ |

[†]refer to Scheme 1 for structures
*290 J/g for a 100% crystalline material
**material previously developed; stearic acid diester bridged with PEG200 (Fei et al., "Synthesis and Characterization of Soybean Oil-Based Waxes and Their Application as Paraffin Substitute for Corrugated Coating," *J. Ind. Eng. Chem.* 58: 113-122 (2018), which is hereby incorporated by reference in its entirety)

For hardness, cohesiveness and relative crystallinity columns, means not denoted with a letter are not significantly different at p=0.05

Both diester monomers, vicinal diol 11 and lactic acid polyol 12a-b were viscous semi-solids at r.t. presumably due reference in its entirety) which differs from the spherulitic growth seen from FHSO. Ketone 7 crystallized as long, fibrous clusters, which may be attributed to the ability of the carbonyl to pack well with neighboring fatty acyl chains. The crystal morphology of hydrogenated castor oil (5) was not resolved well by PLM at 100× magnification. Nevertheless, a number of HCO crystal morphologies including fibers, rosettes (different from spherulites), and other irregular crystals have been previously reported (Yang et al., "Crystal Morphology of Hydrogenated Castor Oil in the Crystallization of Oil-in-Water Emulsions: Part I. Effect of Temperature," *Ind. Eng.*, 50(20):11585-11593 (2011), which is hereby incorporated by reference in its entirety). CAR and PEG200D diester previously developed exhibited similar distributions to ketone 7, despite their different chemistry. For this reason, it was investigated whether crystal density or spatial distribution could be correlated with the targeted physical properties. Meng et al., "Characterization of Graininess Formed in all Beef Tallow-Based Shortening," *J. Agric. Food. Chem.* 58(21):11463-11470 (2010), which is hereby incorporated by reference in its entirety, and others (Chai et al., "Non-Triglyceride Components Modulate the Fat Crystal Network of Palm Kernel Oil and Coconut Oil," *Food Res. Int.* 105:423-431 (2018), which is hereby incorporated by reference in its entirety) have previously used the fractal dimension (db) of two-dimensional PLM images as a quantitative measure of the overall complexity of crystal network, which can be used to gauge the spatial distribution of crystals. Generally, higher db values are associated with ordered crystal networks, while disordered crystal networks correspond to lower db values. Although materials with db values above 1.86 did tend to exhibit high hardness and or cohesiveness, overall these were not reliable predictors. For example, PEG200D and glyceride mixture 2 had the highest (although significantly different) db values at 1.903 and 1.949, respectively, as well as high cohesiveness, similar hardness and melting range yet mixture 4a-b was comparatively much less hard and cohesive despite having a db value not significantly different from PEG200D. CAR and hydrogenated castor oil (5), which were the hardest materials; however, both had comparatively lower db values. Indeed, the chemistry of the wax influences the morphology of wax crystals, however coherence between the two is not always guaranteed (Koch et al., "The Hydrophobic Coatings of Plant Surfaces: Epicuticular Wax Crystals and Their Morphologies, Crystallinity and Molecular Self-Assembly," *Micron* 39(7):759-772 (2008), which is hereby incorporated by reference in its entirety).

Gloss is related to the specular reflection of a material's surface, which in turn increases if the surface is flat or has very small irregularities. Thus, if a crystalline network exhibits a relatively high fractal dimension (space-filling capacity), this value may be able to be correlated to gloss for a given crystalline network, crystallization condition or morphology. Visually lustrous materials 2, 3, and CAR all had high db values, while large cluster and spherulite forming materials 4a-b, 6, 8, and FHSO, as well as the large needles of PAR and 12-oxooctadecanoic acid (7) had lower db values and were dull. HCO is very lustrous, although its intermediate db value—which may not be suggestive of high gloss—may be due to the poor resolution image obtained with our PLM.

Citrus Coating Formulation and Performance
Wax Coating Emulsions

CAR finds the most widespread use in the manufacture of wax emulsions for post-harvest citrus coating despite its high cost and volatile prices. Typically, CAR emulsions for citrus coating were compounded with proprietary resin blends and other ingredients which incurred an added cost to the manufacturer. Thus, in order to reduce the need for resins or CAR itself, lustrous materials 2 and 3 were compounded with CAR into emulsions. Previously, several complications have been encountered in formulating FHSO, as well as PEG fatty diesters, into stable, low-viscosity, small-particle size emulsions, and in some cases emulsions could not be formulated at all. However, both hydroxy materials 2 and 3 were successfully made into low-viscosity emulsions using a well-known wax-to-water method (Hagenmaier et al., "Wax Microemulsions and Emulsions as Citrus Coatings," *J. Agric. Food. Chem.* 42:899-902 (1994), which is hereby incorporated by reference in its entirety). The structures of glyceride mixture 2 and triacylglyceride of regioisomeric hydroxyoctadecanoic acid (3) resemble components of commercial cosurfactants and emulsifiers Labrasol® and Cremophor RH 40®, respectively, a feature superficially being attributed to their emulsifying ability. The screening methodology and characterization for the citrus coating emulsion formulation is presented in the subsequent portion of this study.

Moisture Weight Loss and Appearance of Coated Citrus

Figure 6:
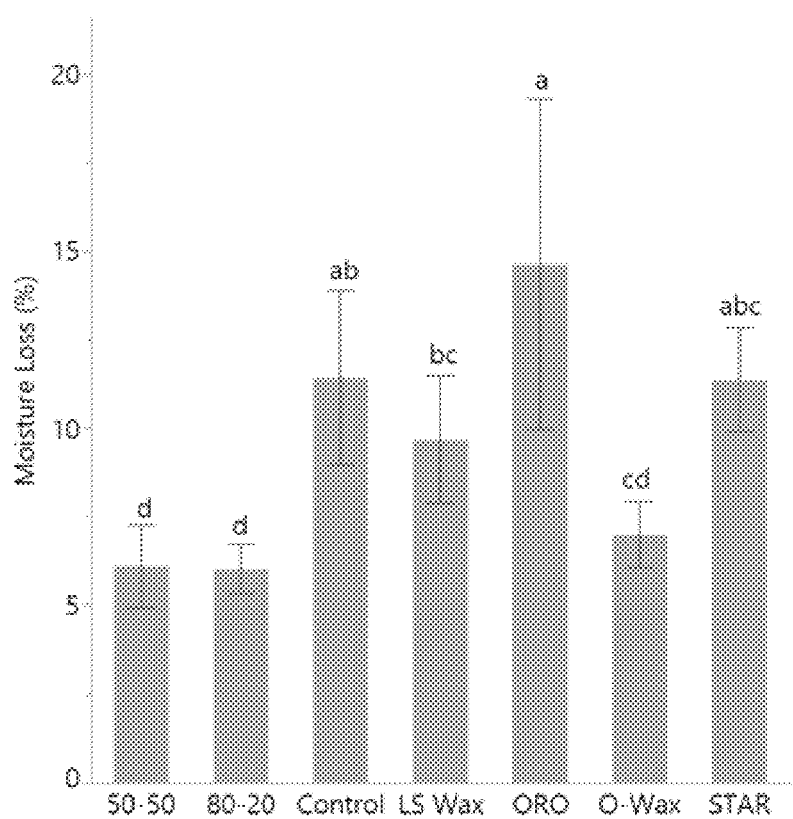
FIG. 6 a bar graph showing total moisture loss (%) of Valencia oranges coated with wax emulsions (0.5 mL/fruit) over a 2-week storage period at 22-23° C. and 65-75% RH. Means with the same letters are not significantly different at p=0.05. Error bars represent standard deviation of total moisture loss (%) per treatment.
Figure 7:
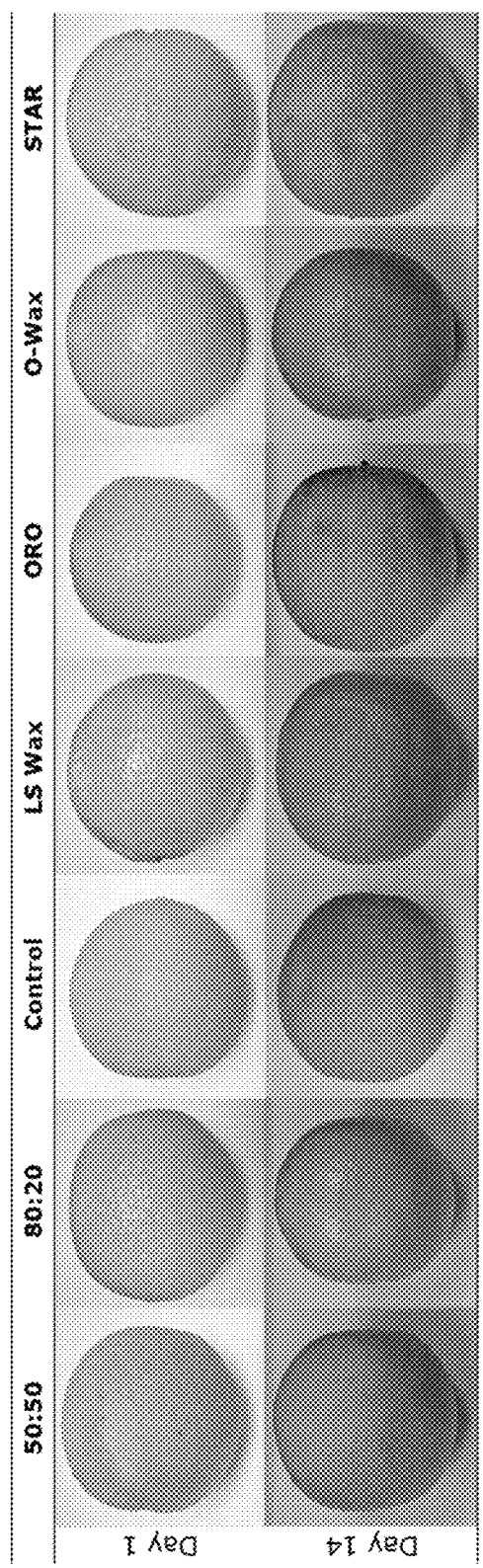
FIG. 7 is an image showing the appearance of Valencia oranges coated with wax emulsions (0.5 mL/fruit) over a 2-week storage period at 22-23° C. and 65-75% RH.

Moisture weight loss performance of the candidate wax emulsion was compared against the commercial microemulsion benchmarks O-Wax (carnauba-based), LS-Wax (polyethylene-based), ORO (carnauba-based) and Star-O (shellac-based). Fruit were coated by hand, dried with a hot air gun (50-55° C.) to simulate commercial packing house processing conditions and stored at 22-23° C. and 65-75% RH. The total moisture loss (%) of coated fruit are summarized on FIG. 6, and the appearances are shown in FIG. 7. The exact composition of each commercial benchmark wax microemulsions is proprietary information, thus the high moisture loss variability seen from ORO (14.6±4.7%) coated fruit versus O-Wax (7.0±0.9%), which are both based on CAR wax, cannot be adequately explained. Nevertheless, the 11.4±1.5% total moisture loss exhibited by STAR wax is reasonable, as the water vapor permeability of shellac (4.63-6.61 $g[m \cdot s \cdot Pa]^{-1} \times 10^{-12}$ at 30° C.) is much higher than CAR wax (0.18 $g[m \cdot s \cdot Pa]^{-1} \times 10^{12}$ at 25° C.) (Donhowe et al., "Water Vapor and Oxygen Permeability of Wax Films," *J. Am. Oil Chem. Soc.* 70(9):867-873 (1993), which is hereby incorporated by reference in its entirety). There was no significant difference between the compounded emulsions using 50:50 (6.1±1.1%) and 80:20 (6.0±0.7%) CAR: glyceride mixture 2 (wt %), although the 80:20 formulation imparted a very attractive gloss to the coated fruit; increasing the content of glyceride mixture 2 beyond 20 wt % into compounded emulsions did not impart any gloss. There was no significant difference between 50:50 CAR: glyceride mixture 2, 80:20 CAR: glyceride mixture 2 and O-Wax (7.0±0.9%) in terms of total moisture loss, although both CAR: glyceride mixture 2 formulations were significantly more effective in preventing moisture loss compared to LS-Wax (9.7±1.8%), ORO, STAR, and uncoated fruit (11.4±2.5%). It is believed that the presence of the aliphatic TAG structure contributed significantly to moisture loss prevention, while the racemic hydroxyl moieties inhibited crystallization. The crystallizing-out of wax coatings is a known defect, and imparts the coated fruit surface with an undesirable, white, flaky appearance. Certain treatments exhibited an obvious wrinkling and drying of the peel as well as wax crystallizing out (for LS Wax and ORO), although these defects were much less pronounced for both CAR:2 treatments and O-Wax.

Conclusion

The racemic nature of the singly hydroxy-functionalized HOSO compounds 2 and 3 obtained via hydroboration-oxidation of HOSO had a direct and marked impact on their physical properties of and failed to match that of the enantiomerically pure analogue, HCO. Nevertheless, these materials showed promise as partial replacements of costly HCO and CAR waxes for formulating emulsions for the postharvest coating of citrus fruit to prevent moisture loss while maintaining the requisite gloss. The hydroboration-oxidation can be carried out under mild conditions and with the generation of environmentally benign salts as waste products, further highlighting the feasibility for commercialization.

Example 21—Materials

High-Oleic Soybean Oil (HOSO) was provided by DuPont (Wilmington, DE, USA). Carnauba (CAR), oxidized polyethylene, shellac resin, and organic carnauba wax-based fruit coating emulsions with solid contents of 20-22% (O-Wax, LS-Wax, STAR, ORO, respectively) as well as fresh, uncoated Valencia oranges were provided by Fruit Growers Supply (Exeter, CA, USA). Fully hydrogenated soybean oil (FHSO) was provided by Stratas Foods (Memphis, TN, USA), and hydrogenated castor oil (HCO) was provided by Acme-Hardesty Co. (Blue Bell, PA, USA). Borane-tetrahydrofuran complex (BTHF, 1.0 M, Oakwood Chemicals), oleic acid (tech. grade 90%), morpholine, imazalil, thiabendazole, and other chemicals were purchased from Fisher Scientific (Pittsburgh, PA, USA) and/or MilliporeSigma (St. Louis, MO, USA) and used as received.

Example 22—Synthesis of Hydroborated-Oxidized High-Oleic Soybean Oil (HBO-HOSO)

An oven-dried, 500 mL three-necked round-bottomed flask was sealed, purged with nitrogen, and cooled in an ice/water. Subsequently, 57.0 mL (57 mmol) 1.0 M BTHF were added using standard air-free techniques, followed by the dropwise addition of 19.4 g Plenish HOSO (55 mmol) with an addition funnel. Upon full addition, 10 mL of distilled water were added dropwise to destroy gel and excess BTHF, and the mixture was left to stir for 10 min. Contents were cooled to 0° C. in an ice/water bath, and 14.0 mL of 3 M sodium hydroxide (42 mmol) were added first, followed by dropwise addition of 7.2 mL 30% hydrogen peroxide (70 mmol). The mixture was allowed to warm to 23° C. with stirring for 1 hour, extracted with 2×30 mL ethyl acetate, and the pooled organic layers were washed twice with saturated brine, dried over sodium sulfate, and concentrated under vacuum to afford 18-19 g (90% yield) of a translucent light-white oil which solidified upon cooling. The structure of HBO-HOSO was characterized by $^1$H NMR (Bruker Avance NEO 500 MHz, Rheinstetten, Germany). All samples were prepared in chloroform-d (CDCl$_3$), and spectra were collected at room temperature (25±1° C.). Data were processed using the MestReNova software (Mastrelab Research, Escondido, CA, USA): δ 5.25 (m, J=5.5, 4.5 Hz, 1H), 4.30 (dd, J=11.9, 4.3 Hz, 2H), 4.17 (dd, J=11.9, 6.0 Hz, 2H), 3.74 (m, 1H), 3.68 (q, J=13.0, 6.5 Hz, 2H), 3.57 (br, 3H), 2.30 (m, 5H), 1.67-1.60 (m, 12H), 1.42-1.24 (br, 85H), 0.87 (t, J=6.9 Hz, 9H).

Example 23—Formulation of Emulsions

Emulsions with an average solid content of 20% were formulated using the wax-to-water method reported by Hagenmaier et al., "Wax Microemulsions and Emulsions as Citrus Coatings," *J. Agric. Food Chem.* 42:899-902 (1994), which is hereby incorporated by reference in its entirety, with minor modifications. In general, 100 g of wax and 25 g of oleic acid were heated to 100° C. using a hot plate stirrer (Fisherbrand Isotemp, Waltham, MA, USA) and 25 g morpholine was then stirred in. The mixture was immediately poured into 600 mL of water (90-95° C.) and homogenized at 5,000 rpm for 30 s using a Homogenizer 850 (Fisher Scientific, Hampton, NH, USA). The homogenized mixture was then cooled to about 25° C. in an ice water bath and stored at 25° C. in a closed container. To test the effect of CAR addition, CAR and HBO-HOSO were mixed at ratios of 50:50, 70:30, and 80:20 to form the 100 g wax, and the amount of other components used for emulsion formulation remained unchanged. CAR-FHSO and CAR-HCO mixtures with the same proportions were also tested for emulsions formulation.

Example 24—Emulsion Stability

The stability of wax emulsions was determined according to Gharibzahedi et al., "Response Surface Modeling for Optimization of Formulation Variables and Physical Stability Assessment of Walnut Oil in-Water Beverage Emulsions," *Food Hydrocoll.* 26:293-301 (2012), which is hereby incorporated by reference in its entirety. The prepared emulsions were transferred into stoppered graduated tubes and the stability behavior of the emulsions was observed for 60 days under room temperature (23±2° C.). The stability of emulsion to creaming was calculated using the following equation:

$$R = \frac{H_E}{H_T} \times 100\% \qquad (\text{Eq. 1})$$

where R represents the fraction of emulsion phase, $H_E$ represents the height of the emulsion layer, and $H_T$ represents the total height of the emulsion system (including the height of emulsion phase and the height of the separated water).

Example 25—Rheological Properties, Particle Size and Crystal Morphology of Emulsions Emulsion's apparent viscosity was measured using a Discovery HR-2 hybrid rheometer (TA Instruments, New Castle, DE) at 25° C. Approximately 25 mL of the emulsion were loaded into a concentric cylinder geometry attachment and equilibrated for 1 min before measurement. The shear rate was set from 0.01-1000 s$^{-1}$ and data points were recorded every one second. The apparent viscosity of the emulsion was recorded, plotted against shear rate, and compared at specific shear rates.

Particle size of the emulsions was measured using a Malvern Zetasizer Nano ZS (Westborough, MA). Emulsions were diluted 20 times prior to the measurement. The refractive index was set to 1.467 and all measurements were carried out at 25° C. and the average of three readings were reported.

The crystalline morphology of the emulsions was observed by using polarized light microscopy (PLM). To create a thin layer of liquid for better observation, the emulsion was diluted in water 10 times. One drop of the diluted emulsion was placed on a microscopy slide, and a cover slide was slipped over and pressed to produce a thin layer of emulsion. The prepared slide was analyzed using a BX41 PLM (Olympus, Tokyo, Japan) immediately after

Example 26—Performance Evaluation of Citrus Fruit Coatings

Commercial fruit coating emulsions (O-Wax, LS-Wax, STAR, and ORO) were used as controls. Freshly harvested and uncoated fruit provided by Fruit Growers Supply (Exeter, CA, USA) were gently washed with warm soapy water to remove dirt and debris, allowed to dry in open air. Fruits are then carefully hand selected to maximize uniformity of initial conditions such as appearance and firmness to minimize fruit-to-fruit variation. To apply coatings manually, 0.5 mL/fruit delivered via a syringe were spread evenly over the surface using gloved fingers (Alleyne et al., "Candelilla-Shellac: an Alternative Formulation for Coating Apples," Hort Science 35:691-693 (2000), which is hereby incorporated by reference in its entirety). The coated fruit were dried using hot air (50° C.) blower (Master Appliance, Atlanta, GA, USA) for 3 min, set on a rack to fully air dry for 30 min, and stored for 14 days at 23° C. and 45% relative humidity (RH) in a temperature-controlled room to simulate market conditions. During storage, coating adherence to the fruit surface, surface gloss, firmness, coated fruit surface contact-to-contact adhesion, and moisture loss were monitored.

Gloss was measured at an angle of 60° using a glossmeter (WG60, FRU, CN) according to the method reported by Hagenmaier et al., "Wax Microemulsions and Emulsions as Citrus Coatings," J. Agric. Food Chem. 42:899-902 (1994), which is hereby incorporated by reference in its entirety, and expressed as gloss units (GU). Two fruits were used, and eight measurements were made per fruit. The gloss of coated fruit was monitored for 7 days.

The adherence of coatings to the fruit surface was obtained following ASTM D3359 method with modifications. A 25-mm wide semi-transparent pressure-sensitive tape was prepared and weighed prior to the test. The tape was then placed on a smooth area of coated citrus fruit and was firmly rubbed with finger until a good contact was made. After 90 seconds, the tape was removed by seizing one end and pulling it off rapidly. The weight gain of the tape was recorded as an indicator of coating adherence. A lower weight gain indicated a higher adherence. Four measurements were obtained per fruit and two individual fruits were measured.

Firmness of the fruit was assessed with a TA.XT-plus texture analyzer (Stable Micro Systems, Godalming, UK), equipped with a cylindrical plunger (11 mm diameter). The fruit was compressed for 10 mm at a speed of 1 mm/s, and the peak force was recorded as the firmness (N). Two measurements were obtained per fruit from opposite sides and two fruits were used. The contact-to-contact adhesion of coated fruit surfaces was also measured using the texture analyzer following ASTM D6183 method with modifications. Coated citrus fruit peels were cut into 25 mm diameter pieces. The pith-side of one sample was taped onto a 20 mm cylindrical probe, and another piece was similarly taped on the stainless-steel flat platform using Krazy Glue®. The two pieces were then compressed against each other at 1 mm/s to reach a 5% strain, and the probe was then withdrawn to its original position. The force required to break apart the two citrus skin pieces during the withdrawal was recorded as the adhesion of the coated fruit surface. Two individual fruits were used for each coating and three samples were made out of the peel from each fruit.

Moisture loss was monitored by recording the weight change of the coated fruit for 14 days under room temperature (typical shelf-life of whole oranges). The weight of the fruit taken after coating and drying on day 1 was used as the initial weight, and the weight was subsequently recorded every day until the end of the two-week storage period. Five replicates were measured per treatment, and an additional five uncoated fruits were used as control.

Example 27—Antimicrobial Effect of the Coating With and Without the Addition of Fungicide The antimicrobial activity of the emulsions was determined following the method reported by Yin et al., "Inhibition of *Aspergillus Niger* and *Aspergillus Flavus* by Some Herbs and Spices," J. Food Prot. 61:123-125 (1998), which is hereby incorporated by reference in its entirety, with minor modifications. A commercial paraffin wax emulsion was also added as a reference in addition to the commercial benchmarks provided by Fruit Growers Supply. *Aspergillus niger* (ATCC 16888) was grown by incubating for 72 hours on a potato dextrose agar (PDA) plate at 37° C. Then, 10 mL of 1% Tween 20 solution was added to harvest the spores from the PDA plate followed by centrifugation at 9800 m s$^{-2}$ for 25 min. The collected spores were washed with 10 mL sterile distilled water three times and were finally suspended in sterile distilled water after washing. The concentration of the spores was determined by using a hemocytometer, and then diluted to 6 $\log_{10}$ CFU/mL as the working culture. The working spore culture was stored at 4° C. until use, and 0.1 mL of the culture was spread on each PDA plate to obtain 5 $\log_{10}$ per plate. Emulsion samples containing fungicide were then prepared. For *Aspergillus niger* tests, emulsions with 100 mg/L imazalil (IMZ) and without IMZ (0 mg/L as control) were examined. To examine the antimicrobial activity of emulsion samples with and without fungicide addition, a sterile filter paper disk (22 mm diameter) containing 0.1 mL of the sample was loaded to the surface of the inoculated PDA plate. The plates were then incubated for 72 hours at 25° C. All tests were conducted in triplicate, and each sample were measured twice. The net zone of inhibition (mm) was determined as follows:

Net Zone of Inhibition Measured Zone of Inhibition—Diameter of the Paper Disk (Eq. 2)

Example 28—Statistical Analysis

Statistical analyses were performed using the JMP program (JMP Statistical Software, SAS Institute, Cary, NC, USA). Means and standard deviations were presented. One-way analysis of variance was carried out and differences between pairs of means were compared using a Tukey test. The significance level was set at 0.05.

Example 29—Results and Discussion of Examples 21-28

Chemical Composition of HBO-HOSO

The process for synthesizing HBO-HOSO is shown in Scheme 3 below.

Scheme 3

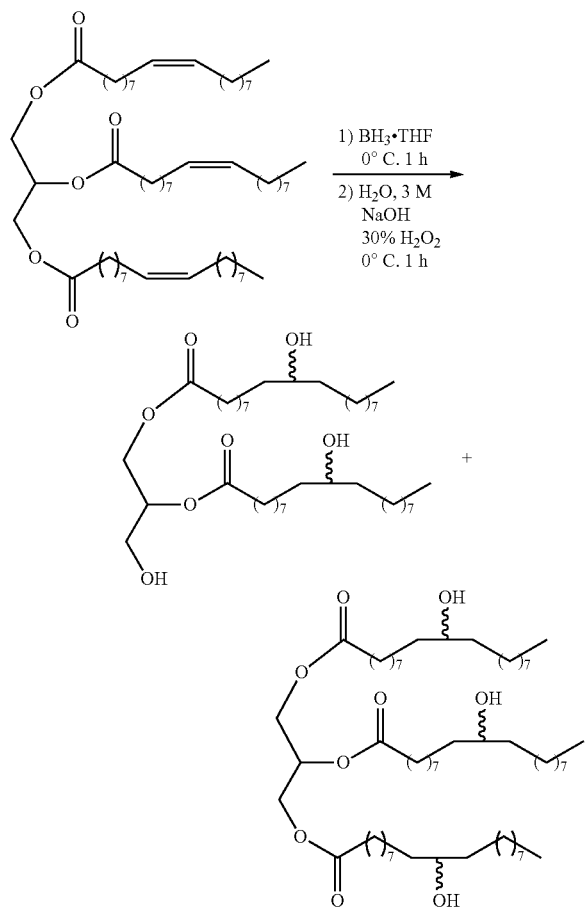

The hydroboration-oxidation reaction was performed by treating the generated alkylborane species with alkaline hydrogen peroxide to afford the respective alcohols. Hydrolysis of HOSO also took place under these conditions to yield a mixture of glycerides functionalized with single hydroxyl moieties. Based on the $^1$H NMR spectrum and the extraction procedure used, the HBO-HOSO synthesized mainly consisted of triglycerides (70%) and diglycerides (30%) of hydroxy fatty acids. This is in agreement with the findings reported by others (Leyva-Gutierrez et al., "Synthesis of Functionalized High-Oleic Soybean Oil Wax Coatings and Microemulsions for Postharvest Treatment of Fresh Citrus," Eur. J. Lipid Sci. Technol. 122(6):2000005 (2020), which is hereby incorporated by reference in its entirety). The product took the form of a very lustrous, white, and homogeneous waxy material, which was then used for formulating the emulsion for citrus fruit coating.

Stability of Emulsions

All emulsions remained stable during the 60-day closed-system room temperature storage period. No physical signs of instability were observed, and the emulsions remained uniform (FIG. 13). The good stability can be attributed to the small particle size of the emulsions (Table 2). However, beyond the 60-day storage, sedimentation was observed in the CAR based commercial benchmarks, especially for the ORO emulsion. Nevertheless, little sedimentation was observed in the HBO-HOSO containing emulsion. The better stability of the HBO-HOSO containing emulsions can be attributed to the hydroxy fatty acids as they were reported to improve emulsification properties and reduce surface tension when attached to phospholipids (Saha et al., "Preparation and Utilization of Hydroxy Fatty Acid Rich Soyphospholipid for Emulsifier Application in Food Products," Lecture Notes in Bioengineering: Advances in Bioprocess Engineering and Technology, Springer, Singapore (2021), which is hereby incorporated by reference in its entirety).

TABLE 2

Average Particle Size and Polydispersity Index (PDI) of Emulsions

| Samples | Particle size (nm) | PDI |
|---|---|---|
| STAR | 37.26 ± 27.24 | 0.44 |
| ORO | 255.90 ± 28.08 | 0.50 |
| LS-Wax | 40.31 ± 0.10 | 0.24 |
| O-Wax | 82.28 ± 0.80 | 0.50 |
| HBO-HOSO 100 | 671.53 ± 2.61 | 0.26 |
| HBO-HOSO 50-50 | 296.63 ± 5.03 | 0.45 |
| HBO-HOSO 30-70 | 279.6 ± 2.18 | 0.39 |
| HBO-HOSO 20-80 | 84.72 ± 0.16 | 0.76 |
| HCO 20-80 | 113.93 ± 0.49 | 0.32 |

Means were summarized and the intervals indicate standard deviations. LS-Wax—oxidized polyethylene-based; O-Wax—carnauba wax-based; ORO—organic carnauba wax-based; STAR—shellac resin-based; HCO—hydrogenated castor oil; HBO-HOSO—soywax from hydroboration-oxidation of high oleic soybean oil. The numbers 30-70, 50-50, and 20-80 indicate the mixing ratio of HBO-HOSO or HCO to carnauba wax.

Effect of CAR Wax Addition on Apparent Viscosity and Particle Size

Mixtures of HBO-HOSO and CAR wax containing 0 to 80% of CAR wax were used to formulate fruit coating emulsions. The apparent viscosity of the emulsions formulated using these mixtures in comparison with the four commercial emulsions are shown in FIG. 14. The apparent viscosity of the 100% HBO-HOSO-based emulsion was higher than that of the commercial ones at a shear rate below 400/s. Nevertheless, the apparent viscosity became lower than that of LS-Wax and STAR, although slightly higher than the O-Wax and ORO emulsions at a shear rate greater than 500/s. The commercial emulsions and the 100% HBO-HOSO-based emulsion all exhibited shear-thinning behavior at low shear rates but behaved as shear-thickening at high shear rates. The addition of CAR wax resulted in an increased apparent viscosity of the HBO-HOSO emulsions, and the mixture of HBO-HOSO and CAR wax (30:70) resulted in the highest apparent viscosity (FIG. 14). This is probably due to the increase in emulsifier concentration, as CAR's good emulsification properties and ester oil binding capacity make it a good co-emulsifier (Tinto, "Waxes," in Badel, ed. or eds., Pharmacognosy: Fundamentals, Applications and Strategy, Kingston, Jamaica: Academic Press, pp. 442-55 (2017), which is hereby incorporated by reference in its entirety). Irrespective of type, the apparent viscosity of an emulsion can be significantly altered by changing the emulsifier concentration (Sherman, "The Influence of Emulsifying Agent Concentration on Emulsion Viscosity," Kolloid-Zeitschrift 165:156-161 (1959), which is hereby incorporated by reference in its entirety) and others have similarly reported an apparent viscosity increase for oil-in-water emulsions with increasing emulsifier concentration (Shotton et al., "The Influence of Emulsifier Concentration on the Rheological Properties of an Oil-in-Water Emulsion Stabilized by an Anionic Soap," J. Pharm. Pharmacol. 20:439-449 (1968), which is hereby incorporated by reference in its entirety). Although the addition of CAR wax to HBO-HOSO led to an increased apparent viscosity, the higher content of CAR wax resulted in a more translucent emulsion suggesting a smaller emulsion droplet size. Finer droplets may also have contributed to the increased apparent viscosity with increased quantity of CAR wax (Yildirim et al., "The Effects of Emulsifier Type, Phase Ratio, and Homogenization Methods on Stability of the Double Emulsion," *J. Disper. Sci. Technol.* 38:807-814 (2017); Pal, "Rheology of Simple and Multiple Emulsions," *Curr. Opin. Colloid Interface Sci.* 16:41-60 (2011), which are hereby incorporated by reference in their entirety), which can in turn explain why STAR emulsions, despite being more translucent had a higher apparent viscosity than O-Wax and ORO emulsions.

FHSO and HCO were also used in emulsion formulation for a comparison between plant oil-based waxes. The mixture of FHSO and CAR wax (50:50) and 100% FHSO resulted in paste-like emulsions which were unusable for fruit coating, and as such FHSO was not further investigated. HCO resulted in flowable, low apparent viscosity emulsions and was also formulated as a mixture with CAR wax (20:80) to compare against the HBO-HOSO-containing emulsions. Considering the similarity between structures (i.e. functionalization with a single-hydroxyl group per fatty acyl chain), it was not surprising to see that the apparent viscosity of HCO emulsions was similar to those of HBO-HOSO. However, the appearances of HCO-containing (20:80) and HBO-HOSO-containing (20:80) emulsions were slightly different from one another, as shown in FIG. 13. The HBO-HOSO-containing emulsion appeared slightly more translucent than the HCO-containing emulsion. The overall apparent viscosity of the HBO-HOSO-containing emulsion was also slightly higher than the HCO-containing emulsion suggesting a positive correlation between apparent viscosity and emulsion droplet size. This difference may be due to the chemical composition of the two waxes as HBO-HOSO contained a mixture of glycerides, as evidenced by nuclear magnetic resonance spectroscopy. The higher apparent viscosity of HBO-HOSO containing emulsion may also attribute to its better stability.

Table 2 shows the particle size and polydispersity index (PDI) of the commercial and formulated emulsions. Corresponding to the findings in FIGS. 13 and 14, the average particle size of the STAR and LS-Wax emulsions were smaller compared to O-Wax and ORO emulsions. The average particle size of the HBO-HOSO containing emulsions was reduced with increasing amounts of CAR. This is in agreement with previous observations and confirmed that the addition of CAR resulted in finer emulsion droplets leading to an increase in apparent viscosity (Yildirim et al., "The Effects of Emulsifier Type, Phase Ratio, and Homogenization Methods on Stability of the Double Emulsion," *J. Disper. Sci. Technol.* 38:807-814 (2017); Pal, "Rheology of Simple and Multiple Emulsions," *Curr. Opin. Colloid Interface Sci.* 16:41-60 (2011), which are hereby incorporated by reference in their entirety). Comparing the HBO-HOSO and HCO containing emulsions, the HBO-HOSO emulsion had smaller particles, which once again relates back to the observed higher apparent viscosity and slightly better transparency. The smaller average particle size of the HBO-HOSO 20-80 emulsion may also have contributed to its better stability than the ORO emulsion. Nonetheless, PDI of the HBO-HOSO containing emulsions increased with increasing amount of CAR, indicating a broader particle size distribution.

Crystal Morphology of Waxes in Emulsions

To examine beyond the 0.3 nm-10.0 µm range of the particle size analyzer, PLM was used to view large droplet particles and wax crystallization in the emulsion system. No large crystals (>10 µm) were observed in STAR and HBO-HOSO (20:80) emulsions, while others did contain crystals larger than 10 µm (FIG. 15). This may lead to larger particle size and have contributed to the lower visual clarity of the O-Wax, ORO, HBO-HOSO (100), HBO-HOSO (30:70), and HCO (20:80) emulsions. Although large crystals were not observed in the HBO-HOSO (50:50) emulsion, the particles seemed to aggregate together forming larger droplets resulting in its characteristic low transparency. The number of the crystals in the emulsions was also different, with HBO-HOSO (30:70) having the highest density. The high crystal density likely lowered the density difference between droplet and medium, leading to the observed enhanced apparent viscosity (Johansson et al., "Water-in-Triglyceride Oil Emulsion. Effect of Fat Crystals on Stability," *J. Am. Oil Chem. Soc.,* 72:939-950 (1995), which is hereby incorporated by reference in its entirety).

Performance of the Optimal HBO-HOSO—Containing Emulsion for Citrus Fruit Coating The properties of HBO-HOSO (20:80) emulsion were the most comparable to the those of the commercial benchmarks, and was chosen for coating evaluation, although HBO-HOSO (50:50) was also used as a comparison. FIG. 16A shows the gloss of the fruit surface coated with different emulsions. All emulsions imparted a high gloss compared to the uncoated control except for HBO-HOSO (50:50) which behaved as an opacifier; this likely due to lower proportion of CAR wax and concomitant larger particle size of this emulsion. The STAR (shellac) emulsion imparted the highest initial gloss, although after 3 day storage, no difference was observed in gloss for the fruits coated with STAR, 0-Wax, ORO, LS-Wax, and HBO-HOSO (20:80) emulsions. The loss of gloss observed for the STAR emulsion coated fruit was likely due to the crystallizing-out of its components, as small opaque solids were observed on the fruit surface after the first week of two-week storage period. Alleyne et al., "Candelilla-Shellac: an Alternative Formulation for Coating Apples," *Hort Science* 35:691-693 (2000), which is hereby incorporated by reference in its entirety, also reported high gloss of shellac-coated fruit and similar decreasing trend in gloss during storage.

In regard to the adherence of the coating to the fruit surface (FIG. 16B), the commercial benchmarks had an overall slightly higher adherence to the fruit surface as some ingredients of these formulations are there for the sole purpose of enhancing the adherence and flexibility of the coating film. However, the adherence of the HBO-HOSO (20:80) emulsion coating was still comparable to the O-Wax and ORO emulsions. It was also observed that HBO-HOSO (50:50) had better adherence compared to HBO-HOSO (20:80). This is likely due to the higher amount of hydroxyl groups from the larger proportion of HBO-HOSO leading to better cohesiveness and interactions between the coating and the relatively hydrophilic fruit surface (Fei et al., "Synthesis and Characterization of Soybean Oil-Based Waxes and Their Application as Paraffin Substitute for Corrugated Coating," *J. Ind. Eng. Chem.* 58:113-122 (2018), which is hereby incorporated by reference in its entirety). After 7 day storage, a decreasing trend in adherence of the coating to fruit surface was observed for the commercial emulsions. This is likely due to the moisture loss leading to shrinkage of the fruit peel and subsequently easier separation of the coating and fruit surface. Flaking-off of rosin and shellac coatings was also reported in a study by Hagenmaier, "Fruit Coatings Containing Ammonia Instead of Morpholine," *Proc. Fla. State Hort. Soc.* 117:396-402 (2004), which is hereby incorporated by reference in its entirety. The adherence of the HBO-HOSO (20:80) did not significantly change after storage, and is comparable to 0-Wax, LS-Wax, and ORO. However, stronger adherence was seen with the HBO-HOSO (50:50) emulsion. This is possibly due to pendent hydroxyl groups promoting hydrogen bonding at the substrate surface.

The contact to contact adhesion between the coated fruit surface is shown in FIG. 17A. The ORO emulsion resulted in the highest adhesion while the control and HBO-HOSO (20:80) resulted in the lowest. Although STAR and 50:50 resulted in an adhesion that's not statistical different from control and 20:80, they were slightly higher. This corresponded to the slightly lower adherence of HBO-HOSO-containing emulsions to the fruit surface and indicated that such emulsion may lead to less damage from fruits rubbing against each other during packaging and transportation. The contact-to-contact interaction and adhesion between coated fruit, which results in patches of uncoated sections and build-up of coating residue on the surface of fruit, was reported to be a major quality defect arising from packaging and transport conditions. However, the information on contact-to-contact adhesion of fruit coatings is very limited in the current literature. The higher contact-to-contact adhesion of the commercial emulsions may be attributed to the tackiness of the resins included in the formulation for improving coating adherence and flexibility. FIG. 17B shows the firmness of the fruits after 14 day storage, and it was observed that fruits coated with different emulsions were not dramatically different from each other, except for ORO-coated fruit which were hard and firm. Incidentally, the ORO-coated fruit exhibited the greatest moisture loss during storage (FIG. 17C) and the high-firmness was simply a result of the drying of the peel. FIG. 17C also shows that HBO-HOSO-containing emulsions prevented moisture loss more effectively than commercial benchmarks except for O-Wax, which could be attributed to the role of hydroxyl groups from the HBO-HOSO structure binding surfaces and thus slowing down the rate of moisture diffusion. This is in agreement with the finding reported by others (Miyamoto et al., "Lipid Polarity Gradient Formed by ω-Hydroxy Lipids in Tear Film Prevents Dry Eye Disease," *eLife* 9:e53582 (2020), which is hereby incorporated by reference in its entirety). Overall, the performance HBO-HOSO (20:80) was comparable or better than commercial benchmarks in preserving the quality of coated fruit.

Antimicrobial Activity of Emulsions With and Without the Addition of Fungicide

*Aspergillus* spp. is the common fungi species which would lead to spoilage in grapes (Tian et al., "Efficacy and Possible Mechanisms of Perillaldehyde in Control of *Aspergillus Niger* Causing Grape Decay," *Int. J. Food Microbiol.* 202:27-34 (2015), which is hereby incorporated by reference in its entirety) and citrus fruit (Tournas et al., "Mould and Yeast Flora in Fresh Berries, Grapes and Citrus Fruits," *Int. J. Food Microbiol.* 105(1):11-17 (2005), which is hereby incorporated by reference in its entirety), and as such the antimicrobial activity of fruit coatings are important characteristics for maintaining quality and preventing postharvest losses. Table 3 summarizes the calculated net zone of inhibitions for *Aspergillus niger* by the emulsion samples with and without the addition of IMZ. For *Aspergillus niger*, no apparent inhibition was observed for the five commercial emulsions without the addition of IMZ, while the HBO-HOSO (20:80) emulsion exhibited an inhibition of *Aspergillus niger* growth even without the addition IMZ. Although morpholine was used in our emulsion formulation, only morpholine derivatives such as dodemorph, tridemorph, aldimorph, fenpropimorph, amorolfine, and silicon functionalized morpholine are known to possess antifungal activities (Jachak et al., "Silicon Incorporated Morpholine Antifungals: Design, Synthesis, Biological Evaluation," *ACS Med. Chem. Lett.* 6(11):1111-1116 (2015); Mercer, "Morpholine Antifungals and Their Mode of Action," *Biochem. Soc. Trans.* 19(3):788-793 (1991), which are hereby incorporated by reference in their entirety). The observed antifungal effect is thus likely due to the presence of the pendent hydroxyl groups in the HBO-HOSO. The interaction between hydroxyl group and membrane components has been postulated to result in the formation of pores on cellular membrane, leading to leakage and eventual cell death (Avis, "Antifungal Compounds That Target Fungal Membranes: Applications in Plant Disease Control," *Can. J. Plant Pathol.* 29:323-329 (2007); Bossche et al., "Molecular Mechanisms of Drug Resistance in Fungi," *Trends Microbiol.* 2:393-400 (1994); White et al., "Clinical, Cellular, and Molecular Factors That Contribute to Antifungal Drug Resistance," *Clin. Microbiol. Rev.* 11:382-402 (1998), which are hereby incorporated by reference in their entirety). With the addition of IMZ (100 mg/L), inhibition of *Apsergillus niger* was observed for all six samples. However, HBO-HOSO (20:80) and paraffin emulsions exhibited a more significant inhibition compared to the ORO, STAR, LS-Wax, and O-Wax (p<0.05). It is suspected that ORO, STAR, LS-Wax, and O-Wax may have a stronger interaction with IMZ because of the resins added to improve adherence, leading to a decreased release of IMZ, and subsequently a lower inhibition of *Aspergillus niger*.

TABLE 3

Net Zone Inhibition of *Aspergillus Niger* by Emulsion Samples With and Without the Addition of Imazalil (TMZ)

| Sample | Net zone inhibition (mm) 0 mg/L | Net zone inhibition (mm) 100 mg/L |
| --- | --- | --- |
| HBO-HOSO-20-80 | 3.83 ± 0.11$^a$ | 14.99 ± 1.56$^a$ |
| Paraffin | n.d. | 13.27 ± 1.58$^a$ |
| ORO | n.d. | 7.24 ± 1.93$^b$ |
| STAR | n.d. | 4.90 ± 0.92$^b$ |
| LS-Wax | n.d. | 4.35 ± 0.33$^b$ |
| O-Wax | n.d. | 4.08 ± 0.26$^b$ |

Means were summarized and the intervals indicate standard deviations. Means in each column followed by same superscript are not significantly different, p=0.05; n.d.: no inhibition was detected. LS-Wax—oxidized polyethylene-based; O-Wax—carnauba wax-based; ORO—organic carnauba wax-based; STAR—shellac resin-based; HCO—hydrogenated castor oil; HBO-HOSO—soywax from hydroboration-oxidation of high oleic soybean oil. The number 20-80 indicates the mixing ratio of HBO-HOSO to carnauba wax.

Overall, the HBO-HOSO (20:80) emulsion had no negative effect on the release of IMZ, and the observed antimicrobial effect from the emulsion itself, in conjunction with its desirable coating properties, has demonstrated several advantages over the current commercial fruit coating emulsions. The antimicrobial effect of the coating itself provides additional opportunities for ensuring citrus fruit quality, preventing postharvest loss, and lowering the risk of proliferation of pathogenic resistant strains. Moreover, the high domestic availability and low price of the HOSO can lead to a much lower price of HBO-HOSO compared to CAR wax, shellac wax, and synthetic resins, which may subsequently significantly lower the overall cost of the coating. This novel formulation is highly potential for the postharvest treatment of fresh fruits to impart sheen and reduce moisture loss, however, its effect on the internal atmosphere and sensory aspects of the coated fruit shall be evaluated in a future study.

CONCLUSIONS

A low apparent viscosity and relatively translucent soy wax-derived emulsion suitable for citrus fruit coating was successfully developed. The emulsion containing 20% of the soy-based component (HBO-HOSO) in its solid content provided citrus fruit with comparable surface gloss, firmness, and better moisture-retaining properties compared to the commercial emulsions. The adherence of this coating to the fruit surface was similar to that of the commercial benchmarks, although a lower coated surface contact-to-contact adhesion can be obtained with this emulsion coating reported herein. Additionally, the HBO-HOSO-containing emulsion had no difference in releasing fungicide such as IMZ compared to the commercial coatings and itself exhibited growth inhibition for *Aspergillus niger*, mold that commonly afflict citrus fruits and related industries.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A compound having the Formula (I):

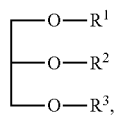
(I)

wherein $R^1$ is H or

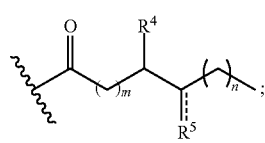

$R^2$ is H or

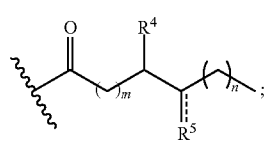

$R^3$ is H or

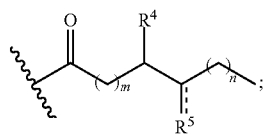

$R^4$ is H or —OH;
$R^5$ is H, —OH, or =O;

is a point of attachment of the $R^1$, $R^2$, or $R^3$ to its respective oxygen atom in the compound of Formula (I);

=== is a single or a double bond;
n is an integer from 1 to 13;
m is an integer from 2 to 19;
wherein at least one of $R^1$, $R^2$, or $R^3$ is

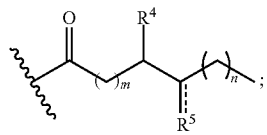

and
wherein when $R^4$ is H then $R^5$ is —OH or =O;
wherein when $R^5$ is H then $R^4$ is —OH;
wherein the compound is not a hydrogenated castor oil;
with the proviso that 1) when m is 5 and n is 5, then $R^4$ is not OH; 2) when m is 7 and n is 7, then $R^4$ is not OH; 3) when m is 8 and n is 6, then $R^4$ is not OH; 4) when $R^2$ is H, $R^3$ is H, m is 15, and n is 5, then $R^4$ is not OH;
or a stereoisomer thereof.

2. The compound of claim 1, wherein n is an integer from 3 to 7 and m is an integer from 7 to 13.

3. The compound of claim 1, wherein m is 7 and n is 7.

4. The compound of claim 1, wherein m is 9 and n is 5.

5. The compound of claim 1, wherein the compound has the Formula (Ia), Formula (Ib), Formula (Ic), or Formula (Id):

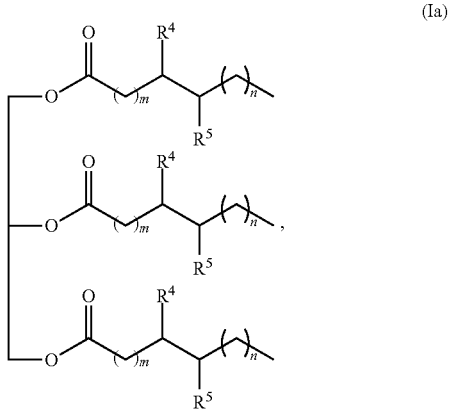
(Ia)

-continued
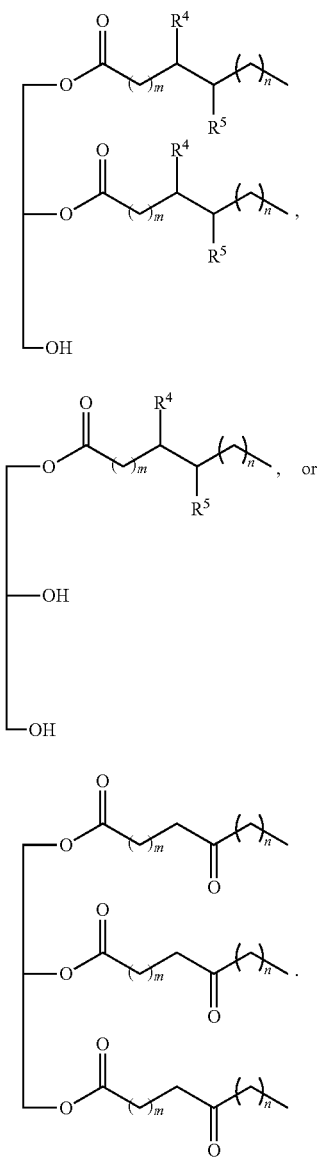
6. The compound of claim 1, wherein the compound is selected from the group consisting of
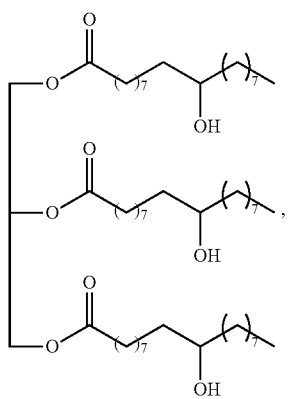
-continued
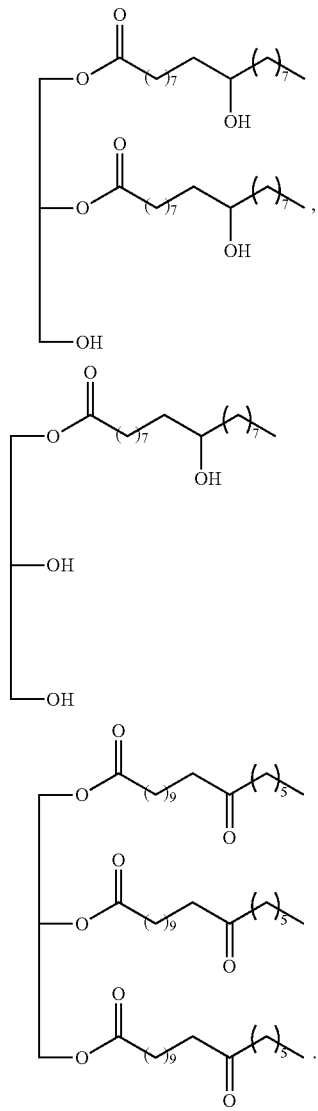
and
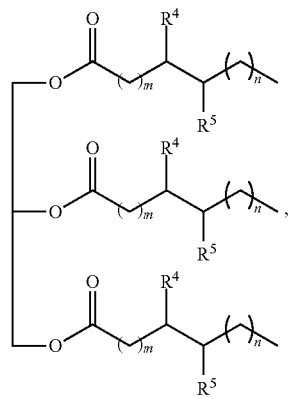
7. The compound of claim 1, wherein the compound has the Formula (Ia), Formula (Ib), Formula (Ic), or Formula (Id):

-continued

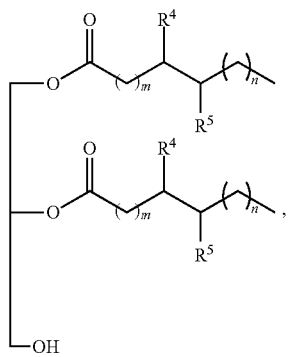
(Ib)

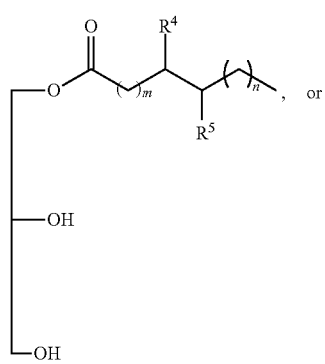
(Ic)

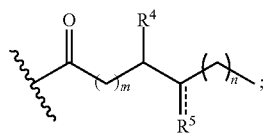
(Id)

8. A wax composition comprising:
(a) a wax; and
(b) a compound of Formula (I):

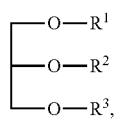
(I)

wherein $R^1$ is H or

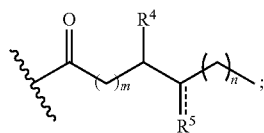

$R^2$ is H

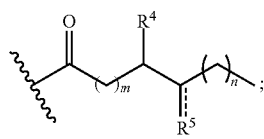

$R^3$ is H or

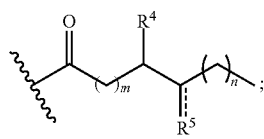

$R^4$ is H or —OH;
$R^5$ is —OH, or =O;

is a point of attachment of the $R^1$, $R^2$, or $R^3$ to its respective oxygen atom in the compound of Formula (I);
═══ is a single or a double bond;
n is an integer from 1 to 13;
m is an integer from 2 to 19;
wherein at least one of $R^1$, $R^2$, or $R^3$ is

and
wherein when $R^4$ is H then $R^5$ is —OH or =O;
wherein when $R^5$ is H then $R^4$ is —OH;
wherein the compound is not a hydrogenated castor oil; or a stereoisomer thereof,
wherein the wax and the compound of Formula (I) are mixed together.

9. The wax composition of claim 8, wherein n is an integer from 3 to 7 and m is an integer from 7 to 13.

10. The wax composition of claim 8, wherein the wax is selected from the group consisting of carnauba wax, beeswax, candwlilla wax, shellac resin wax, rice bran wax, sugarcane wax, and sorghum wax.

11. The wax composition of claim 8, wherein the wax is carnauba wax.

12. The wax composition of claim 8, wherein the compound of Formula (I) has the Formula (Ia), Formula (Ib), Formula (Ic), or Formula (Id):

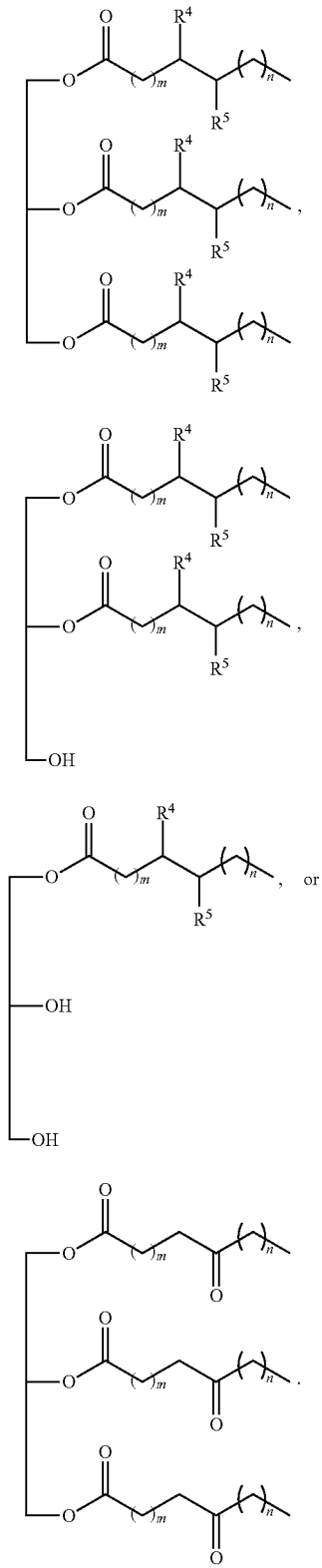

13. The wax composition of claim 8, wherein the compound of Formula (I) is selected from the group consisting of

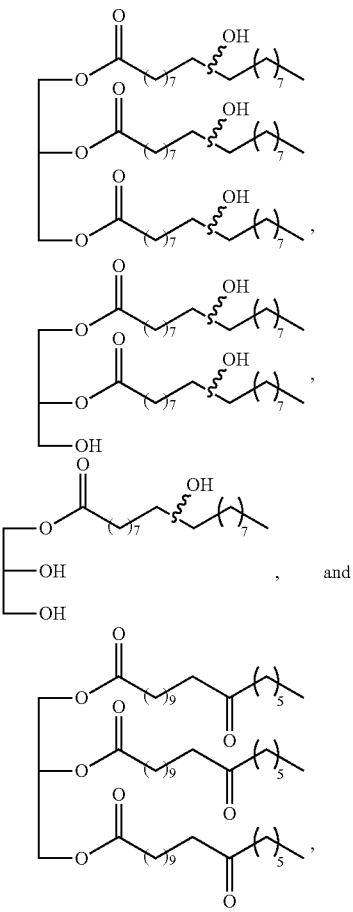

a mixture thereof,
wherein

indicates a bond between adjacent carbons where the —OH is bonded to one of the adjacent carbons:

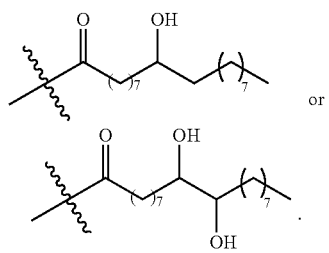

14. The wax composition of claim 8, wherein the wax ranges from 30 wt % to 99 wt % of the wax composition, and the compound of Formula (I) ranges from 70 wt % to 1 wt % of the wax composition.

15. The wax composition of claim 8, wherein the wax ranges from 50 wt % to 90 wt % of the wax composition, and the compound of Formula (I) ranges from 50 wt % to 10 wt % of the wax composition.

16. A fruit coated with the wax composition of claim 8.

17. A compound having the Formula (I):

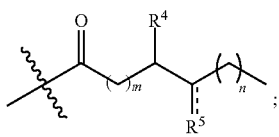

wherein $R^1$ is H or

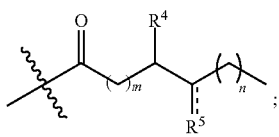

$R^2$ is H or

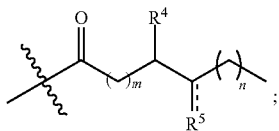

$R^3$ is H or

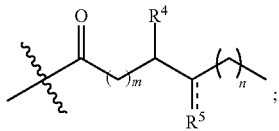

$R^4$ is H or —OH;
$R^5$ is H, —OH, or =O;

is a point of attachment of the $R^1$, $R^2$, or $R^3$ to its respective oxygen atom in the compound of Formula (I);

=== is a single or a double bond;
n is 1, 2, 3, 6, 7, 8, 9, 10, 11, 12, or 13;
m is an integer from 2 to 19;
wherein at least one of $R^1$, $R^2$, or $R^3$ is

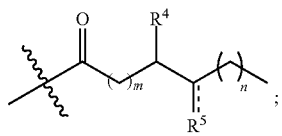

and
wherein when $R^4$ is H then $R^5$ is —OH or =O;
wherein when $R^5$ is H then $R^4$ is —OH;
with the proviso that 1) when m is 7 and n is 7, then $R^4$ is not OH; 2) when m is 8 and n is 6, then $R^4$ is not OH;
or a stereoisomer thereof.

18. A compound of Formula:

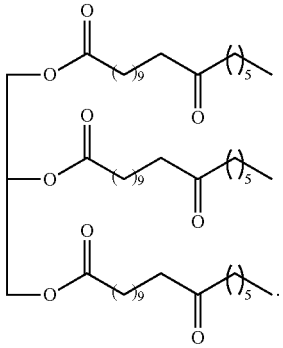

* * * * *

UNITED STATES PATENT AND TRADEMARK OFFICE
CERTIFICATE OF CORRECTION

PATENT NO. : 11,845,848 B2  
APPLICATION NO. : 17/244699  
DATED : December 19, 2023  
INVENTOR(S) : Wang et al.

It is certified that error appears in the above-identified patent and that said Letters Patent is hereby corrected as shown below:

In the Claims

At Claim 8, Column 54, Line 30, insert --H,-- before "-OH".

At Claim 8, Column 54, Line 54, delete "=0" and insert --=O-- in its place.

At Claim 13, Column 56, Line 37, insert --or-- after ",".

At Claim 13, Column 56, Lines 57-62, delete " 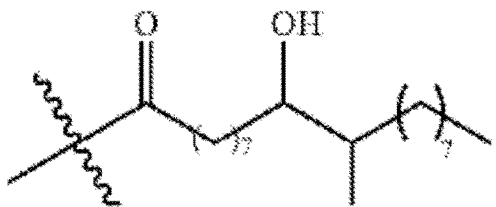 " and insert -- [structure] -- in its place.

Signed and Sealed this  
Twelfth Day of March, 2024

Katherine Kelly Vidal  
*Director of the United States Patent and Trademark Office*